US012511248B2

(12) United States Patent
Awan et al.

(10) Patent No.: US 12,511,248 B2
(45) Date of Patent: Dec. 30, 2025

(54) INTERCONNECTING RECONFIGURABLE REGIONS IN A FIELD PROGRAMMABLE GATE ARRAY

(71) Applicant: Telefonaktiebolaget LM Ericsson (publ), Stockholm (SE)

(72) Inventors: Ahsan Javed Awan, Vallentuna (SE); Fidan Aliyeva, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 18/682,420

(22) PCT Filed: Aug. 4, 2022

(86) PCT No.: PCT/EP2022/071938
§ 371 (c)(1),
(2) Date: Feb. 8, 2024

(87) PCT Pub. No.: WO2023/016910
PCT Pub. Date: Feb. 16, 2023

(65) Prior Publication Data
US 2024/0354271 A1 Oct. 24, 2024

Related U.S. Application Data

(60) Provisional application No. 63/232,103, filed on Aug. 11, 2021.

(51) Int. Cl.
*G06F 13/40* (2006.01)
(52) U.S. Cl.
CPC .............................. *G06F 13/4022* (2013.01)

(58) Field of Classification Search
CPC .................................................. G06F 13/4022
See application file for complete search history.

(56) References Cited

U.S. PATENT DOCUMENTS 7,149,996 B1 * 12/2006 Lysaght ............. H04Q 3/54533
326/38
9,432,298 B1 * 8/2016 Smith .................. H04L 49/9057
(Continued)

FOREIGN PATENT DOCUMENTS

JP 6699249 B2 5/2020

OTHER PUBLICATIONS

Agarwal, et al., "Enhancement of Wishbone protocol with broadcasting and multicasting," 2015 IEEE International Conference on Electronics, Computing and Communication Technologies (CONECCT), Bangalore, India, 2015, pp. 1-5, doi: 10.1109/CONECCT.2015.7383856.

(Continued)

*Primary Examiner* — Henry Tsai
*Assistant Examiner* — Aurangzeb Hassan
(74) *Attorney, Agent, or Firm* — Nicholson, De Vos, Webster & Elliott, LLP

(57) ABSTRACT

The present disclosure provides a Field Programmable Gate Array (FPGA). The FPGA comprises a plurality of regions, each of the regions being reconfigurable independently of one another. The FPGA further comprises a crossbar switch connected to the plurality of regions, wherein the crossbar switch is configurable to connect at least one first region in the plurality of regions to at least one second region in the plurality of regions such that the at least one first region is operable to communicate with the at least one second region.

18 Claims, 33 Drawing Sheets

(56) References Cited

U.S. PATENT DOCUMENTS

| 10,782,975 | B1* | 9/2020 | Ishiwata | G06F 9/5077 |
|---|---|---|---|---|
| 2009/0073967 | A1* | 3/2009 | How | G06F 13/4022 |
| | | | | 370/359 |
| 2013/0054939 | A1 | 2/2013 | Felch | |
| 2014/0040528 | A1* | 2/2014 | Chang | G06F 13/36 |
| | | | | 710/317 |
| 2019/0108861 | A1* | 4/2019 | Tsien | G06F 13/4022 |

OTHER PUBLICATIONS

Bobda, et al., "Dynamic interconnection of reconfigurable modules on reconfigurable devices," IEEE Design & Test of Computers, vol. 22, No. 5, pp. 443-451, Sep.-Oct. 2005, doi: 10.1109/MDT.2005.109.

Hagemeyer, et al., "A Design Methodology for Communication Infrastructures on Partially Reconfigurable FPGAS," 2007 International Conference on Field Programmable Logic and Applications, Amsterdam, Netherlands, Aug. 27-29, 2007, pp. 331-338, doi: 10.1109/FPL.2007.4380668.

International Search Report and Written Opinion, PCT App. No. PCT/EP2022/071938, Feb. 13, 2023, 16 pages.

Mbongue, et al., "Architecture Support for FPGA Multi-tenancy in the Cloud," 31st IEEE International Conference on Application-specific Systems, Architectures and Processors (ASAP 2020), Jun. 14, 2020, pp. 125-132.

Oklobdzija, V., "An algorithmic and novel design of a leading zero detector circuit: comparison with logic synthesis," in IEEE Transactions on Very Large Scale Integration (VLSI) Systems, vol. 2, No. 1, pp. 124-128, Mar. 1994, doi: 10.1109/92.273153.

OpenCores, "Wishbone" Revision B4, Jun. 2010, pp. 1-128.

Pionteck, et al., "Applying Partial Reconfiguration to Networks-On-Chips," 2006 International Conference on Field Programmable Logic and Applications, Madrid, Spain, Aug. 28-30, 2006, pp. 1-6, doi: 10.1109/FPL.2006.311208.

\* cited by examiner

Configuring at least one first region in the plurality of regions to communicate with at least one second region in the plurality of regions via the crossbar switch ⎯3202

INTERCONNECTING RECONFIGURABLE REGIONS IN A FIELD PROGRAMMABLE GATE ARRAY

CROSS-REFERENCE TO RELATED APPLICATIONS

This application is a national stage of International Application No. PCT/EP2022/071938 filed Aug. 4, 2022, which claims the benefit of U.S. Provisional Application No. 63/232,103 filed Aug. 11, 2021, which are hereby incorporated by reference.

TECHNICAL FIELD

Embodiments of the disclosure relate to field programmable gate arrays (FPGAs) and, in particular, to FPGAs comprising a plurality of reconfigurable regions.

BACKGROUND

Fifth Generation (5G) technology has enabled communication bandwidths that have never been achieved before. However, these increased bandwidths can impose huge demands on processing architectures to ingest and process data. Field programmable gate arrays (FPGAs) are being considered as a potential platform for accelerating processing for radio access network functions, such as virtualized radio access network (vRAN) functions, to meet the increased demand. For example, third party accelerators, such as Amazon's Elastic Compute Cloud (EC2) F1 instances, may be used at the edge of a communications network to provide accelerated processing using FPGAs.

With the advent of three-dimensional integrated circuits based on Stacked Silicon Interconnect technology, FPGAs are increasingly rich in resources. Dedicating one large FPGA to a single user or application can lead to poor utilisation of FPGA resources and drastically increase infrastructure costs. To address these problems, several proposals exist to support multi-tenancy on FPGAs, in which the internal resources of an FPGA are statically divided into multiple partitions. These partitions are referred to as reconfigurable, or partially reconfigurable, regions.

These regions can be reconfigured independently, such that one region can be reconfigured without affecting another region of the FPGA. To enable this reconfiguration, the partial bitstream of a reconfigurable region can be made available by a framework in a database. Alternatively, the partial bitstream of a reconfigurable region can be generated at runtime by synthesizing a user-provided accelerator file described at register transfer level (RTL), Open Computing Language (OpenCL) level or high-level synthesis (HLS) level. Solutions tend to target different central processing unit (CPU)-FPGA architectures such as, for example, PCIe attached FPGA, network attached FPGA and system on chip (e.g. comprising CPUs, such as ARM CPUs, and programmable logic). These solutions can provide isolation among multiple processes, OpenCL tasks and virtual machines, which can be orchestrated via OpenStack.

However, whilst reconfigurable regions can improve resource utilisation, they are fixed in size so their resources cannot be increased or decreased once they have been defined. Thus, a reconfigurable region may have more resources than required by an application, causing the unused resources to go to waste. Conversely, an application may need more resources than any reconfigurable region in an FPGA has, preventing the FPGA from hosting the application. Methods and apparatus are thus needed to dynamically adjust reconfigurable regions according to an application's need.

SUMMARY

Embodiments of the disclosure seek to address these and other problems by providing effective communication between reconfigurable regions in an FPGA. Reconfigurable regions in FPGAs are usually isolated from one another. Providing effective communication between reconfigurable regions enables dividing a request for acceleration into multiple computational modules or tasks, which can be distributed amongst reconfigurable regions on the FPGA. Enabling distributed processing in this manner means that FPGA resources can be shared amongst more reconfigurable regions (e.g. each region can be provided with fewer resources), which reduces the risk that any particular reconfigurable region will underutilise its resources. At the same time, enabling the distribution of processing across multiple reconfigurable regions makes more resources available to any particular application.

In one aspect, the present disclosure provides an FPGA comprising a plurality of regions. Each of the regions are reconfigurable independently of one another. The FPGA further comprises a crossbar switch connected to the plurality of regions. The crossbar switch is configurable to connect at least one first region in the plurality of regions to at least one second region in the plurality of regions such that the at least one first region is operable to communicate with the at least one second region.

In a further aspect, a resource manager operable to configure an FPGA is provided, in which the FPGA comprising a plurality of regions connected to a crossbar switch, each of the regions being reconfigurable independently of one another. The resource manager is operable to instruct the FPGA to configure at least one first region in the plurality of regions to communicate with at least one second region in the plurality of regions via the crossbar switch.

In yet a further aspect, a method for configuring an FPGA is provided, in which the FPGA comprises a plurality of regions connected to a crossbar switch and each of the regions are reconfigurable independently of one another. The method comprises configuring at least one first region in the plurality of regions to communicate with at least one second region in the plurality of regions via the crossbar switch.

The present disclosure thus provides an FPGA with a crossbar switch which enables effective communication between reconfigurable regions in the FPGA. The crossbar switch provides a flexible and scalable interconnection which can support different communication patterns whilst minimising area overhead. Since a crossbar switch can support multiple transmissions in parallel, the FPGA can support multicast communications between FPGA regions and increase throughput. These benefits are achieved with minimal protocol overhead since crossbar switches are provided with multiple channels and, once the crossbar switch is configured to interconnect two or more reconfigurable regions, data can be transmitted between the reconfigurable regions without any further protocol overhead.

BRIEF DESCRIPTION OF THE DRAWINGS

For a better understanding of examples of the present disclosure, and to show more clearly how the examples may be carried into effect, reference will now be made, by way of example only, to the following drawings:

FIG. 32 shows a flowchart of a method of configuring an FPGA.

DETAILED DESCRIPTION

Figure 1:
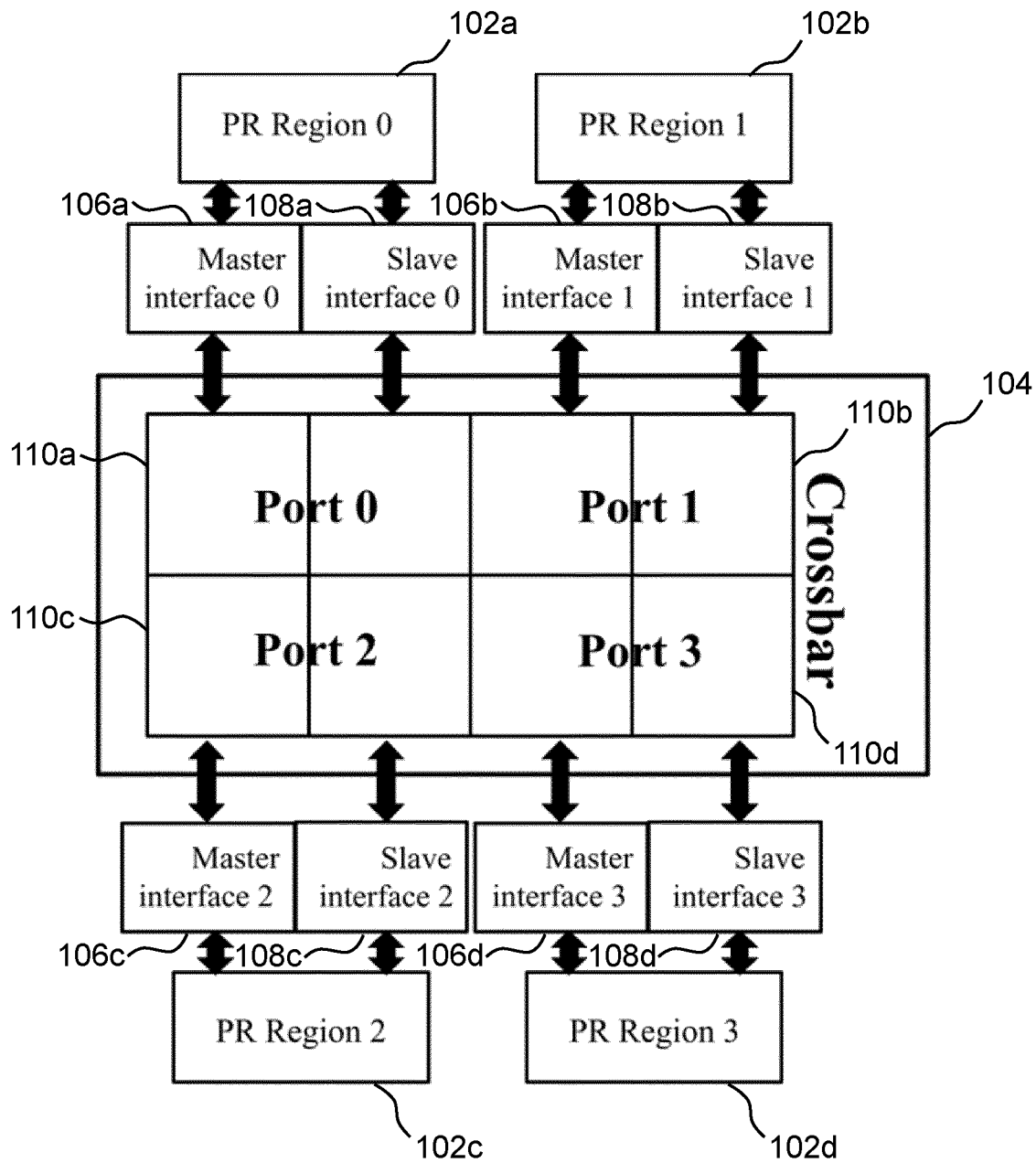
FIG. 1 shows a Field Programmable Gate Array (FPGA) according to examples of the present disclosure.

Field Programmable Gate Arrays (FPGAs) can be partitioned to provide one or more regions which can be reconfigured independently. For example, an FPGA may be partitioned into one or more static regions (e.g. which cannot be independently reconfigured) and one or more reconfigurable regions. The reconfigurable regions, which may be equivalently referred to as partially reconfigurable (PR) regions, can be reconfigured whilst leaving other reconfigurable regions unchanged. Partial reconfiguration thus comprises modifying one or more portions of FPGA logic whilst leaving the remaining portions unchanged.

Reconfigurable regions can be dynamically or statically reconfigurable. In practice, an FPGA may comprise a combination of both, such that a subset of the reconfigurable regions may be reconfigurable during runtime (dynamically reconfigurable regions), whereas others may only be reconfigured whilst the FPGA is in a reset state (statically reconfigurable regions). Reconfigurable regions may be reconfigured using partial bitstreams.

As well as making it easier to adapt an FPGA to application requirements, reconfigurable regions can facilitate multi-tenancy by allowing different applications to run on respective reconfigurable regions of an FPGA in parallel. However, this can lead to resources being underutilised, since an application may be allocated to a reconfigurable region with more resources than it needs. In addition, portioning an FPGA into multiple reconfigurable regions necessarily fragments the FPGAs resources, which can mean that an application may need more resources than can be provided by any one reconfigurable region.

One way of improving resource utilisation of an FPGA is to interconnect reconfigurable regions of the FPGA to enable communication between the reconfigurable regions. Any modules or tasks running on the reconfigurable regions would thus be able to send computation results to other regions of the FPGA, thereby facilitating the distribution of processing across multiple regions of the FPGA. In this approach, any request for acceleration can be divided into computational modules which can be processed (e.g. accelerated) on different reconfigurable regions.

There are various ways in which reconfigurable regions in an FPGA may be interconnected. One option is to connect the reconfigurable regions using a shared bus, as described in Hagemeyer, Jens, et al. "A Design Methodology for Communication Infrastructures on Partially Reconfigurable FPGAs." 2007 International Conference on Field Programmable Logic and Applications, 2007, doi: 10.1109/fpl.2007.4380668. However, this architecture supports only a limited number of communication patterns and is challenging to extend to larger numbers of reconfigurable regions or modules. In addition, a shared bus architecture cannot support communication between different reconfigurable regions at the same time, limiting throughput.

Network-on-Chips (NoC) provide an alternative approach. Whilst NoCs are more scalable and flexible, they have a large area overhead. In addition, although NoCs can support parallel transmissions, this requires extra protocol overhead to handle access since the routers in an NoC typically have a small number of physical channels. NoCs also tend to require large network protocol overhead for dividing packets into segments, sending them separately, and then recovering the original sequence at the destination. Additionally, packet loss can be expensive in NoCs since the whole packet is sent again if any segments are lost.

Improved methods for communicating between reconfigurable regions in a FPGA are thus needed.

Embodiments of this disclosure seek to address these and other problems. In one aspect of the disclosure, an FPGA comprising a plurality of regions is provided. The regions are reconfigurable independently of one another. The FPGA comprises a crossbar switch which is connected to the regions. The crossbar switch can be configured to connect at least one of the reconfigurable regions to another reconfigurable region such that they can communicate with one another.

The present disclosure provides an FPGA architecture which supports distributing processing amongst reconfigurable regions. This can improve resource utilisation whilst still providing applications with sufficient resources. A crossbar switch is a particularly advantageous choice of interconnection since it can support different communication patterns whilst minimising area overhead. The crossbar switch is thus a flexible and scalable interconnection which is particularly suitable for interconnecting reconfigurable regions in an FPGA. Since a crossbar switch can support multiple transmissions in parallel, the FPGA can support multicast communications between FPGA regions and increase throughput. These benefits are achieved with minimal protocol overhead since crossbar switches are provided with multiple channels and, once the crossbar switch is configured to interconnect two or more reconfigurable regions, data can be transmitted between the reconfigurable regions without any further protocol overhead.

FIG. 1 shows an FPGA 100 according to examples of the present disclosure. The FPGA comprises four reconfigurable regions 102a-102d (collectively 102), labelled as PR (partially reconfigurable) regions 0, 1, 2 and 3 respectively. However, the skilled person will appreciate that the present disclosure is not limited as such. Rather, the FPGAs of the present disclosure may, in general, comprise two or more reconfigurable regions.

The reconfigurable regions 102 are connected to a crossbar switch 104. In this context, a crossbar switch may be any interconnection which can be configured to implement any permutation of connections between its inputs and outputs. In particular examples described herein, the crossbar switch 104 may be configurable to directly connect any of its inputs to any of its outputs. Thus, the crossbar switch 104 may be configurable to directly connect any of the transmit interfaces 106 to any of the receive interfaces 108. The crossbar switch 104 may use one or more multiplexers to connect its inputs to its outputs, for example. Although the crossbar switch 104 shown in Figure is a four-port crossbar switch, the skilled person will appreciate that the present disclosure is not limited as such. In general, any suitable crossbar switch may be used.

In some examples, the crossbar switch 104 is provided with a Wishbone (WISHBONE or WB) interface. A Wishbone interface is an example of a non-hierarchical bus architecture. Since non-hierarchical bus architectures have a single level bus line, using a non-hierarchical bus architecture saves area and reduces energy consumption. Although the skilled person will appreciate that any interface with a non-hierarchical bus architecture may be used, the Wishbone interface has particular advantages in some examples.

In particular, for example, the Wishbone interface may be simpler to implement than other non-hierarchical bus architectures because it has low design complexity, and it may be easy to adapt hardware modules to work with a Wishbone interface. The Wishbone interface also has the advantage of being operable at high frequencies. In addition, the Wishbone interface has a built-in handshaking protocol, inherently providing transmission safety. The Wishbone interface can also support different types of transactions including, for example, block read/write cycles (e.g. supporting multiple data transfers), single read/write cycles and read/modify/write (RMW) cycles. Since the Wishbone interface is governed by one or more standards, in particular examples, the Wishbone interface may be compliant with any suitable standard, such as Wishbone Version B4.

Although interfaces having a non-hierarchical bus architecture, such as the Wishbone interface, are particularly advantageous for the examples disclosed herein, the skilled person will appreciate that the present disclosure is not limited as such. In general, the crossbar switch 104 may be provided with any suitable interface for enabling communication between reconfigurable regions 102 connected to one another via the crossbar switch 104.

Each of the reconfigurable regions 102 is provided with respective transmit interface 106a-106d (collectively 106) and a respective receive interface 108a-108d (collectively 108) connecting the respective region to the crossbar switch. In the context of the present disclosure, a transmit interface may equivalently be referred to as master interfaces. A receive interface may equivalently be referred to as a slave interface. The transmit interface 106 of one reconfigurable region is operable to send data to a receive interface 108 of another reconfigurable region 102.

Thus, the first reconfigurable region 102a (PR Region 0) is provided with a first transmit interface 106a (Master Interface 0) and a first receive interface 108b (Slave Interface 0) which connect the first reconfigurable region 102a to the crossbar switch 104. The first transmit interface 106a may be operable to request to send data to any of the other reconfigurable regions 102b-102d. Providing each reconfigurable region 102 with a respective transmit interface 106 and a receive interface 108 enables configuring any reconfigurable region 102 to send data to any other reconfigurable region, thereby preventing any communication limitations.

In some examples, where the crossbar switch 104 comprises a Wishbone interface, each of the transmit interfaces 106 and the receive interfaces 108 may also comprise a Wishbone interface. However, the skilled person will appreciate that the present disclosure is not limited as such and thus, in general, the transmit and receive interfaces 106, 108 may comprise any suitable interfaces.

The crossbar switch 104 comprises respective ports 110a-110d (collectively 110) for each of the reconfigurable regions 102. Each of these ports 110 comprises a transmit port and receive port (not numbered). Each transmit port is operable to receive a request for communication from the corresponding transmit interface 106 of the respective reconfigurable region 102. Thus, for example, the transmit port associated with the second reconfigurable region 102 (the transmit port of Port 1) is operable to receive a communication request from the transmit interface 106b of the second reconfigurable region 102b. Based on destination information comprised in the request, a transmit port can forward a request to a receive port of one of the other ports 110. Each of the receive ports may comprise an arbiter for scheduling communication grants. Thus, in some examples, on receipt of a communication request, a receive port can schedule a communication grant based on the request.

Thus, for example, in response to receiving a request for communication from the transmit interface 106a of the first reconfigurable region 102a, the transmit port of the first port 110a (labelled Port 0) may determine, based on destination information (e.g. an address) comprised in the request, that the request is intended for the second reconfigurable region 102b. The transmit port of the first port 110a may thus send the request for communication to receive port of the second port 110b, which can schedule a communication grant for the first reconfigurable region 102a based on the communication request. The receive port of the second port 110b notifies the transmit port of the first port 110a of the communication grant.

The transmit port of the first port 110a configures the crossbar switch in accordance with the communication grant.

Examples of the disclosure thus provide an FPGA 100 comprising a plurality of reconfigurable regions 102 connected to a crossbar switch 104. As described above, FIG. 1 shows the reconfigurable regions 102 being connected to the crossbar switch 104 by corresponding transmit and receive interfaces 106, 108 and the crossbar switch comprising ports 110 for receiving and arbitrating communication requests from the reconfigurable regions 102. However, the skilled person will appreciate that the present disclosure is not limited as such. In particular, there are various ways in which the FPGA 100 may be configured to enable communication between reconfigurable regions 102 via the crossbar switch 104. Rather, the FPGA 100 may comprise, for example, any suitable interface(s) for connecting the reconfigurable regions via the crossbar switch 104.

Figure 2:
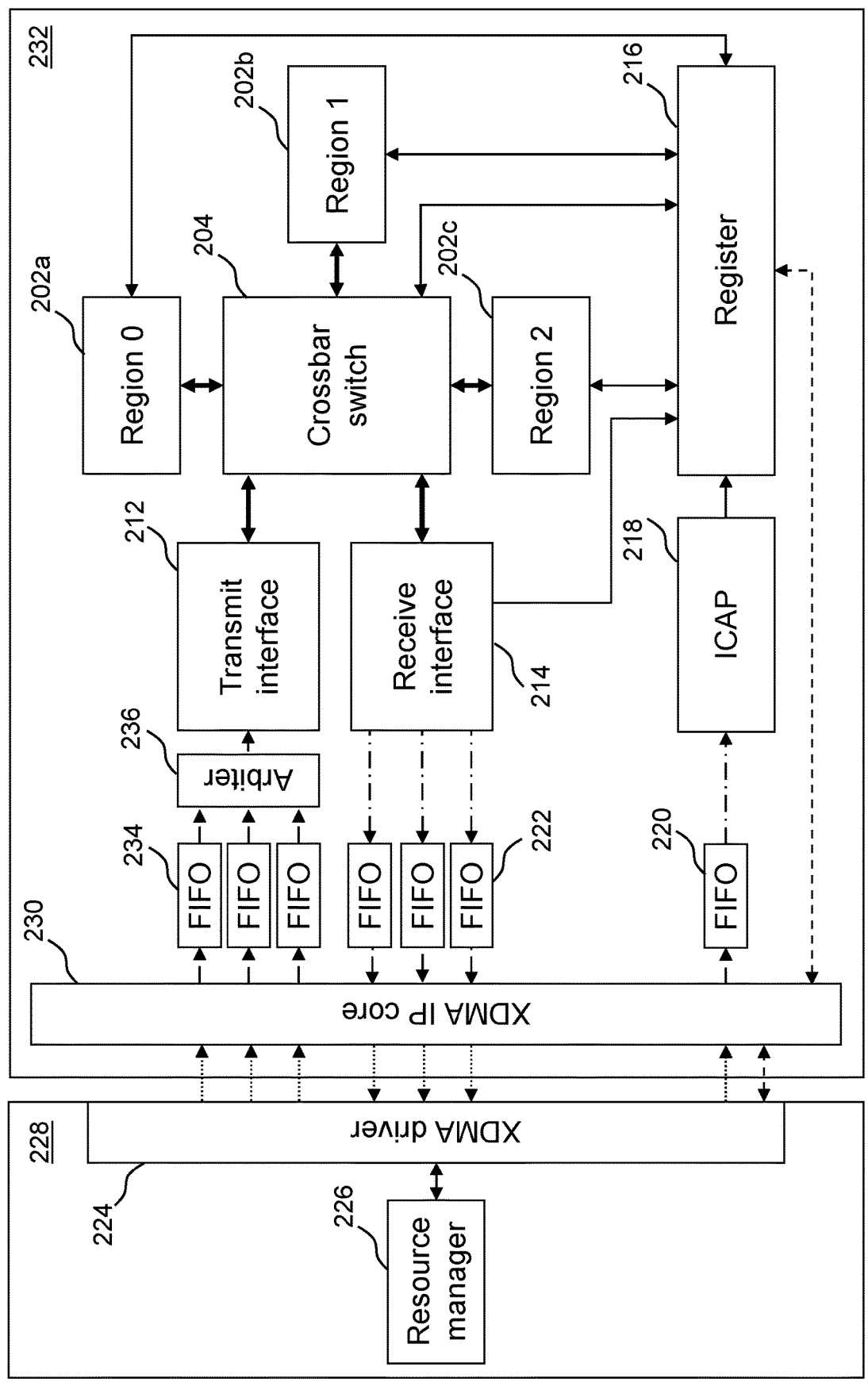
FIG. 2 shows a system according to examples of the disclosure

FIG. 2 shows a system according to examples of the disclosure. The system comprises a host server 228 and an FPGA 232.

The FPGA 232 comprises three reconfigurable regions 202a-202c (collectively 202) connected to a crossbar switch 204. The crossbar switch 204 may comprise the crossbar switch 104 described above in respect of FIG. 1, for example, except that its fourth port (corresponding to Port 3 110d of the crossbar switch 104), is used to connect the crossbar switch 204 to a Xilinx Peripheral Component Interconnect express Direct Memory Access (XDMA) Intellectual Property (IP core) 230. The crossbar switch 204 may thus operate in substantially the same way as the crossbar switch 104 described above in respect of FIG. 1.

The reconfigurable regions 202 may operate in substantially the same way as the reconfigurable regions 102a, 102b, 102c described above in respect of FIG. 1. Thus, for example, each of the reconfigurable regions 202 is provided with a transmit interface and receive interface (not illustrated) for communicating with the crossbar switch. In some examples, the crossbar switch 204 is provided with a Wishbone interface for facilitating communication across the crossbar switch 204, though in other examples any suitable switch may be used as indicated above for the crossbar switch 104 shown in FIG. 1.

The host server 228 may be any suitable node which is connected to the FPGA 232. The host server 228 may form part of a network, such as a communications network, for example.

The host server 228 comprises a resource manager 226. The resource manager 226 is operable to receive a request for data processing for an application and configure the FPGA 232 to perform at least some of the data processing. A request for data processing may comprise data to be processed (referred to equivalently herein as application data) and a plurality of tasks to be performed using the data. The resource manager 226 is operable to configure two or more of the reconfigurable regions 202 in the FPGA 232 to perform some or all of plurality of tasks using the application data. In particular, the resource manager 226 is operable to configure at least one of the regions 202 to send one or more outputs of the task(s) the respective region is to perform to another of the regions 202. The resource manager 226 is further operable to configure the other of the regions 202 to perform processing based on the output(s) it receives.

Thus, the resource manager 226 may configure the FPGA 232 to distribute data processing across the plurality of regions 202. In the illustrated example, the resource manager 226 is provided in the host server 228, which is external to the FPGA 232. However, the skilled person will appreciate that the disclosure is not limited as such. Thus, for example, the resource manager 226 may alternatively be comprised in the FPGA 232 itself.

The resource manager 226 is connected to an XDMA driver 224. The XDMA driver 224 is operable to run on the host server 228 to interact with (e.g. communicate with) the XDMA IP core 230 in the FPGA 232. Although the present example uses an XDMA driver 224, any suitable Direct Memory Access (DMA) driver may be used. Similarly, any suitable DMA IP core may be used in place of the XDMA IP core 230.

The resource manager 226 is operable to configure the FPGA 232 to perform data processing by sending configuration information and/or application data (e.g. data to be processed) to the XDMA driver 224, which sends the received information to the XDMA IP core 230.

In this example, the resource manager 226 operates in the user space of the host server 228, whereas the XDMA driver 224 operates in the kernel space of the host server 228. Together, the resource manager 226 and the XDMA driver 224 can thus serve as an interface between one or more applications requesting to run on the FPGA 232 and the FPGA 232 itself. However, the skilled person will appreciate that the present disclosure is not limited as such, and other suitable arrangements may be used.

The XDMA driver 224 is connected to the XDMA IP core 230 by a Peripheral Component Interconnect express (PCIe) cable. The resource manager 226 can thus configure the FPGA 232 to perform data processing by sending configuration information and application data (e.g. data to be processed) to the XDMA driver 224, which sends it to the XDMA IP core 230 on the FPGA 232 over the PCIe link.

Reconfiguring the Regions

As mentioned above, the FPGA 232 can be configured by sending configuration information from the XDMA driver 224 in the host server 228 to the XDMA IP core 230 in the FPGA 232.

In the illustrated example, the XDMA IP core comprises four Host to Card (H2C) channels (H2C-0, H2C-1, H2C-2, H2C-3) for receiving information and one of these channels (H2C-3) is used exclusively for sending configuration information from the XDMA driver 224 to the XDMA IP core 230. However, the present disclosure is not limited as such, and the configuration information may be sent over any suitable link and particularly over a dedicated link.

The configuration information comprises region configuration information and one or more of: destination information, one or more bandwidth allocations for one or more of the reconfigurable regions 202, and permission information.

The region configuration information is for configuring each of the reconfigurable regions 202 to perform one or more respective tasks. The region configuration information may comprise one or more bitstreams, or partial bitstreams, for configuring the reconfigurable regions 202. The partial bitstream for a given reconfigurable region 202 may be for configuring the reconfigurable region 202 to implement a respective module (e.g. a netlist or hardware description language, HDL, description). For example, the configuration information may comprise a first partial bitstream for configuring the first reconfigurable region 202a to implement a first module such that, when the module is implemented in the first reconfigurable region 202a, the first reconfigurable region is operable to perform one or more tasks.

The destination information indicates a destination for the output(s) of the reconfigurable regions 202. The output(s) of a particular reconfigurable region may be sent to another reconfigurable region 202 or, for example, a node other than the FPGA 232 (e.g. the host server 228). For example, the destination information may indicate that the first reconfigurable region 202a is to transmit its output(s) (e.g. processed data) to the second reconfigurable region 202b. In another example, the destination information may indicate that the second reconfigurable region 202b is to transmits its output(s) to the host server 228.

The destination information may comprise a destination address for each of the reconfigurable regions 202, indicating where their outputs should be sent. For example, the destination information for the first reconfigurable region 202a may comprise an address of the second reconfigurable region 202b, indicating that the first reconfigurable region 202a is to transmit its output(s) to the second reconfigurable region 202b. The destination addresses may be provided in any suitable form. In particular examples, each of the destination addresses may be provided as a plurality of bits, in which each bit is associated with a respective reconfigurable region. In these examples, the address of a reconfigurable region comprises a high bit at the position of the bit associated with the reconfigurable region. Thus, for example, the address of the second reconfigurable region 202b may be represented as 0100.

Each bandwidth allocation indicates a bandwidth of the crossbar switch 204 allocated to a respective reconfigurable region 202. Thus, a bandwidth allocation may specify a threshold number (e.g. a maximum number) of packages (or packets) that a reconfigurable region 202 is permitted to send over the crossbar switch 204. In another example, a bandwidth allocation may specify a threshold period of time (e.g. a maximum amount of time) that a reconfigurable region 202 is permitted to transmit packages over the crossbar switch 204.

The permission information indicates which of the plurality of regions are permitted to communicate with each other. Thus, for example, the permission information may comprise, for each of the reconfigurable regions, an indication of which regions it is permitted to send data to. Each reconfigurable region may, for example, be associated with a list of allowed reconfigurable regions that it can send data to. The permission information may take any suitable form. For example, the permission information for a first reconfigurable region may comprise a plurality of bits, each associated with another reconfigurable region. Setting a bit equal to 1 may indicate that sending data to the region associated with the bit is permitted, whereas setting a bit equal to 0 may indicate that sending data to that region is forbidden.

The XDMA IP core 230 is connected to a register 216 in the FPGA 232. The register 216 is operable to store destination information, the one or more bandwidth allocations and/or the permission information received from the XDMA IP core 230.

In the illustrated example, the XDMA IP core 230 is directly connected to the register 216. This simplifies access to the register file by the XDMA IP core and prevents interference between register file information, such as the configuration information, and application data for processing. In this example, XDMA IP core 230 is connected to the register 216 using an Advanced extensible Interface (AXI) Lite interface. However, in general the XDMA IP core 230 may send the destination information, the one or more bandwidth allocations and/or the permission information to the register using any suitable link and, in particular, via any suitable direct link (e.g. a bypass link).

As illustrated, the link between the register 216 and the XDMA IP core 230 may be a two-way link. Thus, the XDMA IP core 230 may be operable to receive information from the register 216.

In particular examples, one or more of the destination information, the one or more bandwidth allocations and/or the permission information may be omitted from the information sent from the XDMA IP core 230 to the register 216. For example, the reconfigurable regions 202 may be configured, using the region configuration information, to send their output(s) to particular destinations, meaning that the destination information does not need to be stored at the register. In another example, all of the reconfigurable regions may be allowed to transmit for the same amount of time or to transmit the same number of packages across the crossbar switch 204, meaning that the bandwidth allocation(s) may be omitted. In yet a further example, the FPGA may not be configured to validate communication requests between reconfigurable regions, meaning that the permission information may be omitted.

The XDMA IP core 230 is further connected to an internal configuration access port (ICAP) 218 in the FPGA 232. The XDMA IP core 230 is operable to send the region configuration information to the ICAP 218. The ICAP 218 is connected to the XDMA IP core 230 via a dedicated link (H2C-3 in this example). As the ICAP 218 operates at a lower clock frequency than the rest of the FPGA 232 (at 125 MHz rather than 250 MHZ), a first-in first-out (FIFO) module 220 is provided between the ICAP and the XDMA IP core to prevent information from being lost due to differing clock speeds.

By providing dedicated links for sending configuration information from the XDMA driver 224 to the XDMA IP core 230, and from the XDMA IP core 230 to the ICAP 218, reconfiguration time and overhead can be reduced. However, the skilled person will appreciate that the present disclosure is not limited as such and, in general, the any suitable links between the XDMA driver 224, XDMA IP core and the ICAP 218 may be provided for sending configuration information. Thus, for example, one or more of the H2C channels (e.g. H2C-3) may be used. The H2C channels used to send configuration data may be used exclusively for this purpose or, for example, they may also be used to send other types of information (e.g. data for processing).

The ICAP 218 is operable to reconfigure the plurality of reconfigurable regions 202 based on region configuration information. Thus, for example, the ICAP 218 may be operable to use one or more partial bitstreams (e.g. received from the XDMA IP core 230) to configure the reconfigurable regions 202. For example, the ICAP 218 may be operable to use a first partial bitstream to configure the first reconfigurable region 202a to implement a first module.

The ICAP 218 is further operable to store information in the register 216. The ICAP 218 may be operable to store status information indicating whether or not an attempt to reconfigure a reconfigurable region 202 was successful. Thus, for example, in response to successfully reconfiguring a reconfigurable region 202, the ICAP 218 may indicate, to the register 216, that the reconfigurable region 202 has been reconfigured.

Although the FPGA 232 comprises an ICAP 218 for reconfiguring the regions 202 in the illustrated example, the skilled person will appreciate that the FPGA 232 may, in general, comprise any suitable configuration unit which is operable to reconfigure the plurality of reconfigurable regions 202. As this configuration unit forms part of the FPGA 232, it may be referred to as an internal configuration unit.

Sending Data for Processing

In addition to the configuration information, the XDMA driver 224 is operable to send the application data (data for processing by the reconfigurable regions 202) to the XDMA IP core 230. The XDMA driver 224 may send the application data over one or more channels. In the illustrated example, three out of the four available H2C channels are used for sending data to the XDMA IP core 230. However, the skilled person will appreciate that the present disclosure is not limited as such and, in general, the application data may be sent over any suitable channel(s) or link(s).

The XDMA IP core 230 is operable to send the application data to the crossbar switch 204. In the illustrated example, the XDMA IP core 230 is operable to send the application data via a plurality of first-in first-out (FIFO) modules 234, an AXI-round robin (RR) arbiter 236 and a transmit interface 212. In particular, each of the channels is provided with a respective FIFO module 234. There are various ways in which data may be assigned to the channels. In one example, data may be assigned based on occupancy. For example, data may be sent to the channel having the FIFO module 234 with the smallest queue. In another example, each application may be assigned a dedicated channel to isolate data for different applications from each other.

The XDMA IP core 230 sends the data to the FIFO modules 234 over an Advanced extensible Interface (AXI)-Stream interface. In contrast to the AXI-Lite interface used between the XDMA IP core 230 and the register 216, the AXI-Stream interface has a 256-bit bandwidth per channel, rather than the 32-bit bandwidth of the AXI-Lite interface. However, the skilled person will appreciate that other interfaces may be used and in particular, other AXI interfaces may be used. For example, the data may be sent to the FIFO modules 234 over channels operating in AXI-Memory Mapped (MM) mode.

The FIFO modules 234 are connected to the crossbar switch 204 via the AXI-RR arbiter 236 and the transmit interface 212. The AXI-RR arbiter 236 is operable to schedule transmission of data from the FIFO modules 234 to the transmit interface 212 according to a round robin process or algorithm. The AXI-RR arbiter may use a weighted round-robin scheduler, for example.

The transmit interface 212 is operable to deliver the application data to the reconfigurable regions 202 via the crossbar switch 204. The transmit interface 212 may be operable to determine which region(s) the data is to be delivered to based on information sent with the data. For example, the data may be provided with an address of one or more of the reconfigurable regions 202 to which it may be sent.

In another example, the data is provided with an application identifier (e.g. an indicator of the application for which processing is to be performed) and the register 216 may store an association between the application identifier and one or more addresses of reconfigurable regions 202 which are to receive data for processing. The register 216 may be configured with the association by the XDMA IP core 230, for example. The transmit interface 212 may thus determine which of the reconfigurable regions 202 to send the data to by sending a request for an address to the register 216, in which the request comprises the application identifier. Based on the application identifier, the register 216 determines the address to which the data is to be sent and sends the address to the transmit interface 212. The transmit interface 212 delivers the data to the one or more reconfigurable regions 202 indicated by the address.

By using the application identifier to determine the destination address for the data, communication isolation between different applications can be achieved. This is particularly important because the crossbar port which is connected to the transmit interface 212 may be permitted to access any of the reconfigurable regions 202 in order to provide data for any applications requesting processing. However, this means there is a risk of an application attempting to access a reconfigurable region 202 that it should not have access to by providing the destination address for that region. By using the application identifier, the transmit interface 212 directs the data to the correct reconfigurable region(s) 202 using the register 216.

The transmit interface 212 is operable to send the application data to the crossbar switch 204. As suggested above, in some examples the crossbar switch 204 is provided with a Wishbone (WB) interface, whereas the AXI-RR arbiter 236 and the FIFO modules 234 may use an AXI interface. The transmit interface 212 may thus in some examples comprises an AXI to Wishbone (AXI-to-WB) interface, which enables data from the AXI-RR arbiter 236 to be read by the Wishbone interface of the crossbar switch 204.

The transmit interface 212 is thus operable to deliver application data for processing to at least one of the reconfigurable regions 202.

Although the present example provides a plurality of FIFO modules 234, an AXI-RR arbiter 236 and a transmit interface 212 between the XDMA IP Core 230 and the crossbar switch 204, the skilled person will appreciate that one or more of these intermediate elements may be omitted or adapted in other examples. For example, in examples in which only a single channel is used to transmit the data from the XDMA IP Core 230 to the crossbar switch 204, the FIFO modules 234 and the AXI-RR arbiter 236 may be omitted. In other examples, the AXI-RR arbiter 235 may be replaced by a different arbiter (e.g. using any suitable arbitration scheme).

Data Processing and Output

The host server 228 is thus operable to configure two or more of the reconfigurable regions 202 of the FPGA 232 may be configured to perform respective task(s) to process the data. Thus, for example, the host server 228 may configure the first reconfigurable region 202a to perform one or more first tasks to process data it receives from the host server 228. The host server 228 may further configure the first reconfigurable region 202a to send the output(s) of the one or more first tasks to the second reconfigurable region 202b. The second reconfigurable region 202b may be configured to perform one or more second tasks based on the received output(s).

If an error occurs in communication between the first reconfigurable region 202a and the second reconfigurable region 202b, error information may be stored in the register 216. Thus, for example, error information indicating that a failure occurred may be stored in the register 216.

The second reconfigurable region 202b may be further configured to send the output(s) of the one or more second tasks to the third reconfigurable region 202c for further processing. The third reconfigurable region 202c may then send its output(s) to the host server 228. Alternatively, the second reconfigurable region 202b may be configured to send its output(s) to the host server 228.

In either case, the output(s) of the data processing performed by the reconfigurable regions 202 may be returned to the host server 228 via a receive interface 214 which is connected to the crossbar switch 214. In some examples, the crossbar switch 204 is provided with a Wishbone interface, and the receive interface 214 comprises a Wishbone to AXI (WB-to-AXI) interface, which may enable sending data from the Wishbone interface of the crossbar switch 204 over an AXI link to the XDMA IP core 230. However, the skilled person will appreciate that, in general, any suitable interface may be used.

The receive interface 214 sends the processed data to the XDMA IP core 230 over one or more channels. In the illustrated example, the receive interface 214 is operable to send the data over three Channel to Host (C2H) channels. In particular, three of the four C2H channels for the FPGA 232 are used to send processed data from the crossbar switch to the XDMA IP core 230 and ultimately to the host server 228. The remaining C2H may be used by the host server 228 to read information from the register file 216 via the XDMA IP core 230.

In contrast to the transmit interface 212, the receive interface 214 need not be provided with an arbiter. The receive interface 214 is connected to the XDMA IP core 230 by a plurality of FIFO modules 222. In particular, each of the channels is provided with a respective FIFO module 222.

The XDMA IP core 230 is thus operable to receive the processed data from the receive interface 214 via the FIFO modules 222. The XDMA IP core 230 is operable to send the processed data to the XDMA driver 224 in the host server 228.

Examples of the disclosure thus provide a system comprising a FPGA 232 and a host server 228, in which the host server 228 is operable to configure the FPGA 232 to perform data processing for an application by distributing processing of the data across two or more of the reconfigurable regions 202 in the FPGA 232. An exemplary method of distributing processing across reconfigurable regions 202 in the FPGA 232 is discussed below in respect of FIGS. 29-31.

Figure 3:
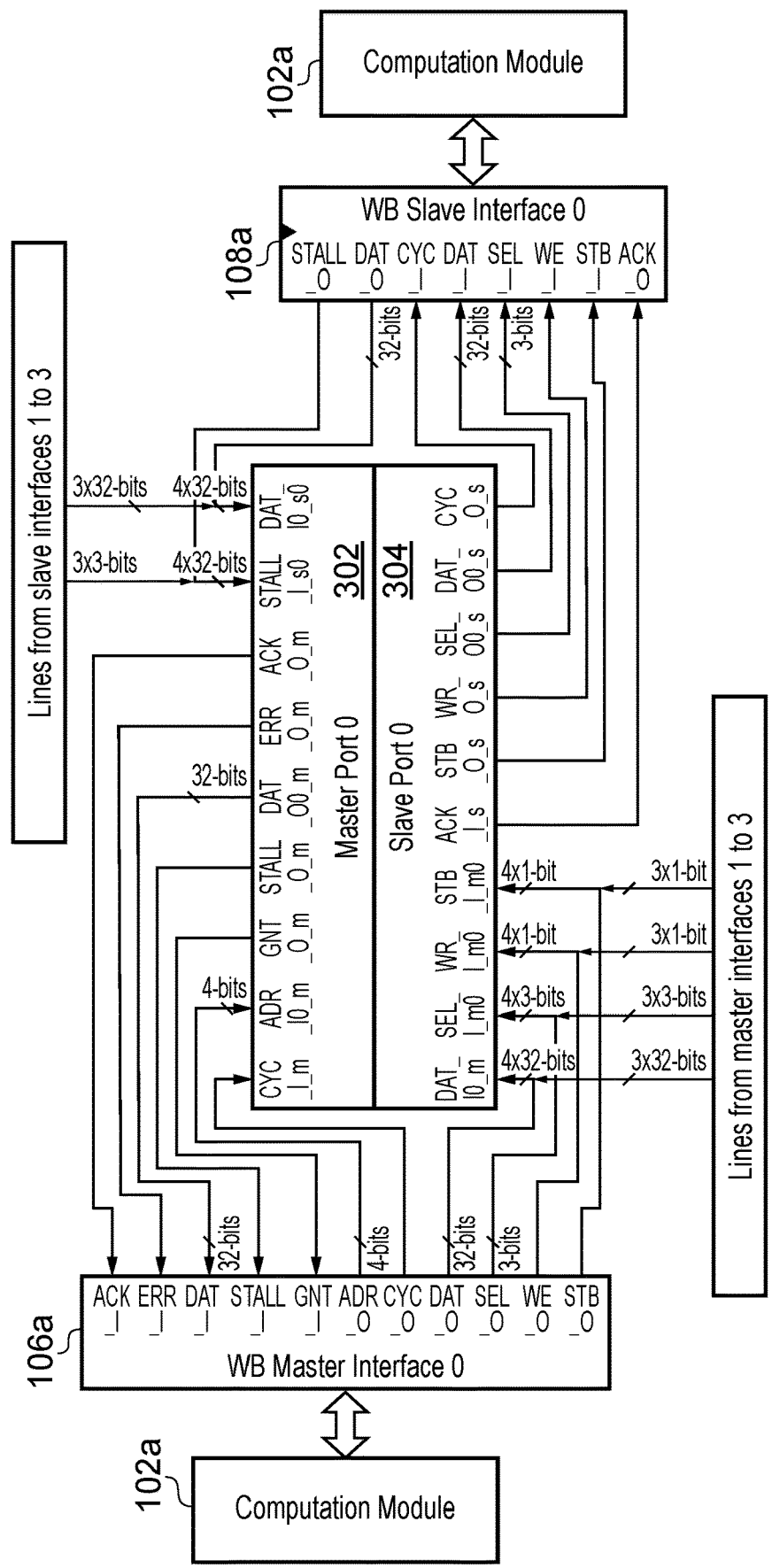
FIG. 3 shows a block diagram of an exemplary implementation of a port of a crossbar switch.

The architecture of the crossbar switch 204 is discussed in more detail with respect to FIG. 3. FIG. 3 shows a block diagram of an exemplary implementation of the first port 110a (Port 0) of the crossbar switch 104 described above in respect of FIG. 1. Although only the first port 110a is described in detail here, the skilled person will appreciate that a similar or same implementation may be used for the other ports 110b, 110c, 110d.

As mentioned above, the crossbar switch 104 and reconfigurable regions 102 described above in respect of FIG. 1 may be implemented in the FPGA 232 described in relation to FIG. 2. Thus, the following description refers to features of the FPGA 232 that the crossbar switch 104 may interact with.

The crossbar switch 104 comprises a respective port 110 for each of the reconfigurable regions 102 to which it is connected. Each port comprises a transmit port and a receive port. Thus, as illustrated in FIG. 3, the first port 110a comprises a first transmit port 302 and a first receive port 304. The first transmit port 302 may equivalently be referred to as a master port. The first receive port 304 may equivalently be referred to as a slave port.

The first transmit port 302 and the first receive port 304 are described in more detail below in respect of FIGS. 4-6. Briefly, the first transmit port 302 is operable to receive a request for communication from the first transmit interface 106a of the first reconfigurable region 102a, in which the request comprises a destination information (e.g. an address) indicating a target receive port or target receive interface. The first transmit port 302 is operable to determine, based on the communication request, whether or not the destination (indicated by the destination information) is valid. In response to determining that the destination is valid, the first transmit port 302 is operable to forward the request to the target receive port identified by the destination address. The target receive port may issue a communication grant for the first reconfigurable region 102a based on the request. In response to receiving the communication grant, the first transmit port 302 is operable to connect the target receive port to the first transmit interface 106a.

The following describes an example process for breaking acceleration requirements into computation modules. The process includes the following steps.

1. Acceleration requirements are expressed in High Level Synthesis, where dataflow pragmas are inserted between multiple computation modules. Based on the resource consumption (e.g. LUTs, FFs, BRAMs) of each computation module, it is further sub-divided if the logic permits such that its resource consumption is less than the capacity of each partition in the target FPGA.
2. Next the dataflow graph is constructed, where nodes correspond to the computation modules and edges represent the data flow among them.
3. Given the latency/communication overhead over the crossbar switch, the computation modules programmed into available partitions are maximized while the communication over the crossbar switch and the PCIe bus are minimized with following constraints:
    1. Each computation module is allocated up to maximum one partition.
    2. For each resource type (e.g. LUT, FFs, BRAM) the requirement of the computation module is less than the capacity of a partition
4. Based on the allocation, the computation module(s) allocated to a partition are wrapped around a standard computation template, compiled and are configured into the partition using partial reconfiguration technology.
5. The configuration data comprising of valid destination addresses for each PR region and their bandwidth of the interconnect are updated in the register file.
6. The user data is sent from the CPU to the respective partition for processing and results are sent back to the CPU over the PCIe.
7. If all the computation modules do not fit into the available partitions, the remaining ones are run on the CPU until one or partitions become available.
8. Upon finishing the processing of current user data in the pipeline, the manager configures the remaining modules on the newly available partition using step-3. If relatively long reconfiguration overhead is permissible, the whole dataflow can be reoptimized for the available number of partitions and are then reconfigured.

Receive Port

Figure 4:
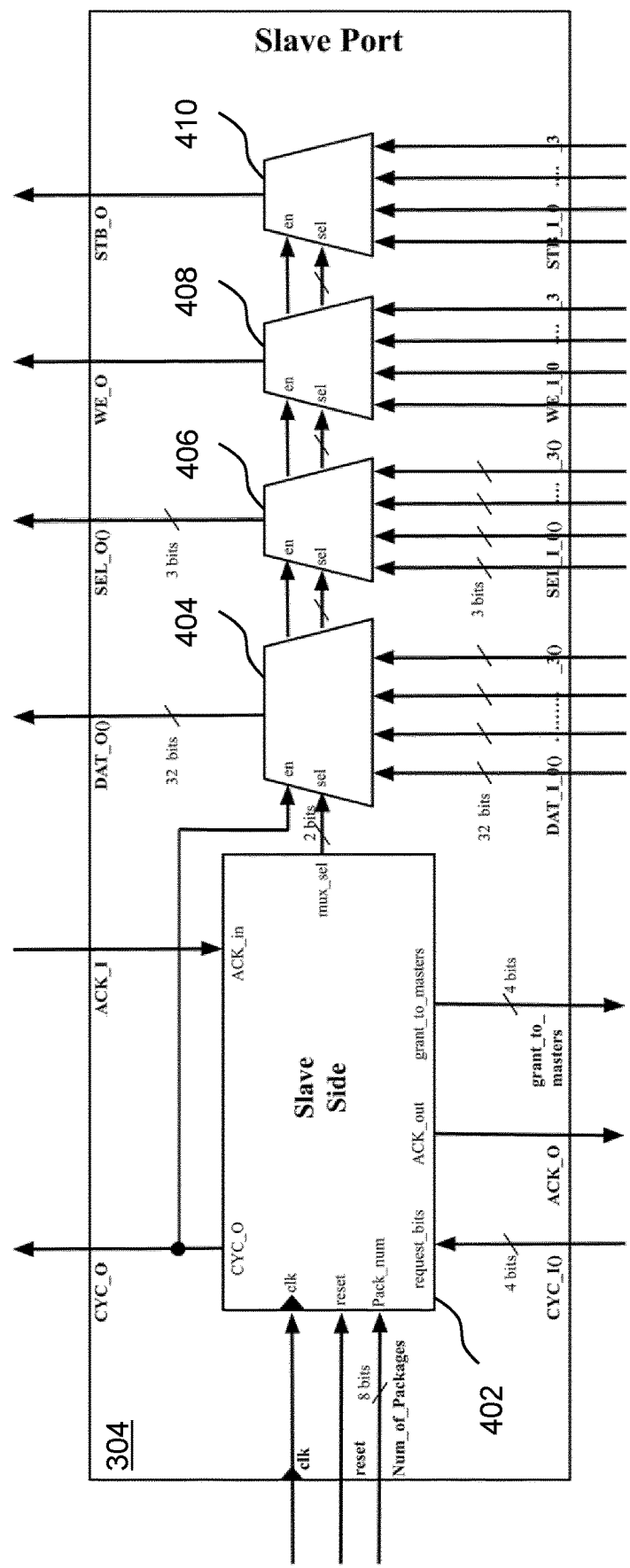
FIG. 4 shows a block diagram of an exemplary implementation of a receive port of a crossbar switch.

FIG. 4 shows a block diagram of an exemplary implementation of the receive port 304. The receive port 304 comprises a receive side 402 and four multiplexers 404-410. Lines from the transmit interfaces 106 are input to the multiplexers 404-410. Each multiplexer 404-410 comprises an input line from each transmit interface 106. Since there are four transmit interfaces 106 in this example, each multiplexer 404-410 has four input lines. In the illustrated example, one multiplexer is provided per type of line. The incoming lines for multiplexers 404-410 comprise data lines (DAT), memory select lines (SEL), read/write operation indicator (WE) and strobe line (STB) respectively. Each multiplexer 404-410 is operable to select, from one of four input lines, one line to output from the first receive port 304. The multiplexers 404-410 thus effectively operate as switches for the crossbar switch 104.

For example, the first multiplexer 404 is connected to four data lines, each data line being connected to a respective transmit interface 106. The first multiplexer 404 is operable to select one of the data lines to output to the first transmit interface 106a.

Figure 5:
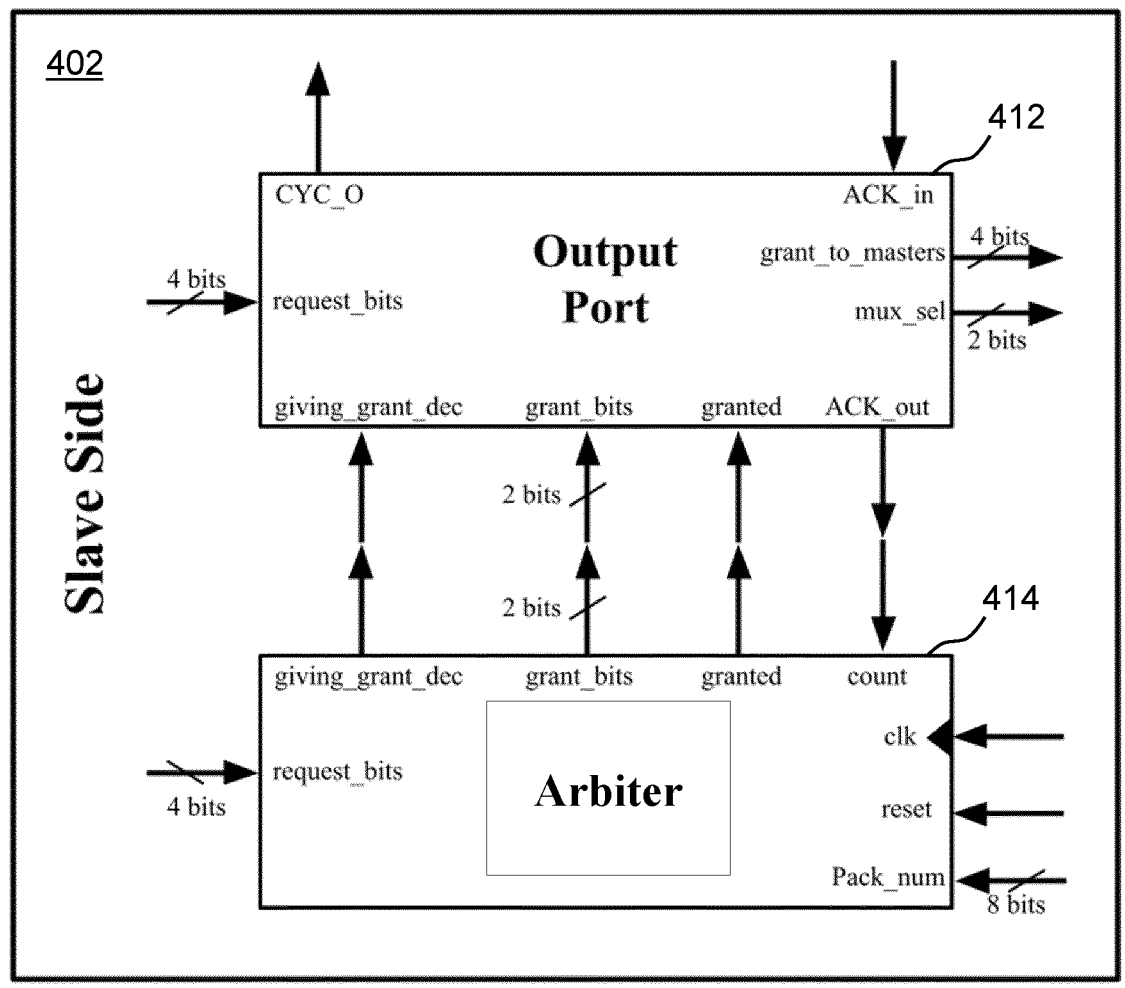
FIG. 5 shows a block diagram of an exemplary implementation of a receive side of a receive port.

An exemplary implementation of the receive side 402 is shown in in FIG. 5. The receive side 402 comprises an output port 412 and an arbiter 414. The output port 412 is operable to configure the multiplexers 404-410. Thus, the output port 412 controls the outputs of the receive side 402 by instructing each multiplexer to select one of its incoming signals to output.

The arbiter 414 is operable to receive a request for communication from at least one of the transmit ports (e.g. from any of the transmit ports associated with the other reconfigurable regions 102b-102d). Based on a communication request received from a transmit port of a particular reconfigurable region, the arbiter 414 is operable to schedule a communication grant for the particular reconfigurable region. The arbiter 414 transmits the grant to the output port 412. The output port 412 configures the multiplexers to select the lines corresponding to the transmit port (from which the request was received). The output port 412 thus operable to, in effect, configure the multiplexers 404-410 to connect the transmit port (from which the request was received) to the first region 102a.

The output port 412 also outputs the grant to the transmit port. The output port 412 thus notifies the transmit port that its request for communication has been granted.

Scheduling Communication Grants

The skilled person will appreciate that there are various ways in which the arbiter 414 may schedule communication grants. Arbitration can play an important role in the performance of the crossbar switch 104 since the arbiter effectively allocates the bandwidth of the crossbar switch 104 to the transmit interfaces 106 of the reconfigurable regions 102.

In one example, the arbiter 414 is operable to schedule communication grants using a round robin scheduler. Round robin scheduling is well-known in the art thus will not be discussed in detail here. Briefly, in round robin scheduling, each transmit interface 106 is granted access in a circular order, with each transmit interface 106 having access for an equal period of time or equal number of transmissions. If a transmit interface does not have a request when its turn comes, the scheduler can pass to the next transmit interface without wasting the allocated time slot. This provides fair bandwidth allocation and means that each transmit interface can reliably predict the maximum time it will have to wait before its next opportunity to transmit.

A round robin may be particularly effective when the processing for an application is distributed across the reconfigurable regions 102 in a manner in which performance is optimised when each transmit interface 106 has an equal bandwidth grant.

However, in practice, different reconfigurable regions 102 may have different bandwidth requirements depending on the tasks they are performing. For example, some applications may require specific transmit interfaces 106 to have higher bandwidth grants since they output more frequently. Thus, in alternative examples, the arbiter 414 may be operable to schedule a communication grant for a particular reconfigurable region based on a bandwidth allocation of that reconfigurable region.

The arbiter 414 may use a weighted round robin scheduler to schedule communication grants based on one or more bandwidth allocations, for example. A weighted round robin scheduler operates in a similar way to a round robin scheduler, except that different transmit interfaces 106 can be assigned different bandwidths. A weighted round robin scheduler thus provides a more flexible way of scheduling communication grants which can be adapted to the needs of different applications.

Using the weighted round robin scheduler, each transmit interface 106 may be permitted to communicate across the crossbar switch for a respective period of time, in which the respective period of time is determined based on a bandwidth allocation for the reconfigurable region associated with that transmit interface 106.

In alternative examples, each transmit interface 106 may be permitted to send a respective number of packages (e.g. packets) over the crossbar switch, in which the number of packages is determined based on a bandwidth allocation for the reconfigurable region associated with that transmit interface. The arbiter 414 may thus be operable to count a number of packages transmitted by each transmit interface 106. When the maximum number of packages for a particular transmit interface is reached, the arbiter 414 switches to the next transmit interface 106 and resets the package counter.

In either case, the bandwidth allocation for the transmit interfaces 106 may be stored in a register of the FPGA 100. The register may be the register 216 described above in respect of FIG. 2, for example. Thus, for example, the register 216 may store a maximum number of packages that each transmit interface is permitted to transmit. The register 216 may be configured with the bandwidth allocation(s) of the reconfigurable region(s) by the resource manager, for example.

Thus, in some examples, different transmit interfaces 106 (and thus different reconfigurable regions 102) may be permitted to transmit for different periods of time. In another example, different transmit interfaces 106 may be permitted to send different numbers of packages (or packets). For example, the first transmit interface 106a may be permitted to send up to 10 packages in one cycle of the scheduler, whereas the second transmit interface 106b may only be permitted to send up to 5 packages per cycle.

By providing each receive port with its own arbiter 414, the scheduling of transmissions across the crossbar switch 104 can be effectively decentralised. In a crossbar switch, multiple communications can happen simultaneously between different transmit and receive interfaces. Arbitrating these communications using one centralised arbitrator would require complex logic to monitor and handle multiple communications in parallel. Providing decentralized arbiters to handle requests of one receive port (e.g. rather than all receive ports at once) decreases the design complexity of the arbiter 414. This also allows for enabling multicast data transmission, which is discussed in more detail below in respect of FIGS. 27-28. Since each receive port is provided with its own arbiter, transmit ports can issue different requests to different target receive ports and each arbiter can handle its own requests.

Scheduler Implementation

The skilled person will appreciate that there are various ways of implementing a round robin or weighted round robin scheduler. For example, the arbiter 414 may be implemented using a priority encoder. To decrease the area usage of the arbiter 414, examples of the disclosure may implement the scheduler using a leading zero counter (LZC).

Priority encoders report the identifier of transmit port for a communication grant using one-hot-coding addresses. This means that additional encoder logic is required to convert the addresses to binary addresses. In contrast, LZCs report the output using binary addresses directly, which eliminates the need for further encoding logic. LZCs provide the further benefit of enabling the scheduler to operate at higher frequencies.

LZCs count the number of zeros before the first high bit appears. For example, an input of "0011" would give an output of 2-"10". Priority encoders, on the other hand, report the location of the most significant high bit in one-hot encoding form which is then converted to binary addressing; an input of "0011" would give an output of "0001", then 0. Thus, a priority encoder may be replaced with an LZC by providing inputs in a reverse form. In other words, if an input is "0011", it will be provided as "1100", then LZCs will give the same output as priority encoders which is 0. Further details regarding LZCs can be found in Oklobdzija, V. G. "An Algorithmic and Novel Design of a Leading Zero Detector Circuit: Comparison with Logic Synthesis." IEEE Transactions on Very Large Scale Integration (VLSI) Systems, vol. 2, no. 1, 1994, pp. 124-128., doi: 10.1109/92.273153, for example.

Figure 6:
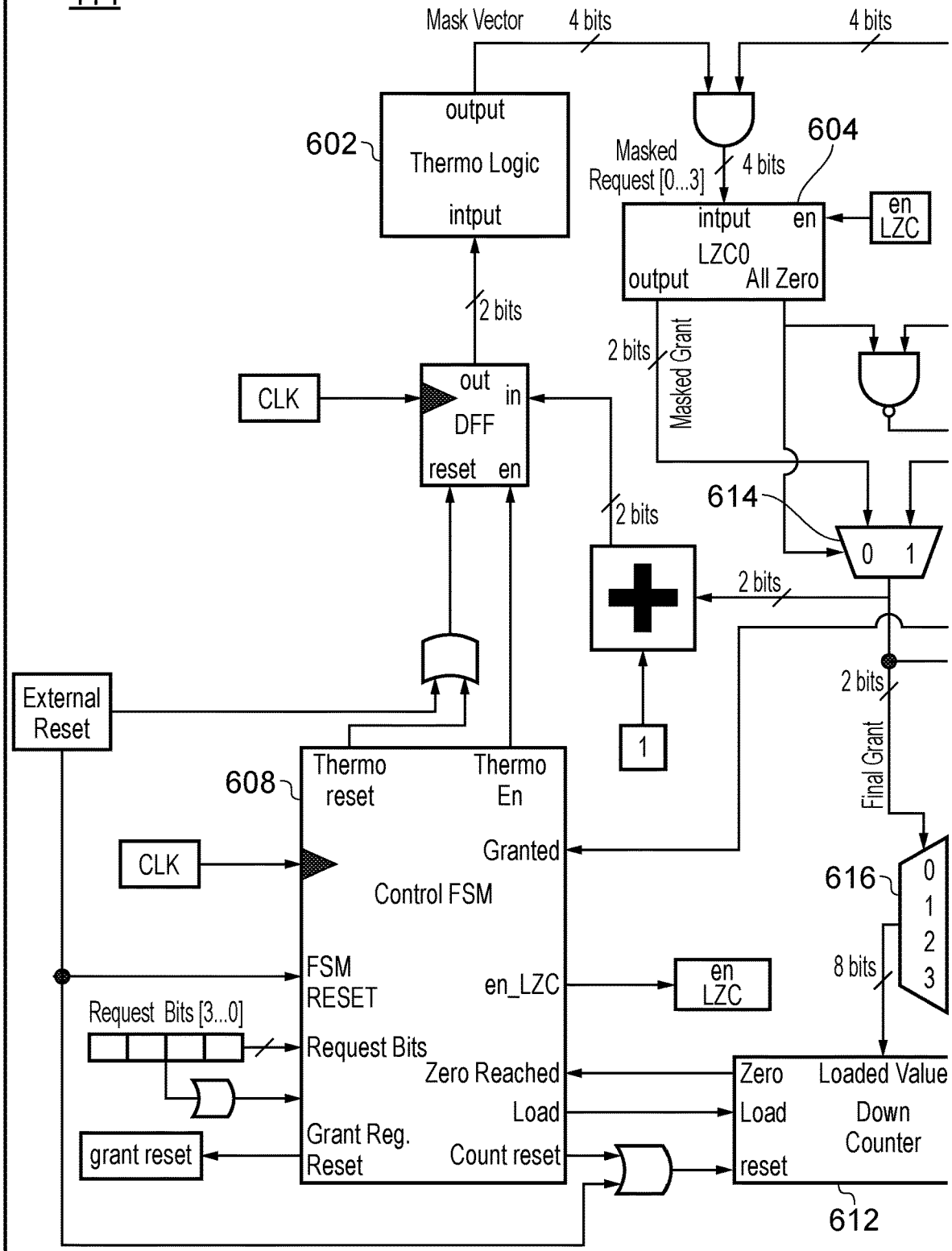
FIG. 6 shows a block diagram of an exemplary implementation of an arbiter
Figure 6:
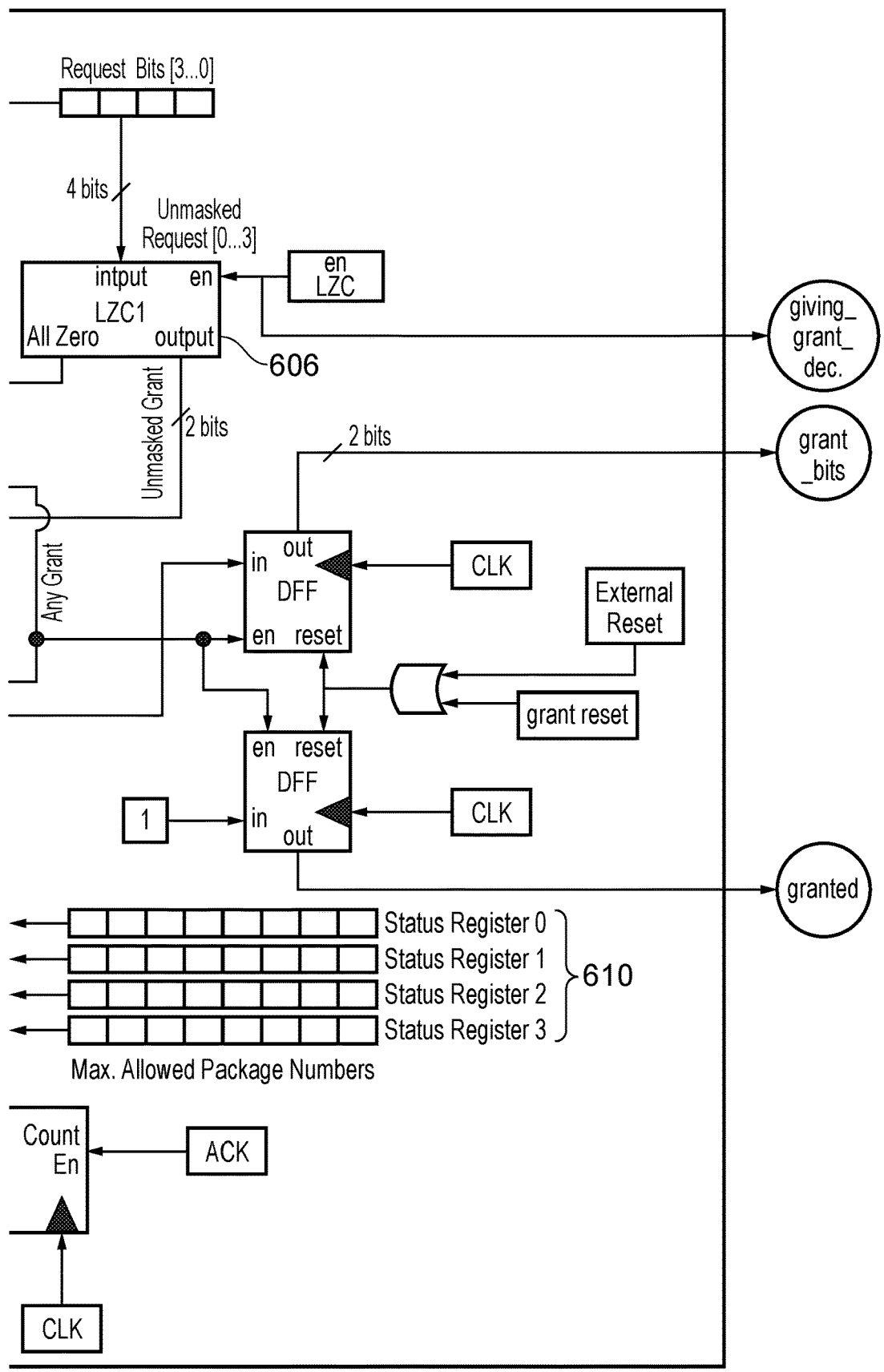

A block diagram of an example implementation of the arbiter 414 that uses an LZC to implement weighted round robin scheduling is shown in FIG. 6. This arbiter 414 is for scheduling communication grants for any of four transmit ports. However, the skilled person will appreciate that, in general, the arbiter 414 may be adapted to receive and arbitrate requests from fewer or more ports.

As this arbiter 414 may be used in the receive side 402 discussed in respect of FIG. 5, the operation of the arbiter 414 is discussed in the context of the receive side 402. However, the skilled person will appreciate that this arbiter has applications other than as an arbiter for the receive side 402.

As shown in FIG. 6, the arbiter 414 comprises: a ThermoLogic unit 602, a first LCZ unit (LZC0) 604 and a second LCZ unit (LCZ1) 606, a control unit 608 (labelled Control FSM, Finite State Machine), status registers 610 for each of the transmit ports, a down counter 612, a first multiplexer 614 and a second multiplexer 616.

Figure 7:
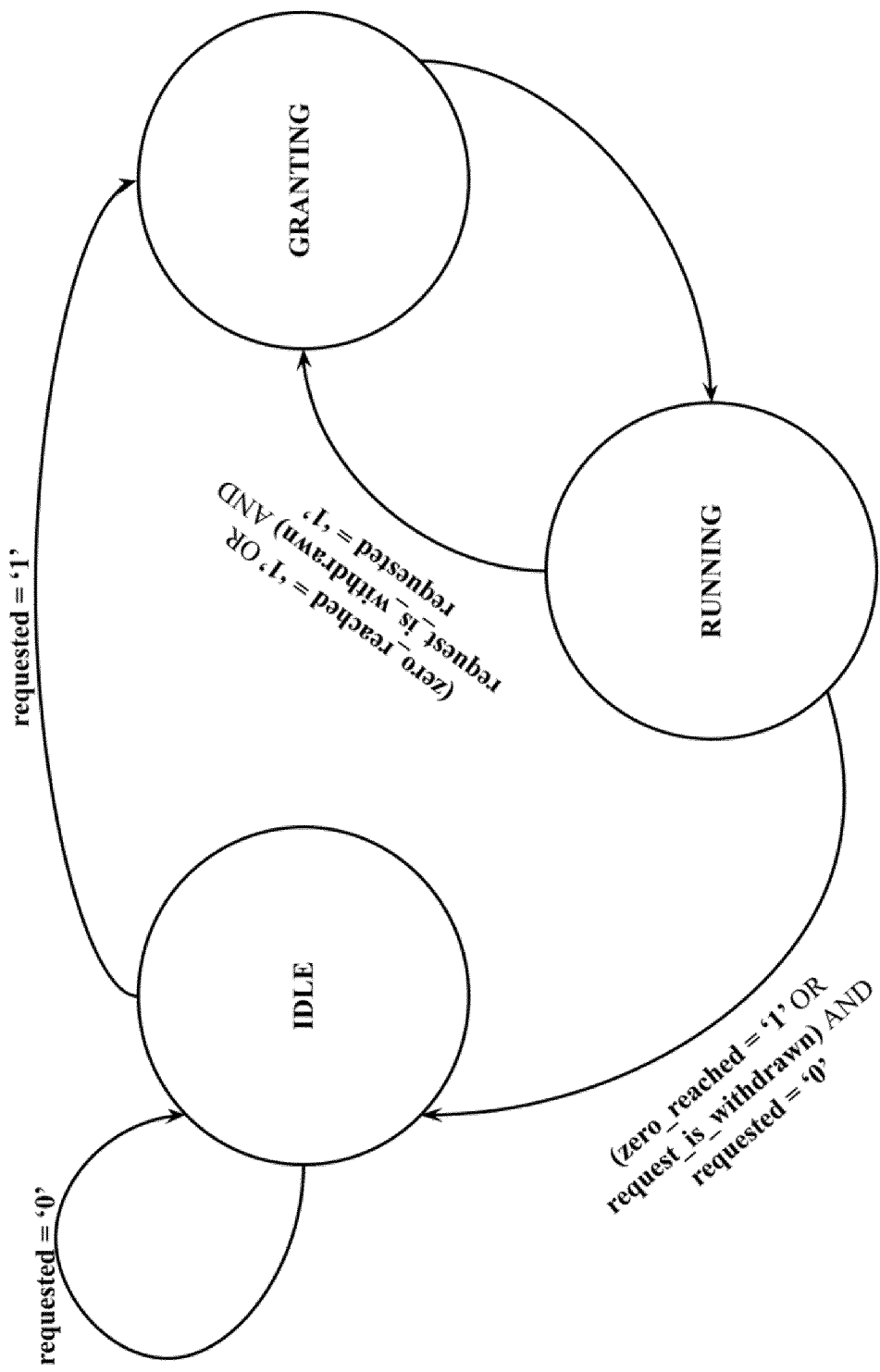
FIG. 7 shows control logic of an exemplary arbiter
Figure 8:
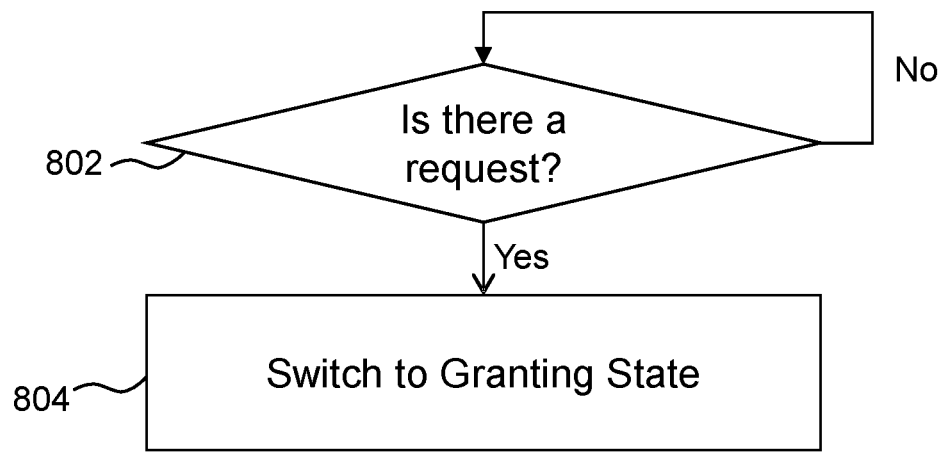
FIGS. 8-10 show flowcharts of an exemplary method performed by an arbiter.

FIG. 7 shows the control logic of the arbiter 414. As shown in FIG. 7, the grant process can be thought of as comprising three states: an idle state, a granting state and a running state. These operations that may be performed in each state are shown in the flowcharts illustrated in FIGS. 8-10.

The grant process begins in step 802, in which the arbiter 414 determines whether or not a request for communication has been received. Until a request is received, the arbiter 414 remains in the idle state. In response to receiving a request, the process proceeds to step 804, in which the arbiter 414 switches to the grant state.

Figure 9:
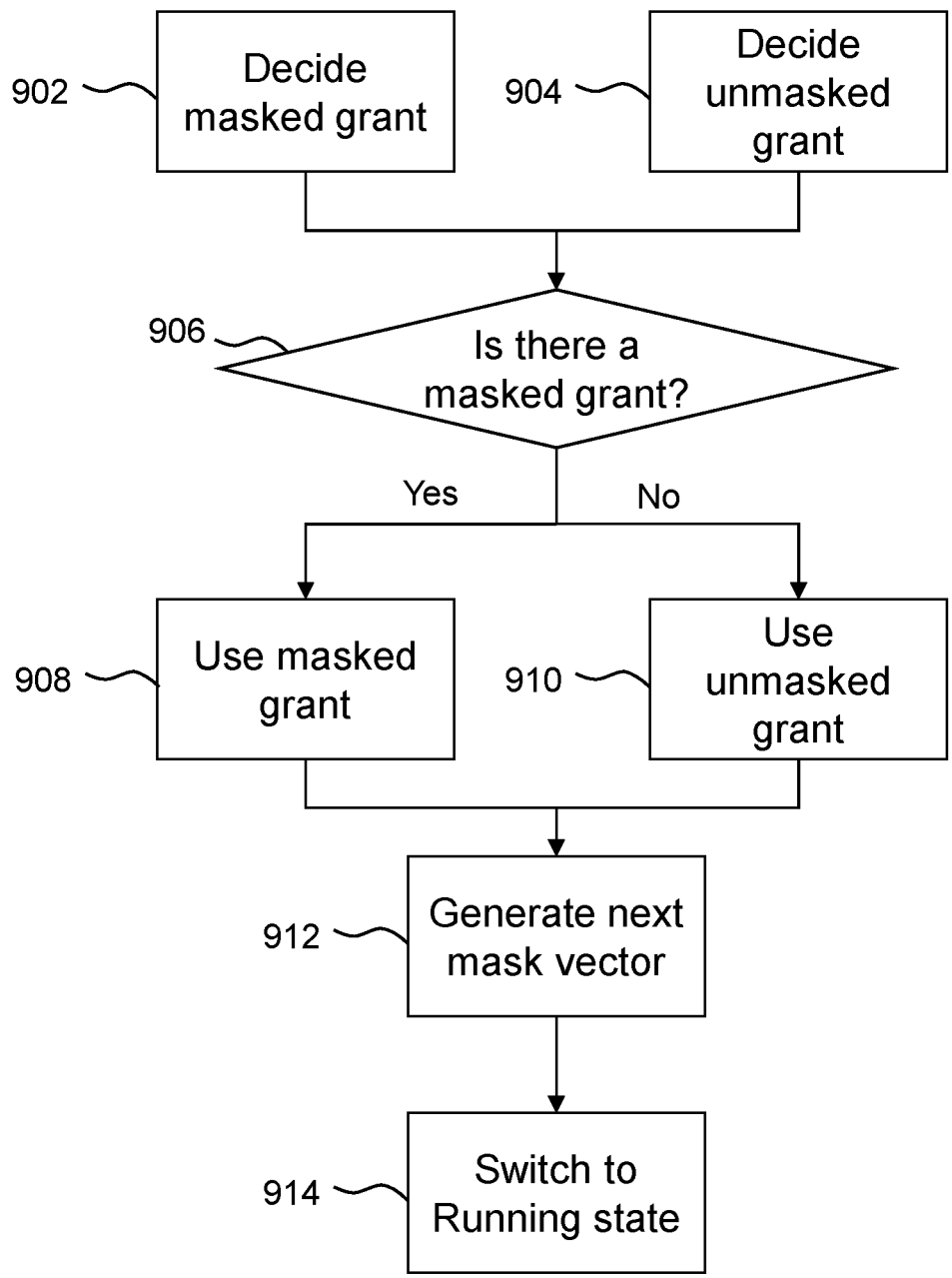

The operation of the arbiter 414 in the grant state is illustrated by the flowchart in FIG. 9.

In response to receiving the request, the request (or equivalently, the request bits) is input to the ThermoLogic unit 602. The ThermoLogic unit 602 masks the request bits using masked vector bits, in which the masked vector bits are determined based on a previous grant decision.

In step 902, the first LZC, LZC0, 604 determines a masked grant based on the masked request bits and the request bits. The first LZC 604 outputs the masked grant to the first multiplexer 614.

In step 904, the second LZC, LZC1 606 determines an unmasked grant based on the request bits. The second LZC 606 outputs the unmasked grant to the first multiplexer 614.

The inputs to the LZCs 604, 606 are provided in reverse form (e.g. in little endian form).

In step 906, the first multiplexer 614 determines whether or not it has received a masked grant from the LZCs 604, 606. The first multiplexer 614 preferentially selects the masked grant. Thus, if a masked grant is provided by LZC0 604, the masked grant is used as the final grant in step 908. Alternatively, if no masked grant is provided, the unmasked grant from LZC1 606 is used as the final grant in step 910.

In step 912, the ThermoLogic unit 602 determines a next mask vector based on the final grant. The generated mask vector may be used, by the ThermoLogic unit 602, to mask a subsequent request, for example.

Whilst the arbiter 414 is determining the grant in the granting phase, it can output a giving_grant_dec signal to the output port 412, indicating to the output port 412 that the arbiter 414 is still determining the grant. This can prevent the output port 412 from sending a grant bit to a transmit port when registers still hold the values of the previous grant.

In step 914, the arbiter 414 outputs the final grant using the grant bits signal and switches to the running state. The granted signal is also output from the arbiter to indicate the validity of the grant.

Figure 10:
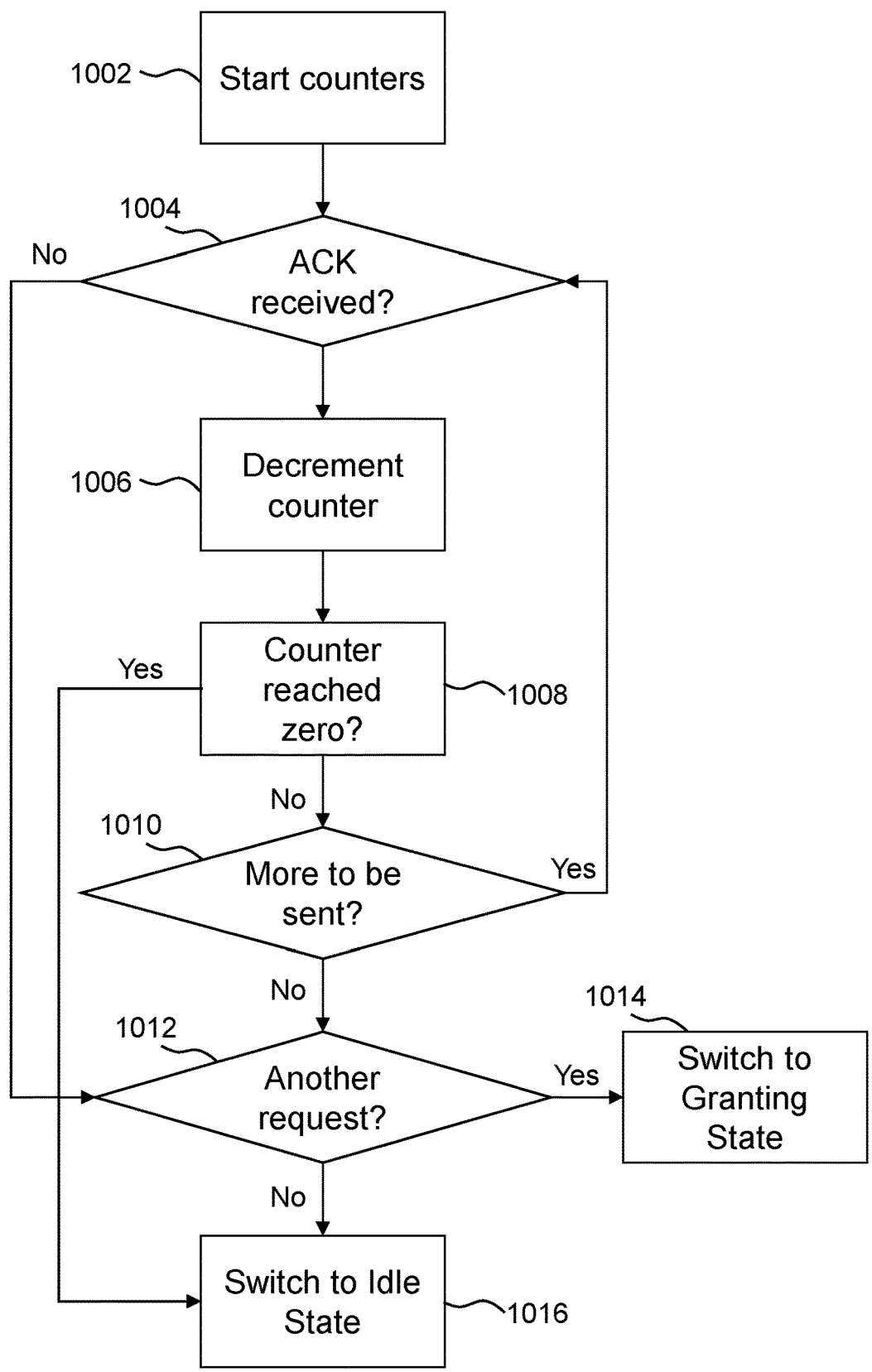

The operation of the arbiter 414 in the running state is illustrated by the flowchart in FIG. 10.

The first multiplexer 614 outputs the final grant to the second multiplexer 616. The second multiplexer 616 is connected to the status registers 610 of the transmit ports of the crossbar switch 104. The status registers 610 indicate the maximum number of packages each transmit port is permitted to send (e.g. according to a bandwidth allocation). In response to receiving the final grant, the second multiplexer 616 selects the status register 610 of the transmit port for which a grant has been scheduled and outputs the information from that status register 610 to the down counter 612. The second multiplexer 616 thus transmits the value of the maximum number of packages for the transmit port to the down counter 612.

In step 1004, the down counter 612 initialises its counter to the value of the maximum of packages received from the second multiplexer 616.

Each time the transmit port has written or read a package from the receive port 304, the receive port 304 sends an acknowledgement signal to the arbiter 414 via the output port 412. In response to receiving an acknowledgement signal in step 1004, the down counter 612 decrements its counter in step 1006 (e.g. decreases the value of the counter by one). In this way, the down counter 612 counts the number of packages that have been sent to or received from the receive port 304.

If, in step 1008, the counter reaches zero (e.g., indicating that the maximum number of packages has been reached), the process proceeds to step 1016, in which the arbiter 414 switches to the idle state. The process may thus return to step 802, in which the arbiter 414 waits for another request.

Alternatively, if the counter does not reach zero in step 1008, the method proceeds to step 1010, in which the arbiter determines whether or not there is more data waiting to be sent or received by the transmit port. In response to determining that there is more data to be communicated (e.g. sent or received) in step 1010, the process may return to step 1004 in which the arbiter 414 waits for receipt of another acknowledgement from the output port 412.

In response to determining that there is no more data to be communicated (e.g. the transmit port has sent all of the data in its buffers), the process may proceed to step 1012, in which the arbiter 414 determines whether or not another request has been received. The request may be received from the same transmit port or a different transmit port. In response to receiving another request, the arbiter 414 returns to the granting state in step 1014. Thus, for example, the arbiter 414 may determine the masked and unmasked grants in steps 902, 904 in response to receiving another request in step 1012.

If no request is received, the process may proceed to step 1016, in which the arbiter switches to the idle state and returns to step 802.

In one example, the arbiter 414 receives requests from two transmit interfaces (via their transmit ports): transmit interface 0 and transmit interface 2 (e.g. the first transmit interface 106a and the third transmit interface 106c). An exemplary iteration of the grant process for this example is as follows:

1. CONTROL UNIT 608 switches to "GRANTING" state from "IDLE" enabling LZCs 604, 606.
2. Output of ThermoLogic Unit 602 is initially zero; thus, the masked request and input of LZC0 604 is zero. The input of LZC1 606 is "1010" (reverse form of "0101").
3. LZC1 606 gives the grant to transmit interface 0 since there is 0 number of leading zeros in the provided input; thus, grant bits become "00" and they are stored in DFFs.
4. Grant bits select input load value to the counter through the second multiplexer 616 and the down counter 612 is initialized. The output port configures the multiplexers of the receive port 304 to receive data from transmit interface 0.
5. As the down counter 612 receives an acknowledgement signal from the receive port 304 it decreases its value. When it reaches zero, it signals to the CONTROL UNIT 608 to switch to "GRANTING" phase again to make a new grant decision. Alternatively, the current transmit interface can withdraw its request, making the CONTROL UNIT 608 switch to "GRANTING" phase.
6. Since the ThermoLogic unit 602 has an input "01" which is an increment of the previous grant "00", it generates the mask vector of "1110". In general, the ThermoLogic unit 602 generates vector bits whose least significant bits are zeros and most significant bits are ones; the number of zeros is decided by the input.
7. The input to LZC0 604 input becomes "0010" in this case (since 0101 AND 1110=>0100) and it outputs 2 which means transmit interface 2 is granted. LZC1 606 gives grant decision to transmit interface 0 again. However, due to there being a valid grant as LZC0 604 (e.g. due to there being a masked grant), the grant decision of LZC0 604 is taken instead of the grant decision of LZC1 606. Therefore, transmit interface 0 is not granted again although it still requests a receive port. No cycle is wasted on transmit interface 1 since it has not made a request.

Output Port

Figure 11:
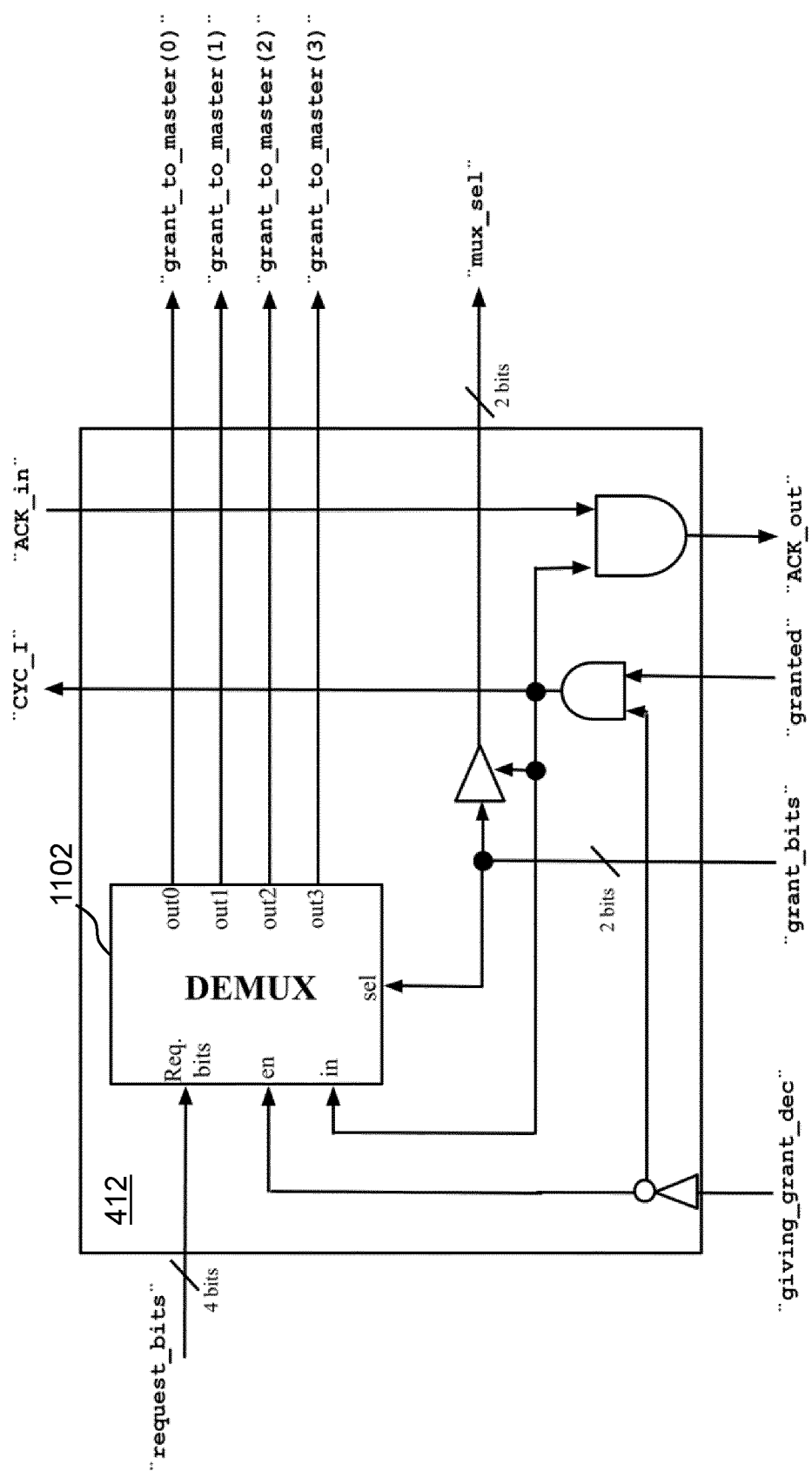
FIG. 11 shows a block diagram of an exemplary implementation of an output port of a receive side.

FIG. 11 shows a block diagram of an exemplary implementation of the output port 412 of the receive side 402. The output port 412 comprises a demultiplexer 1102. The demultiplexer 1102 is operable to receive a request for communication (request_bits) from a transmit port. The demultiplexer 1102 is further operable to receive the giving_grant_dec, grant_bits and granted signals described above in respect of FIGS. 5-10.

The demultiplexer 1102 can be activated or deactivated by the giving_grant_dec signal. The giving_grant_dec signal indicates to the demultiplexer 1102 whether or not the arbiter 414 is in the granting phase discussed above. Whilst the giving_grant_dec signal indicates that the arbiter 414 is in the granting phase, the demultiplexer 1102 remains deactivated (inactive). In response to the giving_grant_dec signal indicating that the granting phase is no longer ongoing (e.g. is complete), the demultiplexer 1102 activates.

The demultiplexer 1102 can also be activated or deactivated by the request_bits signal received from a transmit port. If the transmit port withdraws the request_bits signal, the demultiplexer 1102 determines that the request communication is no longer needed and deactivates itself.

When the arbiter 414 determines a communication grant, this is communicated to the output port 412 using the grant_bits signal. The granted signal can be used to indicate that this grant is valid. When a valid grant signal is received from the arbiter 414, the output port 412 enables a receive port using the CYC_I signal. Thus, the output port 412 may forward the grant_bits signal over CYC_I to enable the receive port 304.

The output port 412 is further operable to forward acknowledgement signals received from the receive interface 108a to the arbiter 414. Thus, the output port 412 is operable to forward an incoming acknowledgement signal (ACK_IN) to the arbiter 414, which allows the arbiter 414 to track the number of packages that have been communicated. The output port 412 is further operable to forward acknowledgement signals to the transmit port which is sending the data (e.g. the transmit port that sent the request).

The output port 412 is further operable to transmit the communication grant (grant_bits) to the multiplexers 404-410 in the receive port 304 (signals labelled grant_to_master (0) etc.). The output port 412 can thus configure the multiplexers 404-410 to select the lines corresponding to the transmit port for which communication has been granted.

Transmit Port

Figure 12:
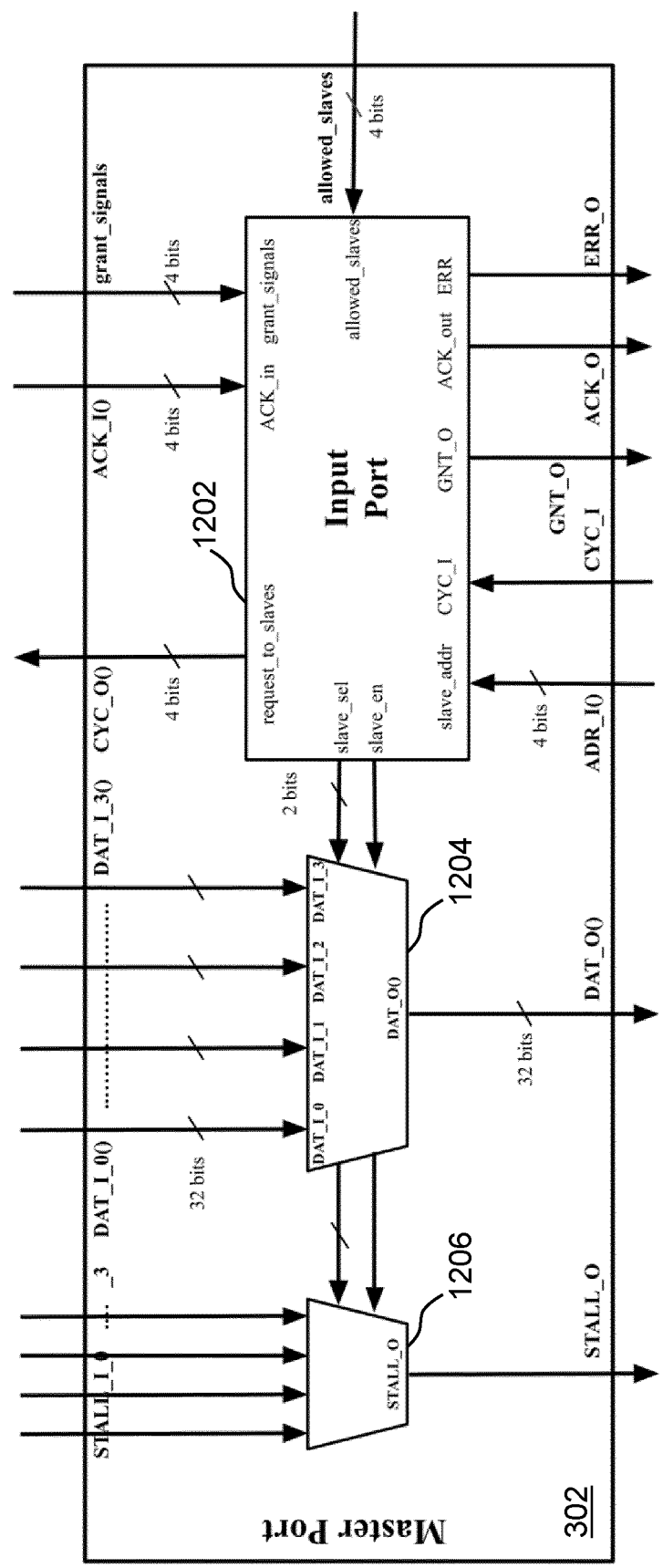
FIG. 12 shows a block diagram of an exemplary implementation of a transmit port of a crossbar switch.

FIG. 12 shows a block diagram of an exemplary implementation of the transmit port 302. As discussed above, the transmit port 302 is connected to the transmit interface 106a and each of the receive ports in the crossbar switch. Thus, in order to transmit or read data from one of the reconfigurable regions, the transmit interface 106a sends a request for communication to the transmit port 302, which sends the request to the receive port of the reconfigurable region.

The transmit port 302 comprises an input port 1202, a first multiplexer 1204 and a second multiplexer 1206.

The operation of the input port 1202 is discussed in more detail below in respect of FIG. 13. Briefly, the input port 1202 is operable to receive a request for communication from the transmit interface 106a. In the illustrated example, the request for communication comprises an address (slave_addr) of the receive port that the transmit interface 106a wants to communicate with (e.g. wants to send data to). The input port 1202 can send a request for communication (request_to_slaves) to the receive port identified by the address.

The input port 1202 is further operable receive, in response to the request for communication, a communication grant (grant_signals) and one or more acknowledgement signals (ACK_I0) from the receive ports. Receiving these signals at the input port 1202 simplifies implementing multicast communication across the crossbar switch. However, the skilled person will appreciate that the present disclosure is not limited as such. For example, in alternative examples, third and fourth multiplexers may be provided for selecting amongst the acknowledgement signals and communication grants from the receive ports.

The first multiplexer 1204 is a 32-bit four-to-one multiplexer which is operable to select amongst incoming data lines from the receive ports in the crossbar switch 104. The input port 1202 is operable to control the first multiplexer 1204 to select a data line from the incoming data lines. The input port 1202 controls the first multiplexer 1204 by sending a select signal (slave_sel) to the first multiplexer 1204, indicating which data line to select. The input port 1202 is also operable to send an enable signal (slave_en) from the input port 1202, in which the enable signal is operable to enable (activate) or disable (deactivate) the first multiplexer 1204.

The second multiplexer 1206 is four-to-one multiplexer which is operable to select amongst incoming STALL lines from the receive ports.

Input Port

Figure 13:
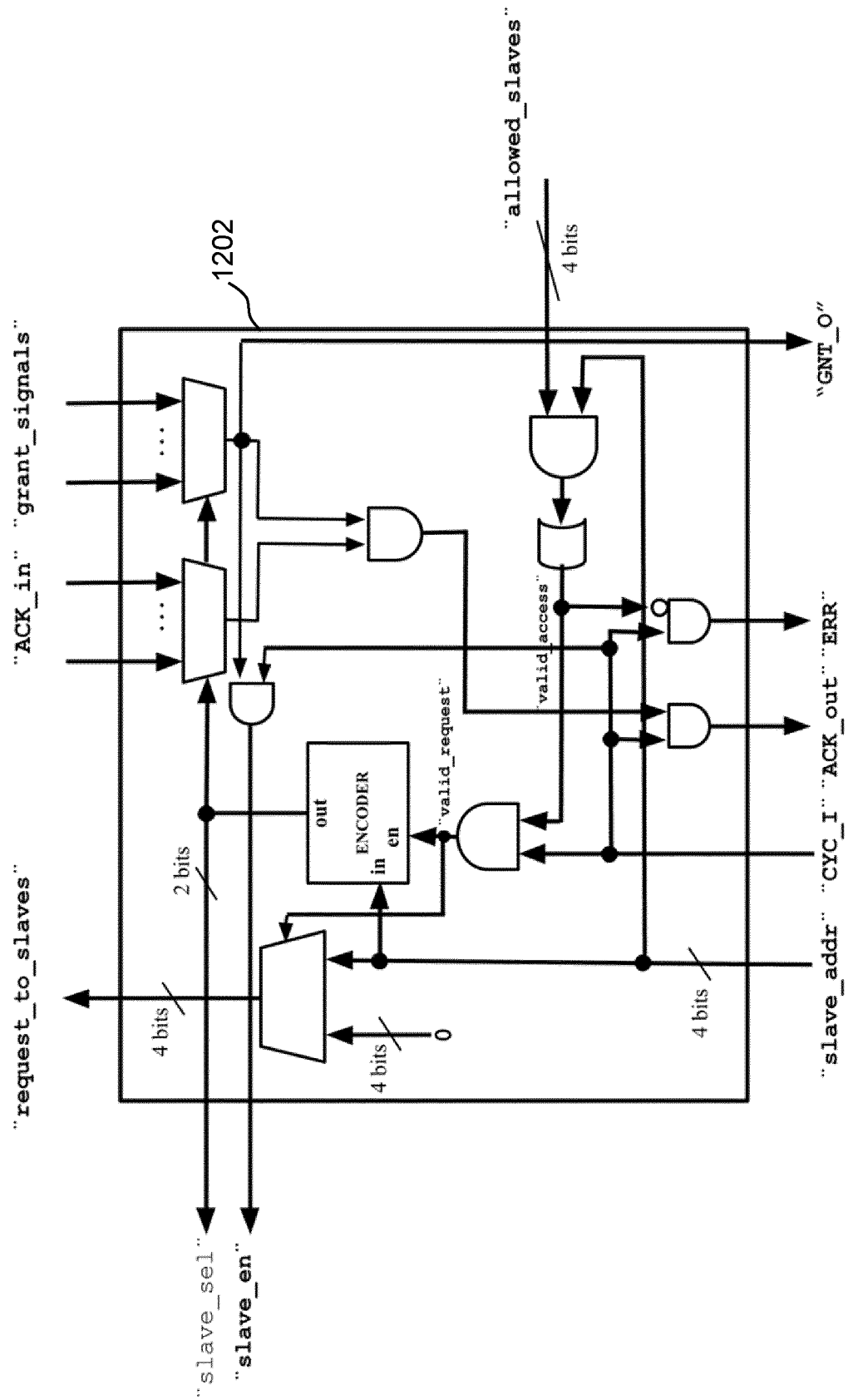
FIG. 13 shows a block diagram of an exemplary implementation of an input port of a transmit port.

FIG. 13 shows a block diagram of an exemplary implementation of the input port 1202. As mentioned above, the input port 1202 is operable to receive one or more communication requests from the transmit interface 106a. The input port 1202 is further operable to determine whether or not to send the communication requests to the receive port(s) identified in the communication requests based on permission information indicating which of the plurality of regions are permitted to communicate with each other. In the example illustrated in FIG. 13, the permission information is labelled allowed slaves. The input port 1202 may receive the permission information from a register in the FPGA 100, such as the register 216, for example.

The permission information for the transmit port 302 may comprise a plurality of bits, each bit corresponding to one of the receive ports. Each bit in the plurality of bits may indicate whether or not the transmit port 302 is permitted to communicate with a respective one of the receive ports. For example, setting a bit for a receive port to 1 may indicate that the transmit port 302 is permitted to communicate with that receive port, and setting a bit for another receive port to 0 may indicate that the transmit port 302 is not permitted to communicate with the other receive port. Thus, for example, allowed_slaves=0110 may indicate that the transmit port 302 is permitted to communicate with receive ports 1 and 2, but not with receive ports 0 and 3.

The input port 1202 may determine whether to send the communication requests to the receive port(s) identified in the communication requests by comparing the permission information with the addresses of the receive ports. In particular examples, each address may be represented using a plurality of bits, in which each bit is associated with a respective receive port. The addresses may be encoded using one-hot encoding, such that only one bit in the plurality of bits is permitted to be high (e.g. set to 1). The position of the high bit indicates which receive port the address is for. This can simplify determining whether or not the transmit port 302 is permitted to communicate with a particular receive port. When this approach is used for the addresses of the receive ports and the permission information comprises a plurality of bits corresponding to the receive ports, the input port 1202 can determine whether or not the transmit port 302 is permitted to communicate with a receive port by inputting the permission information and the address of the receive port into an AND gate. If the result is 0, it means the transmit port 302 (and thus the transmit interface 106a) is not permitted to communicate with that receive port. This is implemented in the input port 1202 shown in FIG. 13; the allowed_slaves signal and the slave_addr signal are input to an AND gate to validate the request for communication.

This approach for representing the addresses of the receive ports has further benefits when implementing multicast communication over the crossbar switch. This is discussed in more detail below in respect of FIGS. 27-28.

By determining whether or not to forward the request for communication to a receive port based on the permission information, the input port 1202 prevents the transmit port 302 (and thus the transmit interface 106a) from communicating with reconfigurable regions that it is not permitted to communicate with. This can be used to isolate communications between different applications running on the same FPGA, for example.

Validating the request for communication at the transmit port 302 also has advantages. If, for example, the request for communication was instead validated at the receive port (e.g., at the destination), the registers serving all the ports of the crossbar switch would need to be updated each time one of the reconfigurable regions was reconfigured. By validating the request at the transmit port 302, only the register(s) of the transmit ports which serve the updated region and regions on which the same application is running would need to be updated. This reduces the overhead of reconfiguration process.

This approach also reduces traffic for receive ports. To illustrate this advantage, consider a situation in which the transmit interface 106a sends a request to start sending data to a receive port which it should not have access to. If validation is implemented at the receive port, the receive port may only check whether or not the transmit interface 106a is permitted to send data after the grant has been issued. This wastes clock cycles since the arbiter in the receive port may have made a grant decision on an invalid communication request. In addition, the receive port may waste time providing error signal for the invalid communication request whilst other valid requests are pending. By validating communication requests at the transmit port 302, communication overhead is reduced on at the receive interface.

Transmit Interface and Receive Interface

Figure 14:
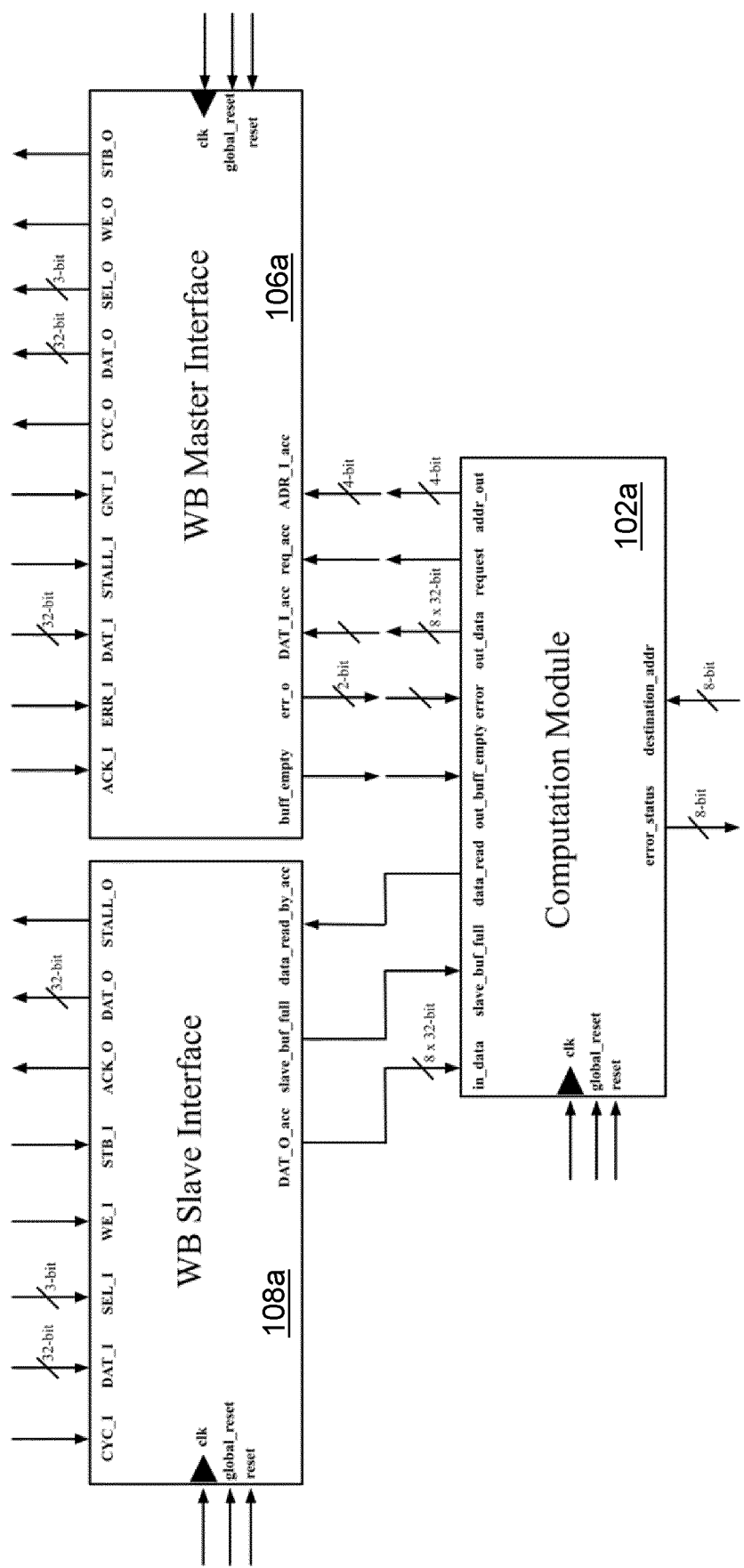
FIG. 14 shows block diagrams of exemplary implementations of a transmit interface and a receive interface connected to a reconfigurable region.

FIG. 14 shows block diagrams of exemplary implementations of the transmit interface 106a and the receive interface 108a connected to the first reconfigurable region 102a.

Table 1 provides descriptions of the signals input and output from the transmit interface 106a and the receive interface 108a.

TABLE 1

| Signal | Description |
| --- | --- |
| DAT_I | Incoming data from a transmit interface or a receive interface. |
| DAT_O | Outgoing data from a transmit interface or a receive interface. |
| CYC_O (transmit) and | Indication of a request. A transmit interface asserts CYC_O signal high and de-asserts when a request is complete. The |

TABLE 1-continued

| Signal | Description |
|---|---|
| CYC_I (receive) | signal is processed by crossbar and directed to a receive interface in the case of a grant. |
| STB_O (transmit) and STB_I (receive) | Indication of an active request. STB_O signal is asserted together with CYC_O. However, if a transmit interface stalls the communication for a brief time, it de-asserts this signal informing a receive interface that it needs to wait. |
| WE_O (transmit) and WE_I (receive) | Identifies whether a transmit interface's request is a read or a write request. If WE_O and WE_I are high, a transmit interface has a write request. Otherwise, the transmit interface has a read request. |
| SEL_O (transmit) and SEL_I (receive) | Target memory/register address of a receive interface where DAT_I/DAT_O should be read/written from/to. |
| ADR_O (transmit) | Address of a target receive interface requested by a transmit interface. Originally, this signal should be sent to the receive interface, too. Nevertheless, it is handled by a crossbar in this work to adjust it to the needs of communication isolation as described above in respect of FIGS. 12-13. |
| GNT_I (transmit) | Indicates that a transmit interface is granted a request. This signal comes from a crossbar. |
| ERR_I (transmit) | This signal indicates that the communication with the receive interface is failed due to invalid address or timed-out response. Originally, ERR_O signal is sent by a receive interface. Nevertheless, in this work, this signal is provided either by a crossbar to support communication isolation as described in respect of FIGS. 12-13 or the transmit interface itself. |
| ACK_O (receive) and ACK_I (transmit) | If ACK_O and ACK_I are high, it indicates that a receive interface has registered/sent incoming/requested data from a transmit interface. This signal may be passed to a crossbar, too, in order to monitor the transferred packages. |
| STALL_O (receive) and STALL_I (transmit) | If STALL_O; thus, STALL_I are high, it indicates that a receive interface has suspended the communication temporarily and the transmit interface needs to wait. |

As described above, one or more of the reconfigurable regions 102 in the FPGA 100 may be operable to, after performing one or more tasks to process data, send one or more of the outputs of those tasks to another reconfigurable region 102 in the FPGA 100. Each reconfigurable region 102 is provided with a respective transmit interface 106 and receive interface 108. Thus, the first reconfigurable region 102a is provided with the transmit interface 106a and the receive interface 108a.

In this example, the transmit interface 106a is operable to initiate a write request to one or more of the receive interfaces. Thus, the transmit interface 106a can request to send one or more of its outputs to one or more of the other reconfigurable regions 102. The transmit interface 106a has an incoming data port from the first reconfigurable region 102a to read data from the first reconfigurable region 102a and deliver it to a receive interface. This data port is labelled DAT_I_acc in FIG. 14.

The receive interface 108a has an outgoing data port (labelled DAT_O_acc) to the first reconfigurable region 102a to send data to the first reconfigurable region 102a. The receive interface 108a may thus receive data from one or more of the transmit interfaces 106b-106d and send the data to the first reconfigurable region 102a.

Receive Interface

Figure 15:
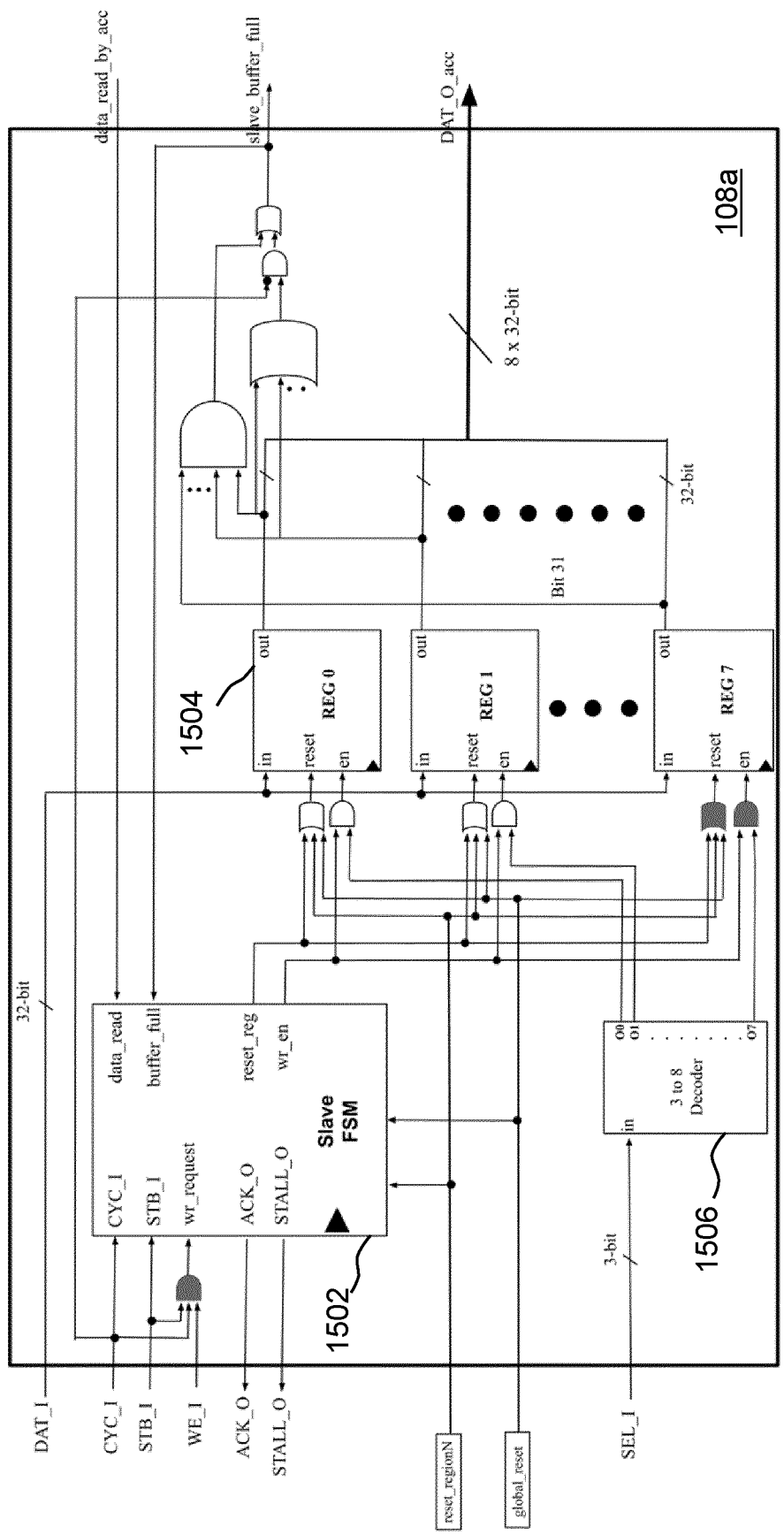
FIG. 15 shows a block diagram of an exemplary implementation of a receive interface.

FIG. 15 shows a block diagram of an exemplary implementation of the receive interface 108a. The receive interface comprises a receive control unit 1502, a plurality of registers 1504 and a decoder 1506. In this example, the receive interface 108a comprises eight registers 1504 since the reconfigurable region 102a is operable to process and transfer eight 32-bit words. However, the skilled person will appreciate that the present disclosure is not limited as such, and the receive interface 108a may in general comprise one or more registers 1504.

The skilled person will appreciate that the receive interface 108a illustrated in FIG. 15 does not have an incoming ADR_I signal from a transmit interface (corresponding to the ADR_O signal from the transmit interface). As described above, examples of the disclosure provide methods for validating communication requests in the transmit port of the crossbar switch, which means it is not necessary to validate communication requests in the receive interface 108a. This eliminates the need to provide the permission information to the receive interface 108a. However, the skilled person will appreciate that the present disclosure is not limited as such and thus, address validation may alternatively be implemented in the receive interface 108a. For example, the receive interface 108a may be provided with an incoming ADR_I line for receiving a destination address from a transmit interface from which a request for communication is received. The receive interface 108a may be operable to validate the communication request by comparing the destination address to permission information as described above in respect of the input port 1202.

Figure 16:
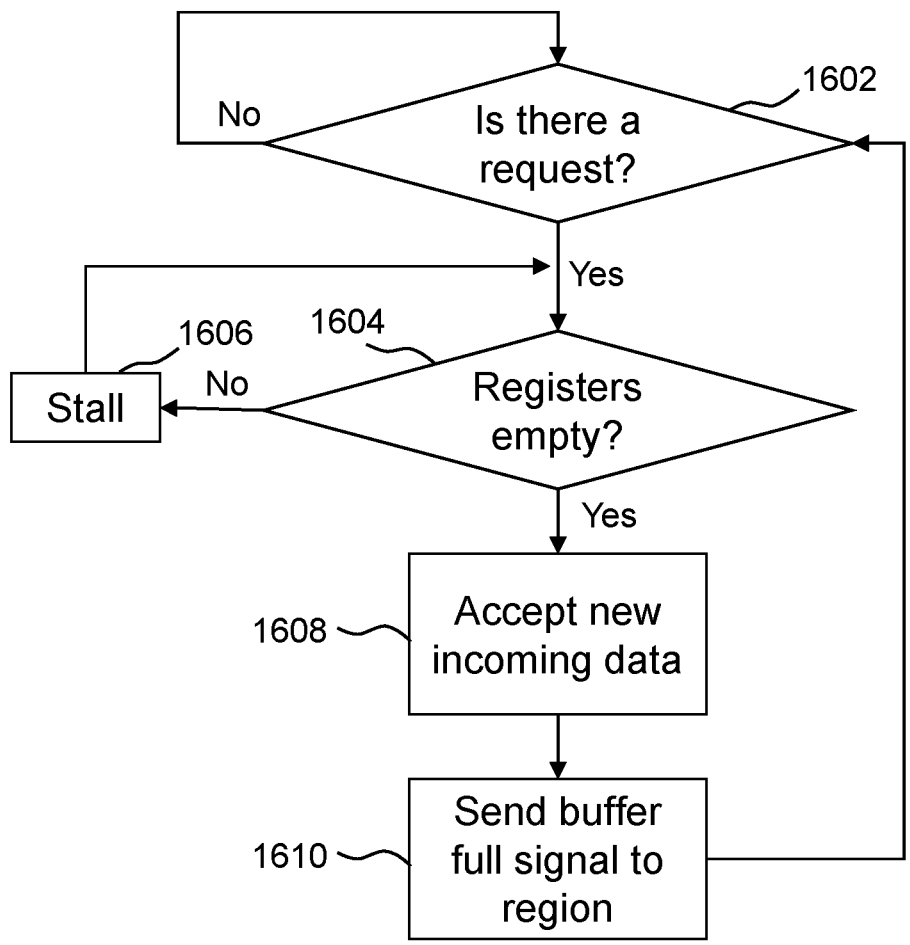
FIG. 16 shows a flowchart of an exemplary method performed by a receive interface.

The operation of the receive interface 108a is described with reference to FIG. 16, which shows a flowchart of an exemplary method performed by the receive interface 108a.

The receive interface is initially in an IDLE state. In step 1602, the receive interface 108a determines whether or not request for communication has been received from one of the transmit interfaces 106b-106d. A request is determined to have been received when CYC_I, STB_I and WE_I signals are received from a master interface.

If a request has not been received, the receive interface 108a continues to wait for an incoming request (e.g. stays in the IDLE state).

In response to receiving a request for communication, the method proceeds to step 1604 in which the receive interface 108a determines whether or not the registers 1504 (e.g. its buffers) are empty. The receive interface 108a thus checks whether or not the registers 1504 contain any (unread) data.

The skilled person will appreciate that there are various ways in which the receive interface 108a may make this determination. In one example, the last bit of the data may be set high (e.g. may not be bits that are otherwise unused). In this example, the receive interface 108a may determine that the registers are full by determining that the last bit in each register is high. In an example in which the reconfigurable region 102a is operable as a Hamming encoders or Hamming decoders, the last bit may be used to indicate that the data is valid when it is high. Since Hamming decoders and encoders use only 31 bits (26 bits being the original data and 5 bits being the code word), the last bit would otherwise be left unused.

In another example, a transmit interface may have fewer than 8 data words to send. In this case, the receive interface 108a may determine if at least one of the register's last bit is set and CYC_O is negated. If the receive interface 108a determines that any register 1504 contains data, but the request signal (CYC_O) is low, the receive interface 108a may determine that all the data has been delivered.

In response to determining that the registers 1504 are empty, the receive interface 108a may switch to a state in which the registers 1504 are enabled to store incoming data. For example, the decoder may enable (activate) one or more of the registers 1504 to receive incoming data by sending, to the respective register(s), an enable signal (e.g. using the SEL_I line).

In this state, the receive interface 108a is also operable to send one or more acknowledgement signals to transmit interfaces. This state is referred to as the WR_REQ state.

Alternatively, if the receive interface 108a determines that the registers 1504 are not empty, the receive interface 108a waits for the registers to empty before proceeding. The receive interface 108a may thus, in step 1606, switch to the STALL state. In this state, the receive interface 108a asserts the STALL_O signal high and ACK_O signal low, which informs the transmit interface from which the request was received in step 1602 that it needs to wait before sending new data. This also disables the registers 1504, preventing them from receiving any new data.

The register 1504 also signals to the reconfigurable region 102a that there is data in the registers, indicating that the reconfigurable region should read the data. In the illustrated example, the receive interface 108a signals this information to the reconfigurable region 102a using the slave_buffer_full signal.

In the STALL state, the receive interface 108a may check whether or not the registers 1504 are empty periodically. Alternatively, the receive interface 108a may receive a data_read_by_acc signal from the reconfigurable region 102a, indicating that the reconfigurable region 102a has read the remaining data from the registers 1504. The receive interface 108a may thus determine that the buffers are empty based on an indication from the reconfigurable region 102a. The receive interface 108a may then switch to the WR_REQ state and proceed to step 1608.

In step 1608, the receive interface 108a receives incoming data from the transmit interface. The incoming data is stored in one or more of the (empty) registers 1504. Thus, the incoming data may be stored in the registers 1504 that were activated by the decoder 1506. In this example, the incoming data is received on the DAT_I line.

The method proceeds to step 1610, in which the receive interface 108a sends a signal to the reconfigurable region 102a indicating that there is data in the registers 1504. The receive interface 108a thus indicates to the reconfigurable region 102a that it should read the data. In the illustrated example, the receive interface 108a signals this information to the reconfigurable region 102a using the slave_buffer_full signal.

Figure 17:
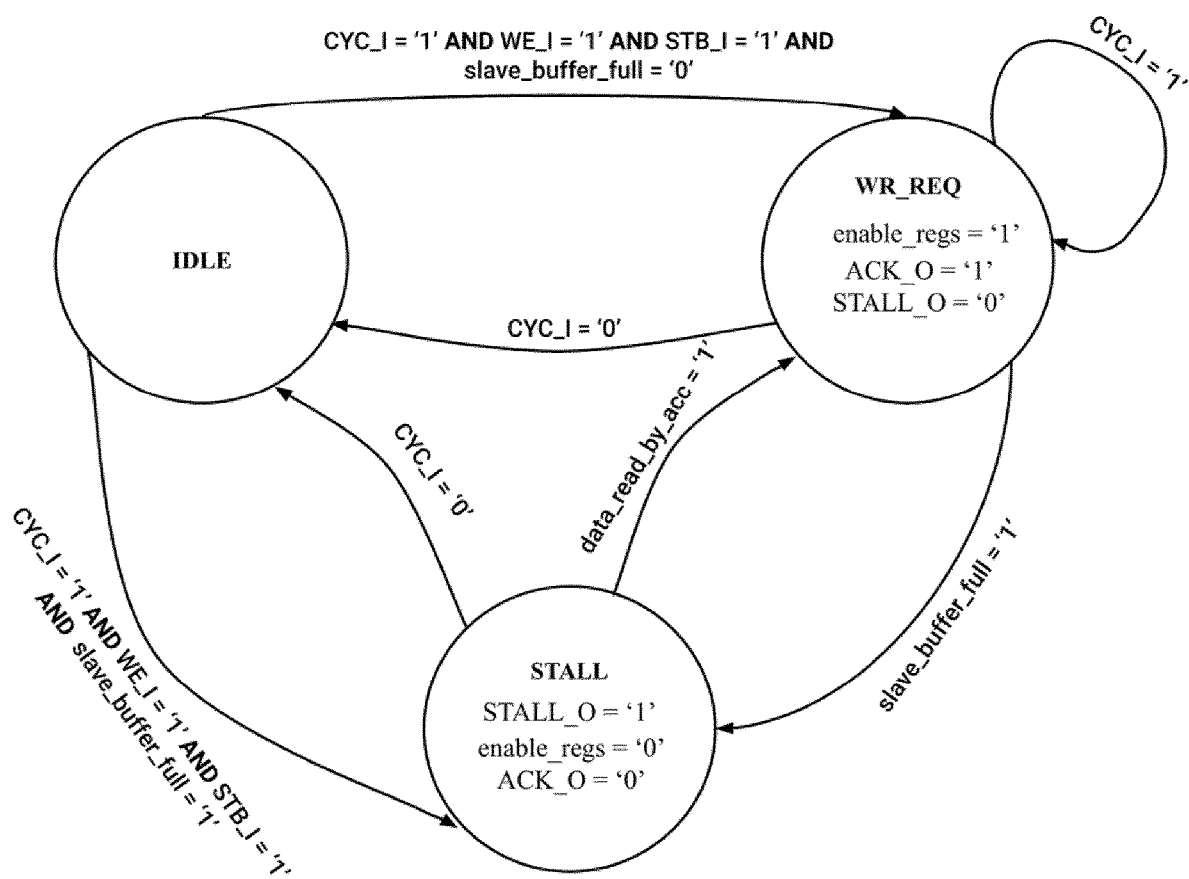
FIG. 17 shows control logic of a receive interface according to an example of the disclosure.

FIG. 17 shows control logic of the receive interface 108a according to an example of the disclosure. As described above in respect of FIG. 16, the receive interface 108a changes between three states: IDLE, STALL And WR_REQ.

In either of states WR_REQ or STALL, the receive interface 108a can change back to the IDLE state by the de-assertion of a CYC_I signal. This can happen for one of the following reasons:
1. The transmit interface from which a request was received completes its request and has no more data to send. This can happen when a receive interface is in the WR_REQ state.
2. The transmit interface has already sent the maximum allowed number of packages as enforced by the arbiter, so its connection to the receive interface through multiplexers is disabled by a receive side in the crossbar switch. This can happen when receive interface 108a is in WR_REQ state.
3. The transmit interface returns a timeout error after waiting for so long on low acknowledgement signal when the receive interface 108a is in the STALL state.

The receive interface 214 described above in respect of FIG. 2 may operate in substantially the same way as the receive interface 108a. Thus, a similar or same implementation may be used to send data from one of the reconfigurable regions 202 to the host server 228. In particular examples, the receive interface 214 may correspond to the receive interface 108a subject to one or more modifications.

In particular, for the receive interface 214, there are three AXI interfaces targeting each C2H channel. As noted above, these may not be statically allocated to user applications, which means that the receive interface 214 may send the processed data via different AXI interfaces each time. The interface to use to send the data may be selected based on a shift register, such as a shift register which has 3 bits, but only 1 bit enabled at a time. The output of the shift register can be used to determine to which channel the slave_buff-_signal is sent and from which channel the data_read signal is expected. This enables targeting each channel in a round robin fashion.

Reconfigurable Region

Figure 18:
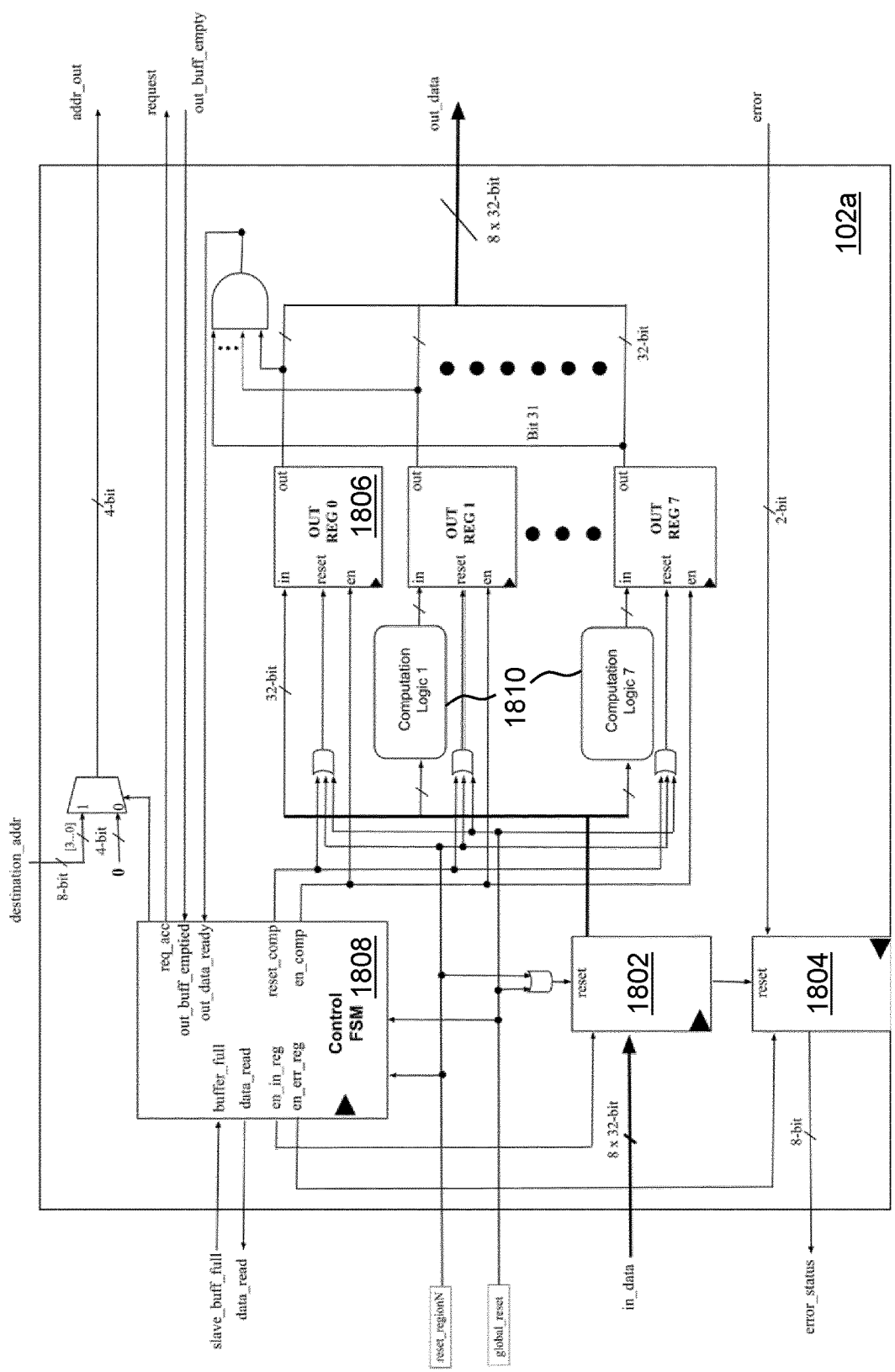
FIG. 18 shows a block diagram of an exemplary implementation of a reconfigurable region.

FIG. 18 shows a block diagram of an exemplary implementation of the reconfigurable region 102a.

The reconfigurable region 102a is operable to perform one or more tasks to process data received from the receive interface 108a. The skilled person will appreciate that FIG. 18 shows an example implementation of a reconfigurable region and, in general, the implementation of the reconfigurable region 102a may vary depending on, for example, application or system requirements. As such, the skilled person will also appreciate that the transmit and receive interfaces, 106a, 108a described herein may also vary from the examples shown, since they may be adapted according to the reconfigurable region 102a, for example.

The reconfigurable region 102a comprises an input register 1802, one or more output registers 1806, an error status register 1804, control logic 1808 and one or more computational logic modules 1810. Eight output registers 1806 are shown in FIG. 18, but the present disclosure is not limited as such. In general, the reconfigurable region 102a may comprise one or more output registers 806. Two computational logic modules 1810 are shown in FIG. 18. However, in general, the reconfigurable region 102*a* may comprise one or more computational logic modules 1810.

Figure 19:
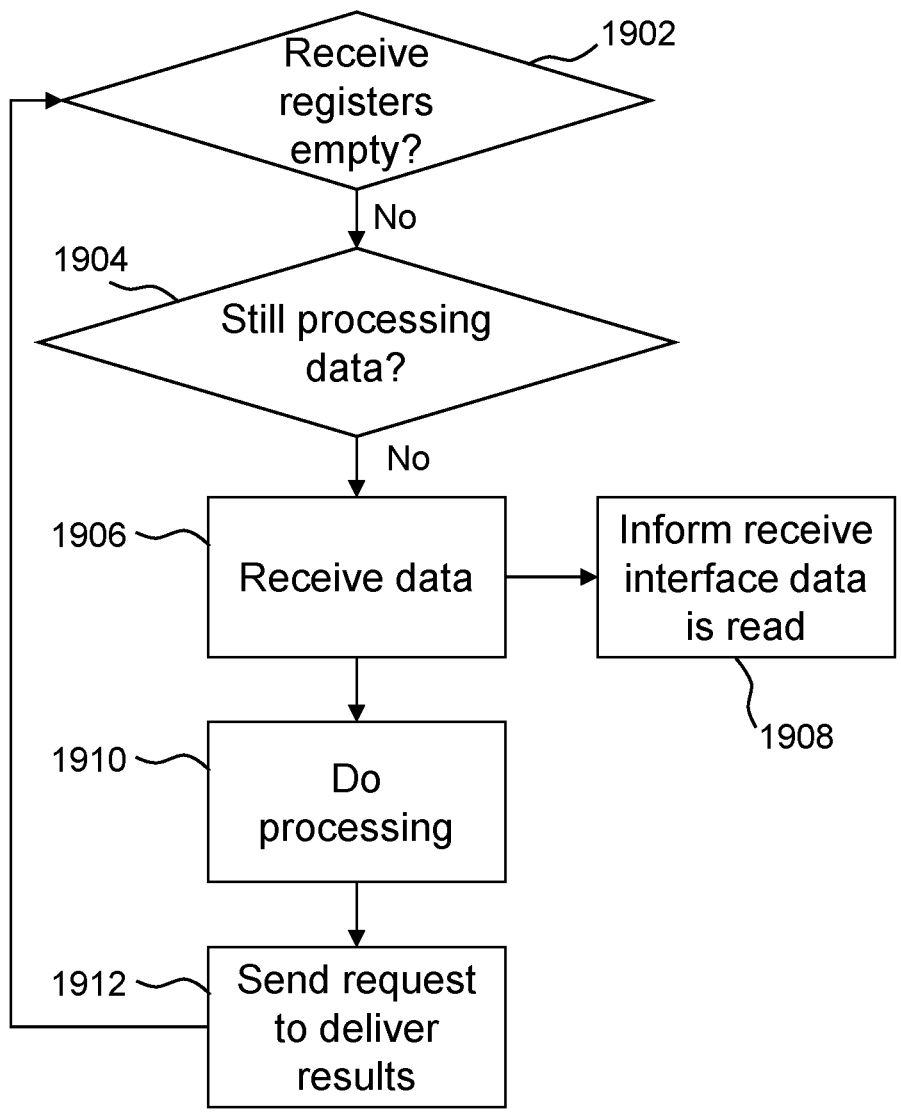
FIG. 19 shows a flowchart of a method performed by a reconfigurable region in an example of the disclosure.

The operation of the reconfigurable region 102*a* is described with reference to FIG. 19, which shows a flowchart of a method performed by the reconfigurable region 102*a* in an example of the disclosure.

The method begins in step 1902, in which the reconfigurable region 102*a* determines whether or not the registers 1504 of the receive interface 108*a* are empty. Thus, the reconfigurable region 102*a* determines whether or not there is data to be read at the receive interface 108*a*.

The reconfigurable region 102*a* may make this determination based on a signal received from the receive interface 108*a*. As shown in FIG. 18, the control logic 1808 of the reconfigurable region 102*a* is operable to receive a slave_buff_full signal, which is received from the receive interface 108*a*. This signal may correspond to the slave_buff_full signal described above in respect of FIG. 15, for example. Thus, the slave_buff_full signal may indicate to the reconfigurable region 102*a* that there is data in the registers 1504 of the receive interface 108*a*.

In response to determining that the registers 1504 at the receive interface 108*a* are not empty (e.g. there is still data to be read), the method proceeds to step 1904, in which the reconfigurable region 102*a* determines whether or not the reconfigurable region 102*a* is still processing data (e.g. data previously received from the receive interface 108*a*). The reconfigurable region 102*a* may thus determine whether data that was read from the receive interface 108*a* in a previous iteration of the method has been processed and delivered to the transmit interface 106*a*.

In response to determining that there is no ongoing data processing (e.g. processing of previously received data has completed), the reconfigurable region 102*a* switches from an IDLE state to a REGISTER_DATA state. In the REGISTER_DATA state, the input registers 1802 are operable to receive data from the receive interface 108*a*. To switch to the REGISTER_DATA state, the control logic 1808 may send a signal to the input register 1802 to enable the register 1802 to receive data from the receive interface 108*a*.

The method proceeds to step 1906, in which the reconfigurable region 102*a* receives data from the receive interface 108*a*. The reconfigurable region 102*a* receives the data at the input register 1802. The input register 1802 may thus, for example, receive an in_data signal comprising the data from the receive interface 108*a*.

In step 1908, the control logic 1808 sends a signal to the receive interface 108*a* to indicate that the data has been read from the registers 1504 of the receive interface 108*a*. This signal, labelled data_read in FIG. 18, indicates to the receive interface 108*a* that the receive interface 108*a* can read receive new data at its registers 1504.

In step 1910, the reconfigurable region 102*a* processes the data. The data from the input register 1802 is input to the one or more computational logic modules 1810, which process the data. The skilled person will appreciate that the operation of the computational logic modules will depend on the one or more tasks that the reconfigurable region 102*a* is configured to perform. For example, the computational logic modules may be operable to do one or more of the following: decoding, multiplying and encoding.

In this example, the computational logic modules 1810 are operable to process in parallel, so the data can be processed in parallel. However, the skilled person will appreciate that the present disclosure is not limited as such and, in general, the computational logic modules 1810 may be configured in any suitable arrangement. For example, two or more of the computational logic modules 1810 may be arranged in series, such that the output of one computational logic module 1810 is input to another computational logic module 1810.

In another examples, fewer computational logic modules 1810 may be provided (e.g. one or more). In these examples, data words may be forwarded one by one (e.g. using a multiplexer) to one of the computational logic modules 1810.

The data may comprise data which is not to be processed by any of the computational logic modules 1810. To accommodate this, the input register 1802 may be directly connected to one of the output registers 1806 (e.g. without an intermediate computational logic module 1810) such that at least some of the data can be output without being processed. For example, the data may comprise an application identifier, which identifies the application for which processing is performed. The first data word in the data may comprise the application identifier, for example. The input register 1802 may thus be operable to send the application identifier directly to one of the output registers 1806.

The computational logic modules 1810 output the processed data to the output registers 1806.

In step 1912, the reconfigurable region 102*a* sends a request to the transmit interface 106*a* to send the processed data to one of the other reconfigurable regions 102*b*-102*c* or a host server, such as the host server 228. In this example, the reconfigurable region 102*a* determines the destination for the processed data based on a signal from the register 216 (labelled as destination_addr). However, in other examples, the reconfigurable region 102*a* may be preconfigured with this destination for the processed data (e.g. when the reconfigurable region 102*a* was configured to process the data initially).

Thus, the control logic 1808 may send a request (from req_acc) to the transmit interface 106*a* to send the processed data. The control logic 1808 also initiates sending the destination information (addr_out) to the transmit interface 106*a*. The reading of the processed data from the output registers 1806 is discussed in detail below in respect of FIGS. 21-22.

Briefly, the transmit interface 106*a* reads the processed data from the output registers 1806. Thus the output registers 1806 can output the processed data to the transmit interface 106*a* (e.g. over the out_data line as illustrated in FIG. 18).

When the processed data has been read from the output registers 1806, the transmit interface 106*a* sends a signal out_buff_empty indicating this to the control logic 1808. In response to receiving the out_buff_empty signal, the control logic 1808 activates (enables) the error register 1804, such that the error register 1804 is operable to receive an error signal (error) from the transmit interface. The error signal indicates whether or not the request was successful. Thus, for example the error signal may indicate (e.g. by set to 0) that the transmit interface 106*a* successfully received the processed data from the output registers 1806.

The error register 1804 is thus operable to store at error signals received from the transmit interface 106*a*, in which the error signals indicate whether or not a request to send or transmit processed data was successful. The error register 1804 is operable to output the error signal to the control logic 1808. In response to receiving an error signal indicating that the processed data was read successfully by the transmit interface 106*a*, the control logic 1808 is operable to reset the output registers 1806.

The error register 1804 is further operable to output the error signal to the register 216 in the FPGA 232 (e.g. as part of the error_status signal). The error signal may thus be stored in the register 216 as error information as described above in respect of FIG. 2. This allows the resource manager 226 to monitor communications between the reconfiguration regions 202, so that communication failures can be identified.

In the illustrated example, the error signal received from the transmit interface consists of 2 bits, whereas the error_status signal output to the register 216 consists of 8 bits. This allows for adapting the reconfigurable region 102*a* to support multicast communication, such that the processed data can be transmitted to multiple destinations (e.g. to multiple reconfigurable regions or to the host server and another reconfigurable region). In these examples, the spare bits may be used for error signals from requests to transmit the processed data to other destinations. Multicasting is discussed in more detail below in respect of FIG. 27-28.

The method may return back to step 1902, in which the reconfigurable region 102*a* determines whether or not the registers 1504 of the receive interface 108*a* are empty. The method may return to step 1902 in response to the reconfigurable region 102*a* receiving an indication, from the receive interface 108*a*, that there is data in the registers 1504 of the receive interface 108*a*.

Figure 20:
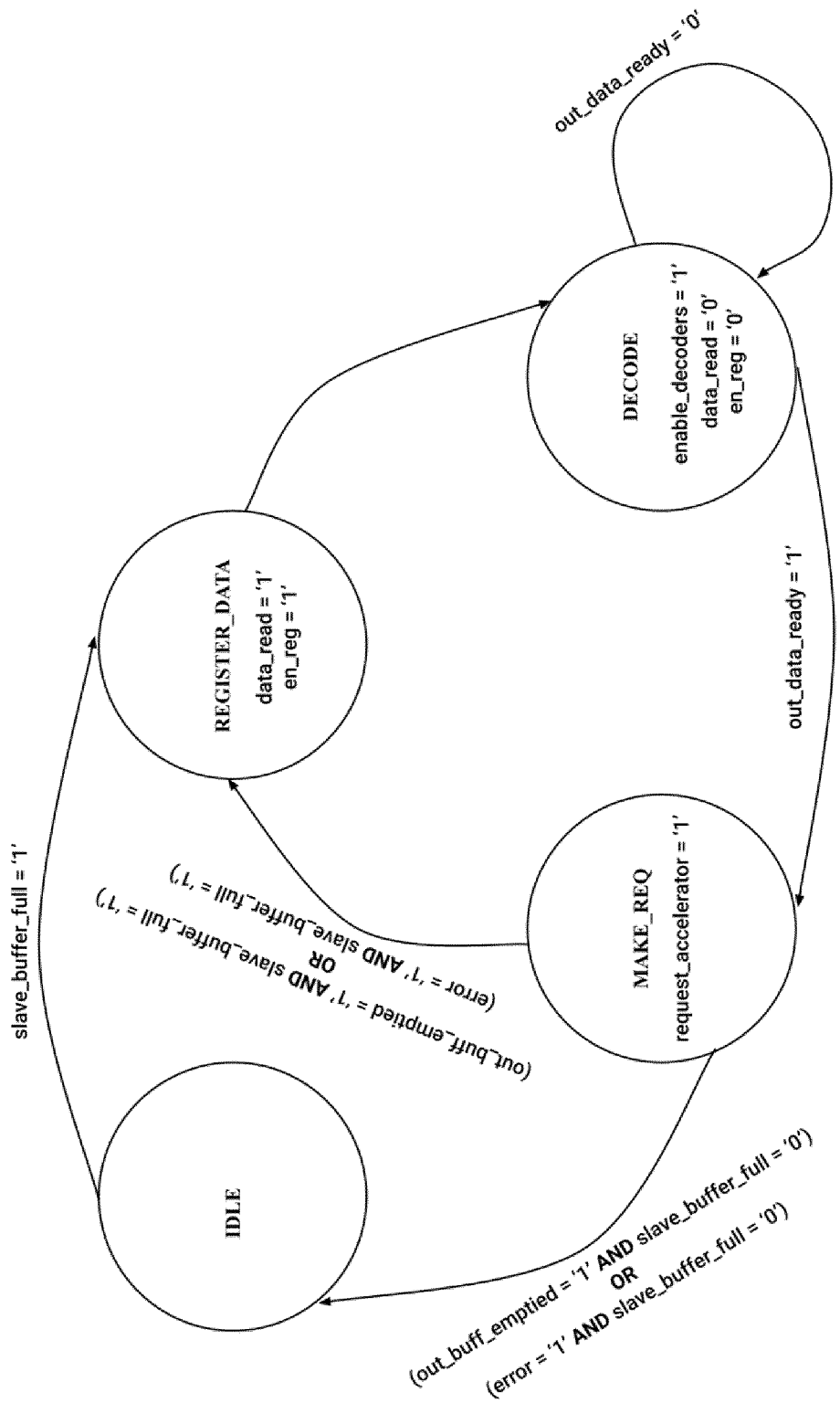
FIG. 20 shows control logic for a reconfigurable region according to an example of the disclosure.

FIG. 20 shows control logic for the reconfigurable region 102*a* according to an example of the disclosure. In this example, the reconfigurable region 102*a* has been configured to operate as a Hamming decoder.

The reconfigurable region 102*a* has four states: IDLE, REGISTER_DATA, MAKE_REQ and DECODE. The skilled person will appreciate that the DECODE state may be different in examples in which the reconfigurable region 102*a* is configured to perform tasks other than Hamming decoding. For example, in examples in which the reconfigurable region 102*a* is operable to perform multiplication, the third state may be MULL instead of DECODE. In another example in which the reconfigurable region 102*a* is operable to perform encoding, the third state may be ENCODE rather than DECODE.

The reconfigurable region 102*a* may start in the IDLE state and switch to the next state, REGISTER_DATA, when it receives the slave_buffer_full signal from the receive interface 108*a*. In the REGISTER_DATA state, the input registers 1802 are operable to store incoming data. The data_read signal is sent back to the receive interface 108*a* to indicate that data has been read from the receive interface 108*a* so that the receive interface 108*a* can reset its registers and receive further data. The reconfigurable region 102*a* switches to the next state, DECODE, in which the output registers 1806 are operable to store one or more outputs from the computational logic modules 1810. In the example shown in FIG. 18, the computational logic module 1810 are fully combinational, so they do not consume an extra clock cycle. However, in alternative examples in which the computational logic modules 1810 comprise one or more registers, processing by the computational logic modules 1810 may take multiple clock cycles. In these alternative examples, the reconfigurable region 102*a* stays in the DECODE state until processing is finished, and the processed data is in the output registers 1806. After processing has finished, the control logic 1808 switches to the MAKE_REQ state in which the reconfigurable region 102*a* sends a request signal, the processed data and the destination address to the transmit interface 106*a*.

When the control logic 1808 receives out_buff_emptied from the transmit interface 106*a*, the control logic 1808 configures the error register 1804 to be able to store the error signal from the transmit interface 106*a* and switches to the next state. The next state can be either IDLE Or REGISTER_DATA depending on the slave_buffer_full signal received from the receive interface 108*a*. If the slave_buffer_full indicates that the receive interface 108*a* has new data, it the control logic 1808 switches to the REGISTER_DATA state. Otherwise, the control logic 1808 switches to the IDLE state.

Transmit Interface

Figure 21:
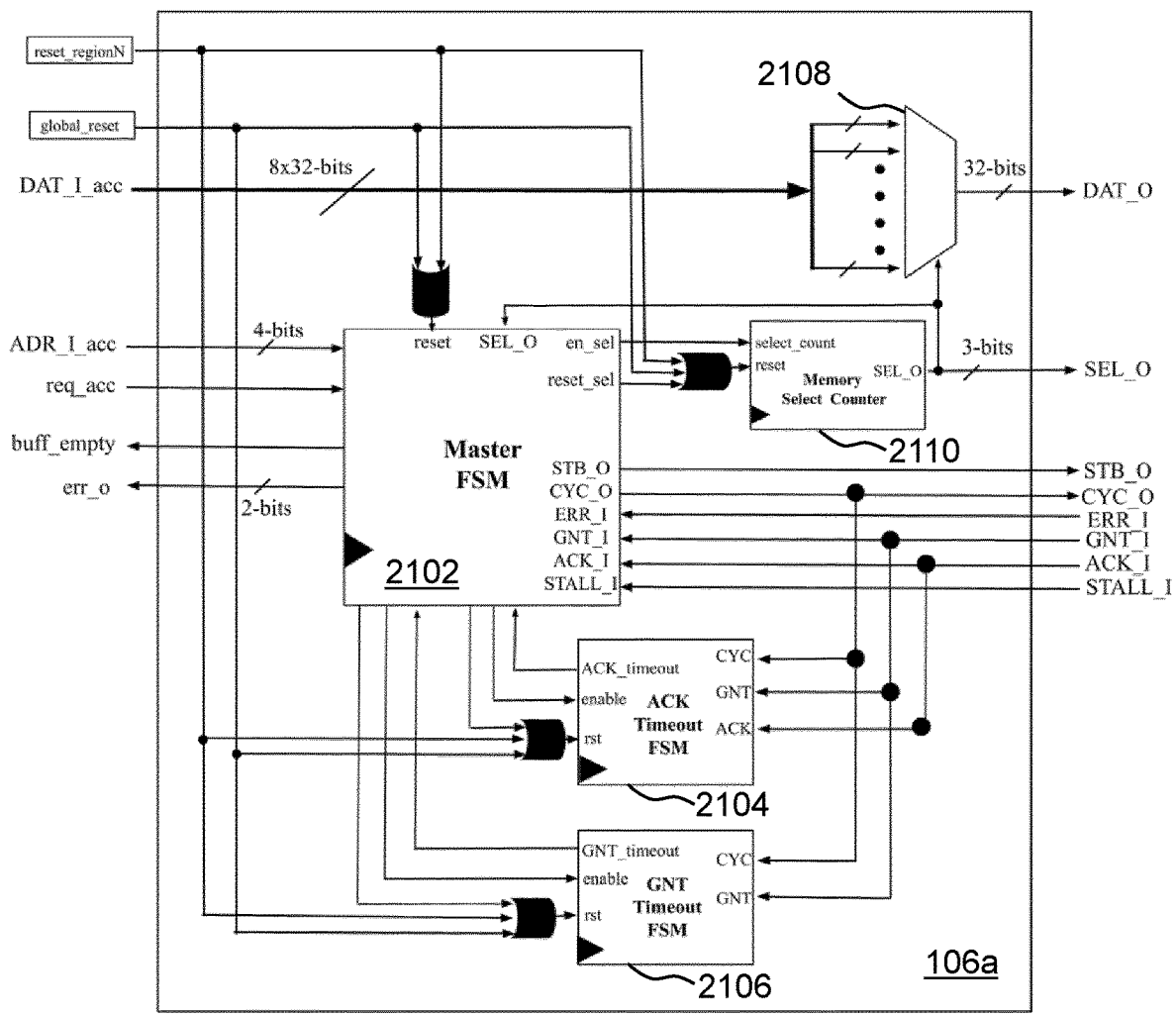
FIG. 21 shows a block diagram of an exemplary implementation of a transmit interface.

FIG. 21 shows a block diagram of an exemplary implementation of the transmit interface 106*a*. The transmit interface 106*a* comprises a control unit 2102 (labelled Master FSM), an acknowledgement timeout unit 2104, a grant timeout unit 2106, a multiplexer 2108 and a memory select controller 2110.

Figure 22:
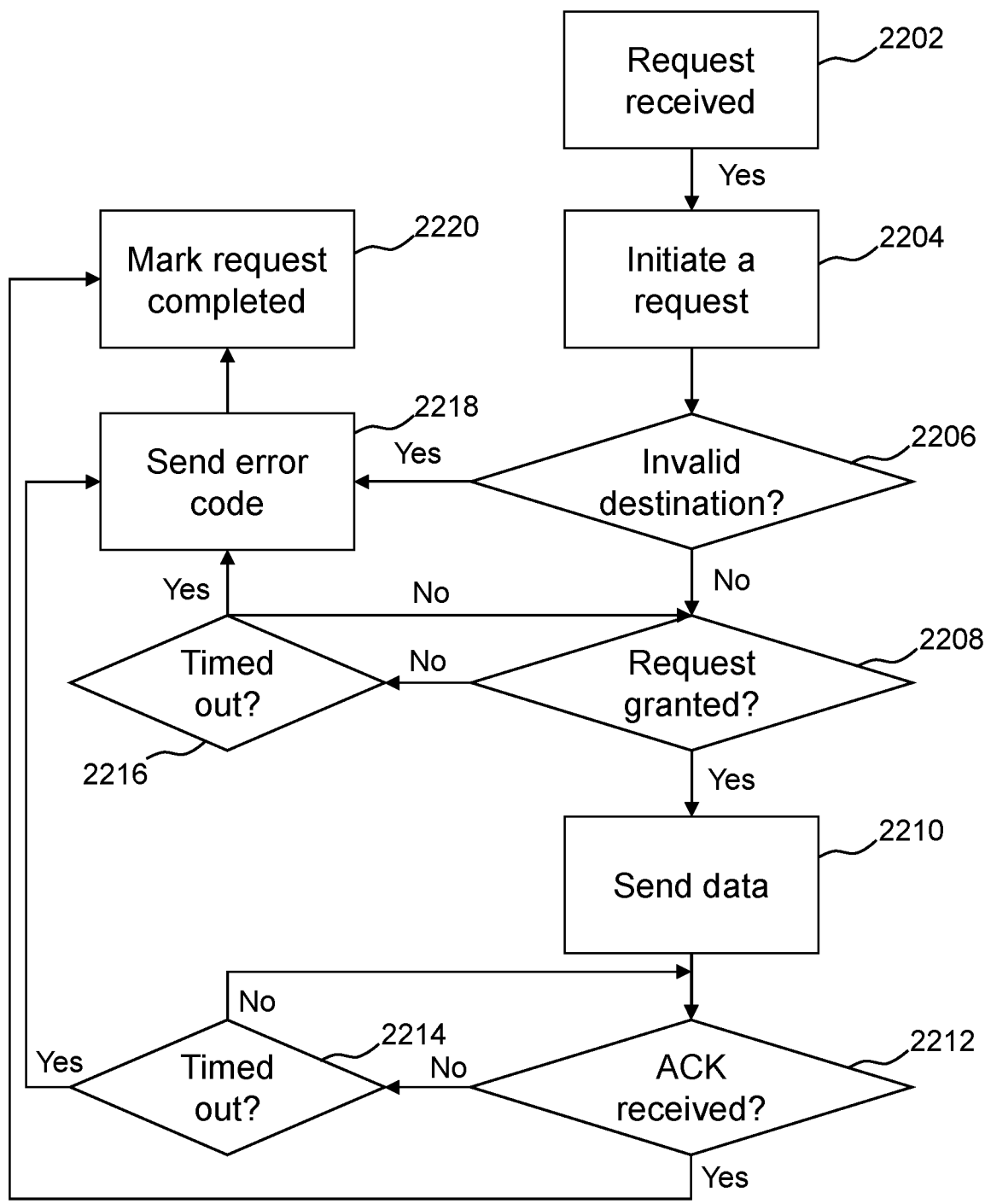
FIG. 22 shows a flowchart of a method performed by a transmit interface in an example of the disclosure.
Figure 23:
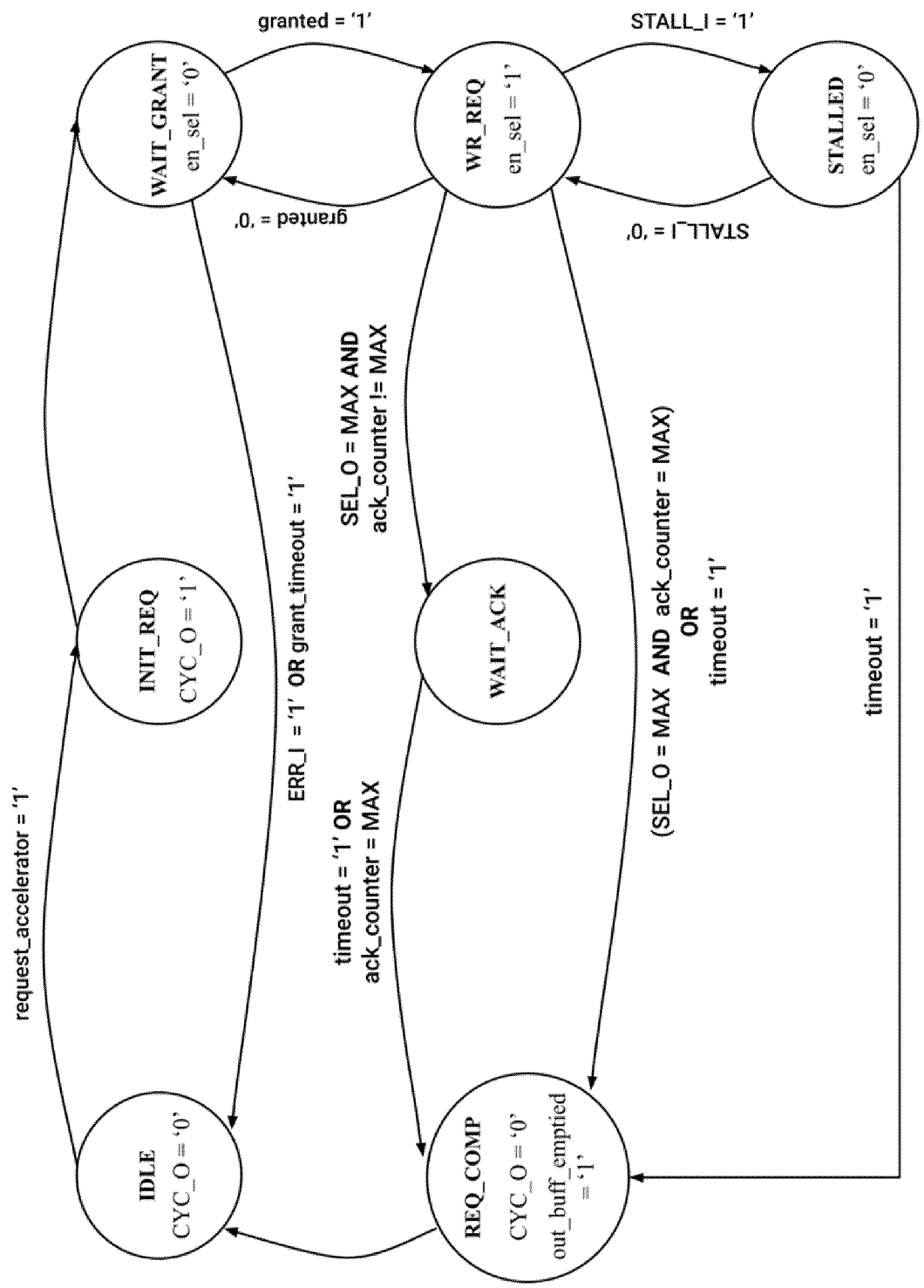
FIG. 23 shows control logic for a control unit of a transmit interface in an example of the disclosure.

The operation of the components of the transmit interface 106*a* are described in detail in respect of FIGS. 22 and 23. Briefly, the control unit 2102 is operable to receive a request from the reconfigurable region 102*a*, in which the request indicates that the transmit interface 106*a* is to read processed data from the reconfigurable region 102*a* and send the processed data to a destination indicated by the reconfigurable region 102*a*. The control unit 2102 is further operable to process one or more response signals from the crossbar switch (GNT_I, ERR_I) or from a receive interface (ACK_I or STALL_I), and control the other components in the transmit interface 106*a*.

The multiplexer 2108 is operable to select the data to be sent to a receive interface (e.g. which data word to be sent). The multiplexer 2108 has 8 32-bit data lines incoming from the reconfigurable region 102*a* and only one 32-bit outgoing data line (DAT_O). The multiplexer 2108 is thus operable to select a subset of the incoming (processed data) to be output to a receive interface. The selection is determined by the memory select controller 2110 based on one or more signals from the control unit 2102.

The acknowledgement timeout unit 2104 is operable to determine whether the time taken to receive an acknowledgment from a receive interface to which a request for communication was sent has exceeded a maximum threshold. The grant timeout unit 2106 is operable to determine whether the time taken to receive a communication grant from a receive interface to which a request for communication was sent has exceeded a maximum threshold. Thus, the timeout units 2104, 2106 can be used to determine whether an acknowledgement or grant decision from the crossbar switch has taken too long.

FIG. 22 shows a flowchart of a method performed by the transmit interface 106*a* in an example of the disclosure. FIG. 23 shows control logic for the control unit 2102 of the transmit interface 106*a* in an example of the disclosure.

The method begins in step 2202, in which the transmit interface 106*a* receives a first request, from the reconfigurable region 102*a*, to read processed data from the reconfigurable region 102*a* and send the processed data to a destination indicated by the reconfigurable region 102*a*. The first request and the destination information are received at the control unit 2102 (req_acc and ADR_I_acc respectively).

In response to receiving the first request, the transmit interface 106*a* sends, in step 2204, a second request to the crossbar switch. The second request comprises a request to transmit the processed data to another reconfigurable region or to the host server. The second request comprises destination information which indicates the intended destination of the processed data (e.g. of the reconfigurable regions and the host server the processed data is to be sent to). The destination information may thus be the destination information described above in respect of FIG. 2, for example.

The control unit 2102 can initiate the second request by setting the CYC_O and STB_O signals high and providing the destination information to the crossbar in response to receiving a high request (req_acc) signal from a module. The control unit 2102 switches to a WAIT GRANT state in which it configures the grant timeout unit 2106 to start counting clock cycles.

The control unit 2102 may, in step 2206, receive an error signal (ERR_I) indicating that the destination information was invalid. This may occur if, for example, the transmit interface 106a attempts to send processed data to another reconfigurable region to which it is not permitted to send data. If an error signal is received, the method proceeds to step 2218, in which the control unit 2102 sends an error code (err_o) to the reconfigurable region 102a. The control unit 2101 switches back to the IDLE state. The request is the considered completed in step 2220.

Alternatively, if an error signal is not received in step 2206, the method proceeds to steps 2208 and 2216, in which the transmit interface 106a waits to receive a communication grant from the crossbar switch. If no communication grant is received before the timer in the grant timeout unit 2106 expires in step 2216 (before counts a number of cycles exceeding a maximum threshold value), the method proceeds to step 2218 in which an error code is sent to the reconfigurable region 102a as described above.

If a communication grant is received in step 2208, the method proceeds to step 2210. In step 2210, the transmit interface 106a transmits the processed data to the crossbar switch.

Thus the control unit 2102 switches to the WR_REQ state, in which the control unit 2102 is operable to configure the transmit interface 106a to transmit the processed data. As mentioned above, the control unit 2102 can configure the memory select controller 2110 to select which of the processed data to send. Thus, for example, the memory select controller 2110 may select a data word from the processed data to be output from the multiplexer 2108 to the crossbar switch. The control unit 2102 can also send the destination information for the processed data to the crossbar switch by sending the destination information (e.g. the address to which the data is to be sent) to the memory select controller 2110 to output to the crossbar (e.g. over the SEL_O line).

The method may then proceed to steps 2212 and 2214, in which the transmit interface 106a waits for one or more acknowledgement signals from the crossbar switch. The control unit 2102 may thus switch to the WAIT_ACK state where it waits until it receives all acknowledgement signals for all data set that it has sent. The number and/or timing of acknowledgement signals may vary depending on the communication mode of the interface. This is discussed in more detail below. In general, once the required (or expected) acknowledgement signals are received, the method proceeds to step 2220, in which the request is considered completed. The control unit 2102 may thus switch to the REQ_COMP state.

However, if either the required acknowledgement signals are not received, or are not received before the acknowledgment timer expires in step 2216, the method returns to step 2218, in which an error code is transmitted to the reconfigurable region.

Three potential situation have been outlined in which an error code may be transmitted: invalid destination information, expiry of timer of the acknowledgement timeout unit 2104 and expiry of timer of the grant timeout unit 2106. The error code may also be used to indicate when data has been transmitted successfully. For example, one or more of the following four error codes may be used:

Code "00"—no error, the request is successful

Code "01"—invalid destination information (e.g., invalid destination address).

Code "10"—the response from a receive interface times out (no acknowledgement signal)

Code "11"—the grant response from the crossbar is times out

When the request is considered completed in step 2220, regardless of whether the data was successfully sent or not, the transmit interface 106a may inform the reconfigurable region that the request has been completed. The control unit 2102 may do this by pulling the out_buff_emptied signal high.

The skilled person will appreciate that there may be situations in which the transmit interface 106a attempts to send data to a receive interface, via a crossbar switch, but the receive interface cannot serve the request. This may be indicated to the transmit interface 106a by setting the STALL signal high. In response, the control unit 2102 of the transmit interface switches to STALLED state. In this state, the control unit 2102 disables the acknowledgement timeout unit 2104 (e.g., disables the timer/counter). The control unit 2102 waits for the STALL signal to be de-asserted. In response to the STALL signal being de-asserted, the control unit returns to the WR_REQ state. However, if the receive interface slave does not respond within a predetermined period (e.g., a number of cycles), a timeout error is deemed to occur, and the method proceeds to step 2218.

Figure 24:
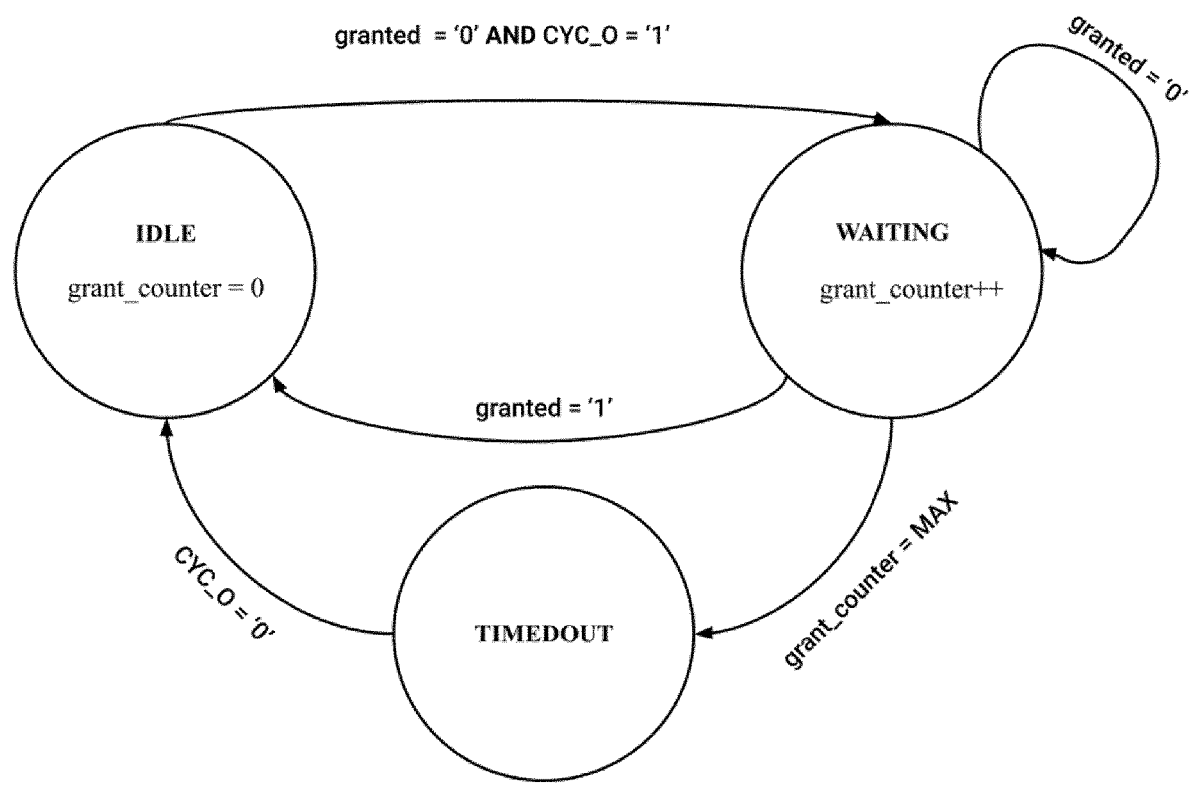
FIG. 24 shows the control logic of an exemplary implementation of an acknowledgement timeout unit.

FIG. 24 shows the control logic of an exemplary implementation of the acknowledgement timeout unit 2104.

When the transmit interface 106a is issued a communication grant but does not receive any acknowledgement signals, the acknowledgement timeout unit 2104 switches to WAIT_ACK state in which the counter (or timer) is enabled. The timer counts until it receives an acknowledgement signal (e.g. a high ACK) from the receive interface for which the communication grant was issued. If the acknowledgement signal is received before the timer expires (e.g. before the timer or counter reaches a maximum value), the acknowledgment timeout unit 2014 switches to the IDLE state and resets the timer.

However, if an acknowledgement signal is not received before the timer expires, the state changes to TIMEDOUT and the acknowledgement timeout unit 2104 informs the control unit 2012 that timeout has occurred (e.g. using the timeout signal). This is effectively an internal ERR signal. In response to this signal, the control unit 2102 terminates the request.

Although FIG. 24 shows the control logic of the acknowledgement timeout unit 2104, the skilled person will appreciate that the same or similar logic may also apply to the grant timeout unit 2106. In the case of the grant timeout unit 2106, the grant timeout unit 2106 is enabled when the transmit interface 106a initiates a request but no grant has been received (e.g., the GNT_I signal is still low).

Providing the acknowledgement timeout unit 2104 and the grant timeout unit 2106 in the transmit interface 106a rather than the crossbar switch simplifies the design of the crossbar switch and makes the crossbar switch more efficient. However, the skilled person will appreciate that the functionality of the timeout units 2104, 2106 may be omitted or, alternatively, implemented in the crossbar switch, rather than the transmit interface 106a.

Thus, the transmit interface 106a is operable to receive a request to transmit processed data from the reconfigurable region 102a to a receive interface, request a communication grant from the crossbar switch and, if the communication grant is scheduled, transmit the processed data to the receive interface.

The transmit interface 212 described above in respect of FIG. 2 may operate in substantially the same way as the transmit interface 106a. In particular examples, the transmit interface 212 may correspond to the transmit interface 106a subject to one or more modifications to reduce latency and/or ensure communication isolation. In particular, the interface 212 may be operable to initiate a communication request when the buffer of its AXI side is half full (e.g., rather than waiting until the buffer is full). This can reduce latency from 19 clock cycles to 15 clock cycles.

The second modification may be implemented to provide communication isolation on the PCIe end. As discussed above in respect of FIG. 2, the destination for the application data (e.g. which reconfigurable region is to receive data for processing) may be indicated by an application identifier. The interface 212 may determine the destination address of the receive interface to which the data is to be sent by sending a request to the register 216, in which the request comprises the application identifier. Since the PCIe port of the crossbar switch 204 is operable to send data to any of the reconfigurable regions 202, there is a risk that an application may attempt to send data to an incorrect reconfigurable region. Using the application identifier to determine the destination for the data ensures that the data is directed to the correct reconfigurable region.

Mode of Operation

Figure 25:
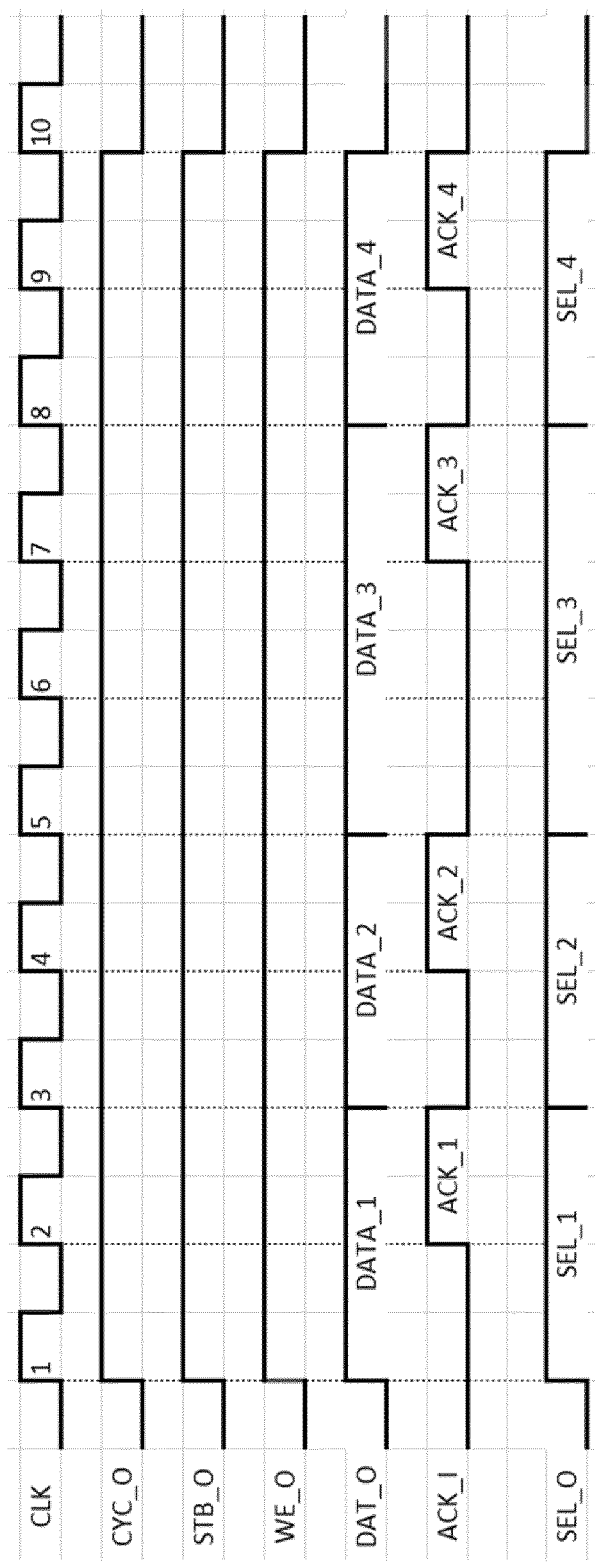
FIGS. 25 and 26 show example waveforms of a Wishbone interface operating in standard mode and pipelining mode.

As mentioned above, although the crossbar switch 104 may be provided with interfaces other than a Wishbone interface, the Wishbone interface in some examples may provide particular advantages. The Wishbone interface has two modes of operation in some examples: standard and pipelining mode. Example waveforms of a standard mode with a write request is illustrated in FIG. 25. In standard mode, before sending new data, the transmit interface 106a waits for an acknowledgement signal from a receive interface for previously sent data. As shown in the figure, the transmit interface 106a sends the next data only after receiving an acknowledgement signal. For instance, since the transmit interface 106a has not received an acknowledgement signal for DAT_3 in clock cycle 6, it holds the data until it receives an acknowledgement. After sending the last data and receiving the last acknowledgement signal, all output lines go low.

Figure 26:
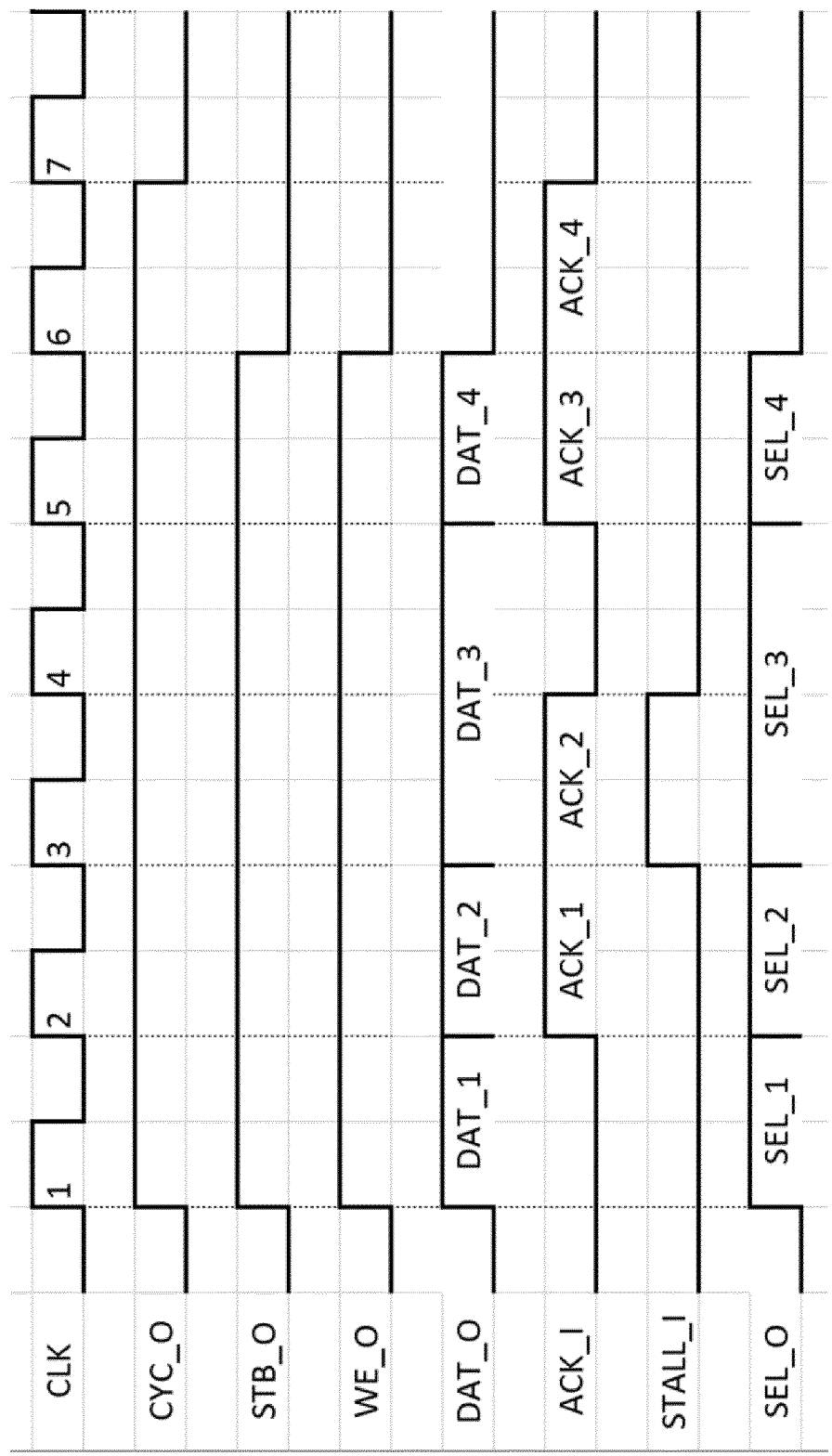

In a pipelining mode, on the other hand, the transmit interface 106a does not wait for an acknowledgement signal. Instead, it sends all data if the receive interface has not asserted stall, and then waits for acknowledgement signals from the receive interface. In other words, as long as STALL_I signal is low the transmit interface 106a continues to send data. Example waveforms of a standard mode with a write request is illustrated in FIG. 26. For each clock cycle other than clock cycle 3, the transmit interface 106a sends the next data since the STALL_I signal remains low. However, in clock cycle the transmit interface 106a receives a high STALL_I signal. In response to the high STALL_I signal, the transmit interface 106a holds stops sending data. Thus, as shown in FIG. 17, the transmit interface 106a holds DAT_3 until it goes low. After finishing sending all data in clock cycle 6, the transmit interface 106a de-asserts all signals except CYC_O to wait to receive the last acknowledgement signal. After receiving the last acknowledgement signal, the request signal CYC_O also goes low.

In particular examples of the disclosure, the Wishbone interface operates in pipelining mode. This advantageously improves the throughput of the crossbar switch. To illustrate the advantages of operating in pipelining mode, consider an example in which there are eight data words to be sent by the transmit interface 106a to a receive interface. In this case, it would take 16 clock cycles to send the eight data words when operating in standard mode: the transmit interface 106a would send data in the first cycle, receive an acknowledgement in the second cycle, and then proceed with the next data word in the third cycle and so on. However, in pipelining mode, the transmit interface 106a sends data as long as STALL_I is low and ACK_I is high. Therefore, it would take only 9 clock cycles to complete the transaction: 8 clock cycles to send data and one more clock cycle to wait for the acknowledgement signal. Operating in pipelining mode thus reduces the number of cycles needed to transmit data, thereby increasing throughput.

Although the operating in pipelining mode is particularly advantageous, the skilled person will appreciate that the present disclosure is not limited as such. In general, the Wishbone interface may operate in any suitable mode (e.g. standard or pipelining).

Multicasting

In particular examples, further adaptations are provided to support multicast operation. Thus, for example, either of the FPGAs 100, 232 may be adapted to support sending data from one reconfigurable regions 102, 202, or from the host server 228, to multiple destinations at once. Thus, for example, the first reconfigurable region 202a may be configured to send its outputs to the second reconfigurable region 202b and the host server 228. This may allow for the progress of data processing to be monitored without significantly interrupted operation.

Figure 27:
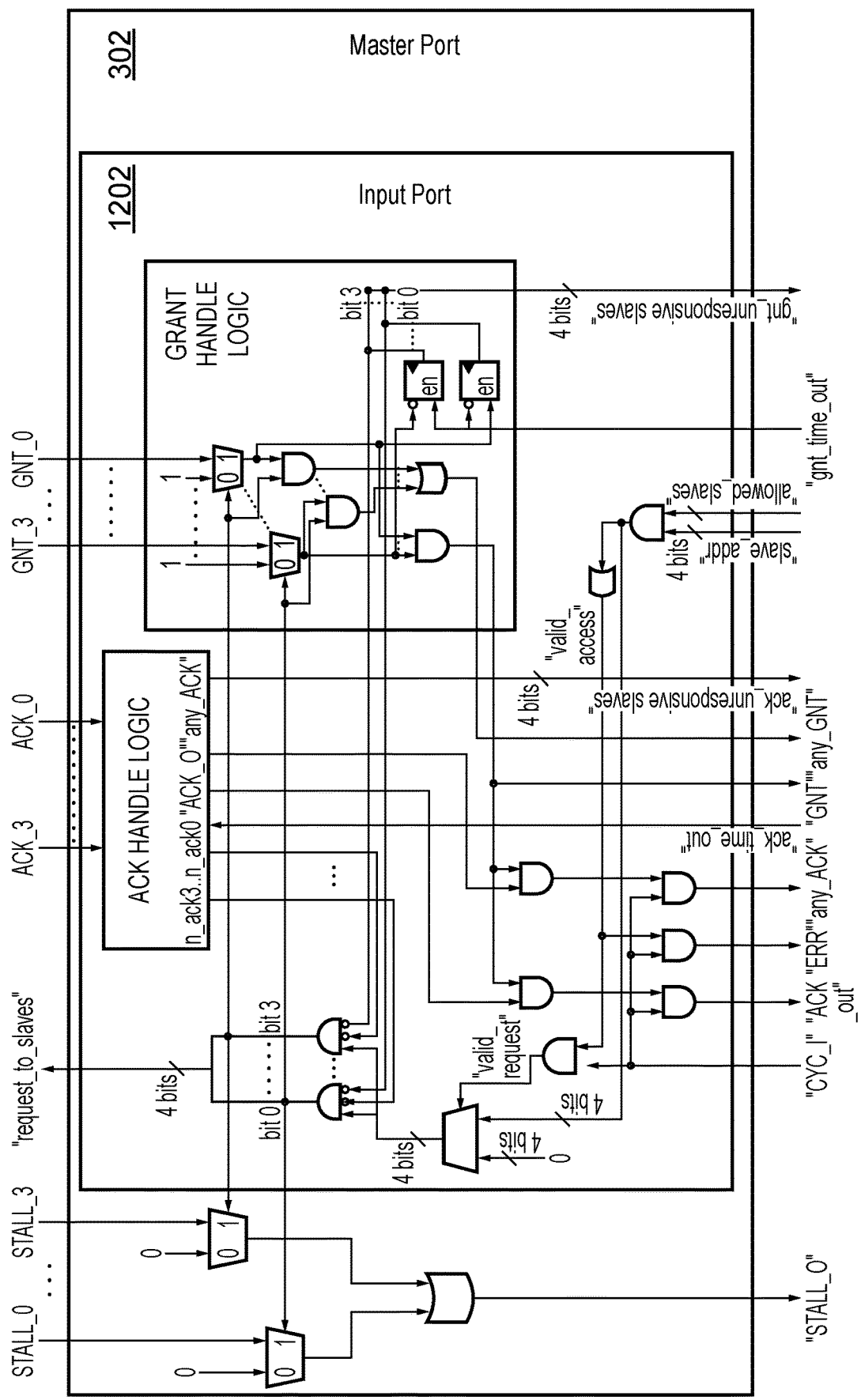
FIG. 27 shows an exemplary implementation of a transmit port of a crossbar switch for implementing multicast communication.

FIG. 27 shows an exemplary implementation of the transmit port 302 of the crossbar switch 104 for implementing multicast communication. The transmit port 302 comprises an input port which may operate in the same manner as the input port 1202 described above in respect of FIG. 12, except for the following modifications. Although the following description focusses on adaptations that are made to the transmit port 302, the skilled person will appreciate that modifications may also be made to the transmit interface 106a and some of these modifications are highlighted below.

As described above, the destination information for processed data may comprise a plurality of bits, each bit corresponding to a different receive interface (e.g. a different reconfigurable region). In the examples described above, these addresses may be encoded using one-hot encoding such that only a single bit is permitted to be high. The high bit may thus indicate the receive interface identified by the address. To enable multicast communication, more than one bit may be set high. For example, an ADR_O signal of "0111" indicates that the transmit port 302 is to send data to receive interfaces connected to ports 1, 2 and 3.

The same techniques described above for address/destination validation may still be used. For example, permission information stored in a register may indicate which of the plurality of regions are permitted to communicate with each other. For example, the permission information for the transmit port 302 (e.g. the permission information for the first reconfigurable region 102a which is associated with the transmit port 302) may be set to "0110", meaning that the transmit port 302 is permitted to communicate with receive interfaces 1 and 2. Then, ANDing ADR_O and allowed_slaves as described above in respect of FIG. 13 would result in "0110", indicating that only the request in respect of ports 1 and 2 should be sent. If all of the addresses are invalid (e.g. if the permission information for the transmit interface 106*a* is "1001"), an error message may be returned to the transmit interface 106*a*. For example, the valid_access signal may be evaluated as false and ERR_I may be returned to the transmit interface 106*a*.

This method has the following advantages. Firstly, the length of ADR_O signal is decreased. If the transmit interface 106*a* used byte-addressing by, for example, sending the address of receive interfaces 108 separately using 2 bits for each (e.g. "11_10_00"—for ports 3, 2, and 0), it would have to use 6 bits and additional decoders and logic would be needed to convert it to request_bits. Secondly, the number of clock cycles is minimised. For example, the length of the ADR_O signal could be reduced to only use 2 bits by sending the addresses in different clock cycles. This would use fewer bits but would take 3 clock cycles.

As described above in respect of FIGS. 5-6, the present disclosure also provides decentralized arbitration in which each receive port handles its own requests. This is particularly advantageous for multicast communication. Since requests are send to each receive port separately, receive ports can respond to requests without being aware of multicast. In addition, receive ports do not need to be concerned with additional address checking either, which prevents additional overhead from being introduced. This minimises the area of the receive port.

Modifications may also be made to the transmit interface 106*a* to manage grant and/or acknowledgement signals in multicast implementations.

Since the transmit interface 106*a* is operable to a request to send data to different receive interfaces in multicast communication, the transmit interface 106*a* is further operable to receive grant and acknowledgement signals from multiple receive interfaces. However, it is not guaranteed that the transmit interface 106*a* will receive all grants at the same time or will receive all grants at all. For example, some receive interfaces may take more time to schedule a grant, or some receive interfaces may not respond. The skilled person will appreciate that similar issues may apply to acknowledgement signals too. Examples of the disclosure provide logic for handling grant and/or acknowledgement signals in the transmit interface 106*a*.

Figure 28:
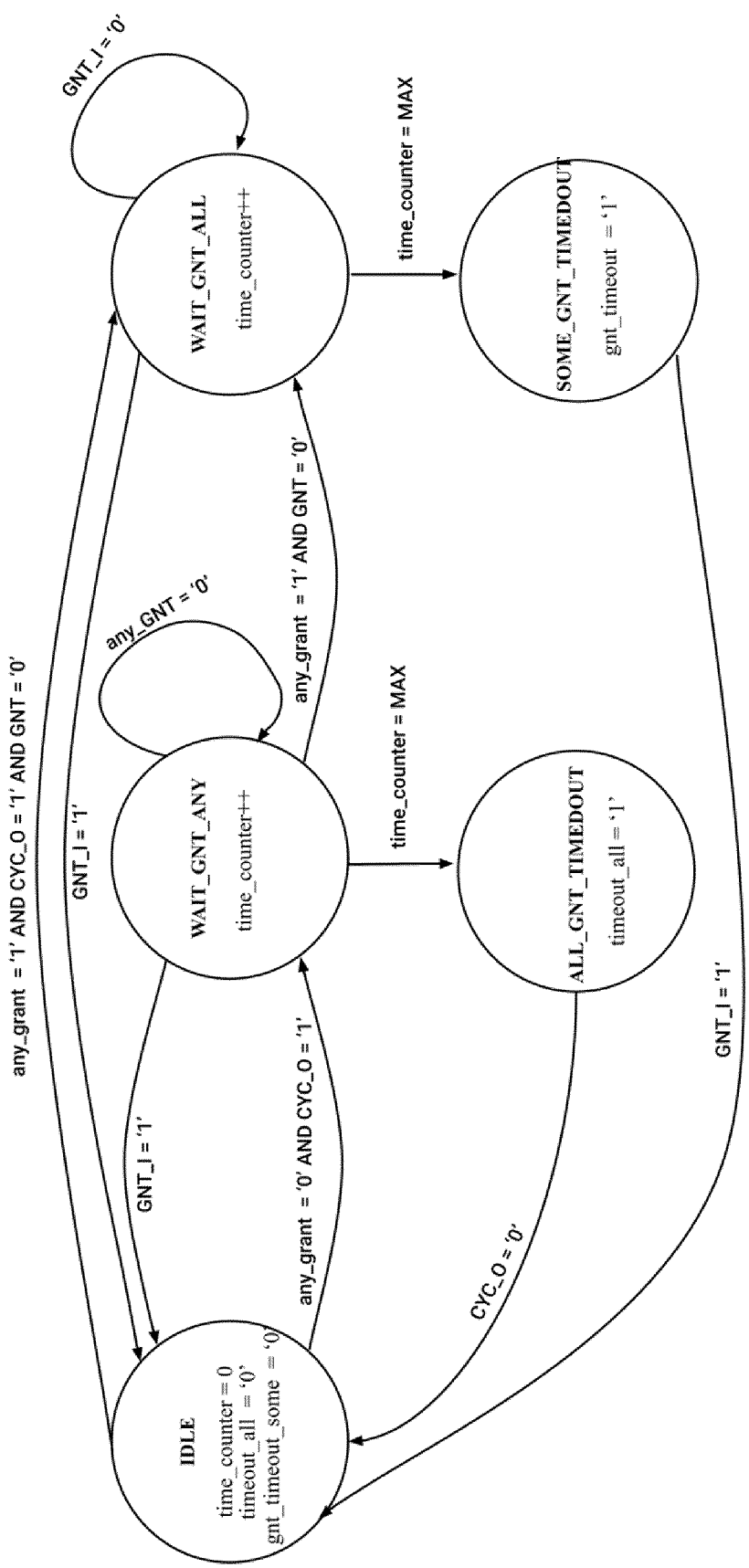
FIG. 28 shows control logic of an exemplary implementation of a grant timeout unit.

FIG. 28 shows the control logic of an alternative exemplary implementation of the grant timeout unit 2106.

To begin with, each grant signal can be passed through a two-input multiplexer. This can be done to force a high signal for unrequested receive interfaces 108 so that when the final grant signal (GNT_I) is generated by ANDing all responses, it would be high due to requested receive interfaces 108. For example, consider, the second transmit interface 106*b* sends a request to the fourth receive interface 108*d*, but not the first receive interface 108*a*. The multiplexer may direct the grant signal for the fourth receive interface 108*d* to a final AND gate. However, since no request was sent to the first receive interface 108*a*, the transmit interface 106*a* does not need a response. Therefore, the high signal may be passed instead of a GNT_0 signal; thus, evaluating only the response for a requested receive interface.

Secondly, as noted above, not all receive interfaces may grant the request at the same time, and some may not respond at all. In this scenario, there is a risk that the transmit interface 106*a* sends data to receive interfaces it has not received a grant from. To address this, the transmit interface 106*a* can wait for a grant to be received from all receive interfaces to which a request was sent. Alternatively, the transmit interface 106*a* may send data to any receive interfaces for which a grant was received, even if other have not responded. This may be implemented by introducing an additional signal (any_GNT), indicating that if a transmit interface 106*a* has grant from at least one receive interface.

The modified control logic including this additional signal is shown in FIG. 28 and described as follows.

When a request is made by a transmit interface 106*a*, but it has not yet received a grant, then the grant timeout unit 2106 can switch to a state (WAIT_GNT_ANY) in which it waits for a grant from at least one of the receive interfaces for which the request was made. If it does not receive a grant in this state (e.g., if no grant is received in a predetermined time period), the grant timeout unit 2106 can switch to another state (ALL_GNT_TIMEDOUT), which indicates that no grant has been received. The request may then be marked as completed and an error signal may be returned to the reconfigurable region 102*a*.

Alternatively, if the transmit interface 106*a* receives a single grant, the transmit interface 106*a* may switch to another state (WAIT_GNT_ALL) in which it waits for the grant from all receive interfaces for which the request was made. It may wait in that state whilst the final grant signal (GNT_I) remains low. In response to receiving grants from all of the receive interfaces for which the request was made, the grant timeout unit 2106 can switch to the IDLE state and the control unit 2102 of the transmit interface 106*a* may initiate sending data.

However, if the grant timeout unit 2106 reaches its maximum wait time (e.g. its timer expires) whilst it is waiting for a grant from all of the receive interfaces (e.g. in the WAIT_GNT_ALL state) and the final grant signal (GNT_I) signal remains low, the transmit interface 106*a* may switch to another state (SOME_GNT_TIMEDOUT) in which it sends a signal (gnt_time_out) to the input port indicating that it will proceed with the response receive interfaces only. The signal may thus indicate that the transmit interface 106*a* cannot wait any longer for the grant from other receive interfaces and thus will transmit to only the receive interfaces that have responded. In response to this signal, the grant timeout unit 2106 may enable one or more registers to store incoming grant signals from receive interfaces (GNT_3 . . . . GNT_0). The grant timeout unit 2106 may be operable to the registered grant signal to determine which receive interfaces did not respond to the request. Thus, for example, a low grant signal may be registered high, and a high grant signal may be registered low.

Therefore, in an example in which the second transmit interface 106*b* sends communication requests to the first receive interface 108*a* and the fourth receive interface 108*d*, and a communication grant schedules the fourth receive interface 108*d* but not the first receive interface 108*a*, then register(s) of the grant timeout unit 2106 may store 0001. This can be negated and ANDing with the output request bits to cause the request signals to the unresponsive receive interfaces to be cancelled. The multiplexer select signals may be switched to 0 for those (unresponsive) receive interfaces so that the request only proceeds with responsive receive interface (e.g. the fourth receive interface 108*d*). Since the request to any timed-out receive interfaces can be cancelled, the GNT_O will be evaluated true, which causes the grant timeout unit 2106 to switch to the IDLE state. The input port 1202 sends a signal indicating which receive interfaces did not response (gnt_unresponsive_slaves) to the transmit interface 106*a*, which forwards it to the first reconfigurable region 102*a* with an error code. The first reconfigurable region 102*a* may send the error code to a register, such as the register 216, so that the communication failure can be registered in the register file. For example, if the first receive interface 108*a* did not schedule a communication grant, the first transmit interface 106*a* could forward "0001_11"-"slave0_grant-timeout". The transmit interface 106*a* may then only send data to the receive interfaces which have scheduled a grant.

Although FIG. 28 shows the control logic of the grant timeout unit 2106, the skilled person will appreciate that the same or similar logic may also apply to the acknowledgement timeout unit 2104, subject to one or more of the following considerations.

Since the transmit interface 106*a* waits for all grant signals before sending data, all of the destination receive interfaces become available at the same time. This means that the acknowledgement signals may also be received simultaneously, causing the ACK_O signal to be evaluated true. However, there are two scenarios in which low acknowledgement signals may be received from some receive interfaces. In a first scenario, some of the receive interfaces might have less buffer space than others, causing STALL to be asserted high and the acknowledgement signal to be low. In this case, if at least one of slaves assert high STALL signal, then the control unit 2102 of the transmit interface 106*a* may switch to the STALLED state as it is shown in FIG. 23. In this state, the transmit interface 106*a* waits without sending data to other receive interfaces and the acknowledgement timeout unit 2104 may initialise its timer (e.g. may start to count). When STALL signal goes low, the transmit interface 106*a* can switch back to the WR_REQ state to continue to send data. However, if the receive interface which sent the STALL signal does not respond before the timer in the acknowledgement timeout unit 2104 expires (e.g. before it reaches a predefined time limit), the ack_time_out signal may be sent to the input port 1202. This signal may cause the input port 1202 to cancel its request to the timed-out receive interface and registering the address of the timed-out receive interface from ack_unresponsive_slaves. Therefore, the transmit interface 106*a* may only proceed with responsive receive interfaces.

The second scenario in which ACK_O might evaluate to be false is when a receive interface might stop operating (e.g. might get stuck). The same procedures may be used to enable the master interface to proceed only with the receive interfaces from which a response (an acknowledgement) has been received. If none of the receive interfaces send an acknowledgement signal, the request for communication may be marked as a complete with an error codes, such as one of the error statuses described above in respect of FIG. 22.

A further modification may be made to the handling of the STALL_O signal by the transmit interface 106*a*. Since the STALL_I signals pass through 2-input multiplexers, only signals for the requested receive interfaces are considered. As previously mentioned, when a single receive interface asserts a high STALL signal having less buffer space, then the transmit interface 106*a* waits for it. To handle this, the final STALL_O output directed to the transmit interface 106*a* may be evaluated with OR gate.

Since multicast communication is sending data to multiple slaves there is no need to modify how DAT_I signals receiving from receive interfaces are handled, since they are not used. Therefore, this aspect of the design of the input port 1202 can stay the same.

Although implementation of multicast communications is described above in respect of transmit interface 106*a* and the transmit port 302, the skilled person will appreciate that the same or similar features may also be implemented in any of the transmit interfaces 106*b*-106*d* and the associated transmit ports in the crossbar switch 104.

Examples of the disclosure thus provide a crossbar switch 104 and transmit interface(s) for implementing multicast communication from one reconfigurable region to another.

Processing Data for an Application

Figure 29:
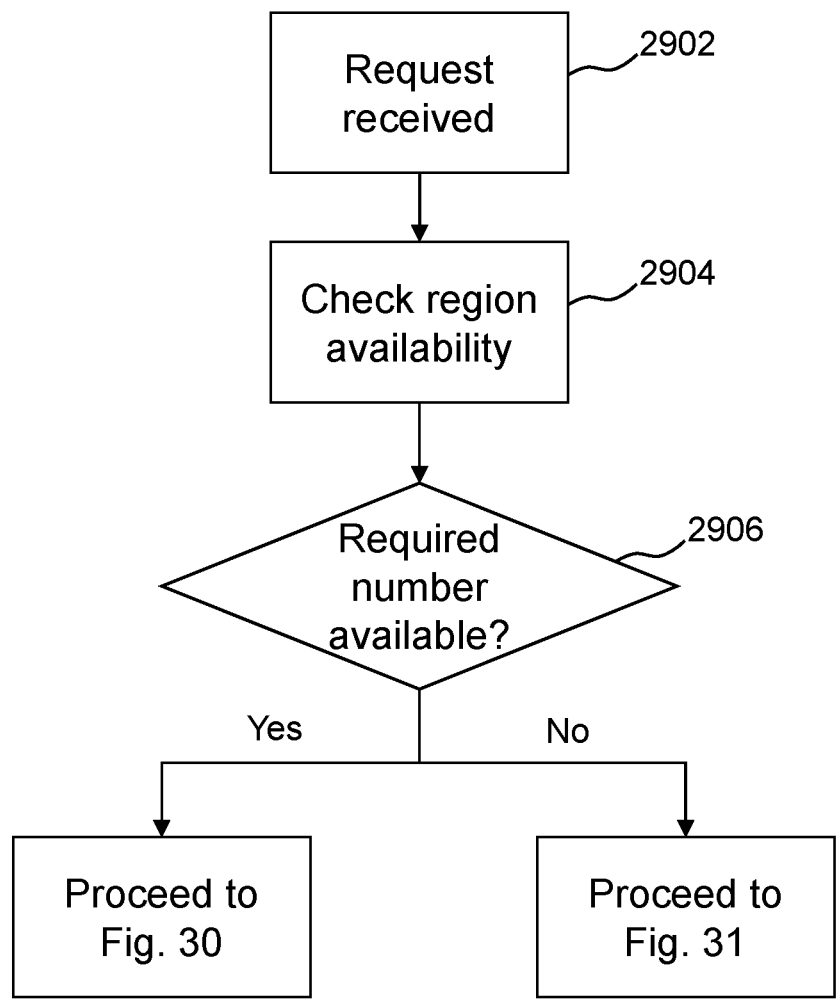
FIGS. 29-31 provide a method for processing data for an application according to an example of the disclosure.
Figure 30:
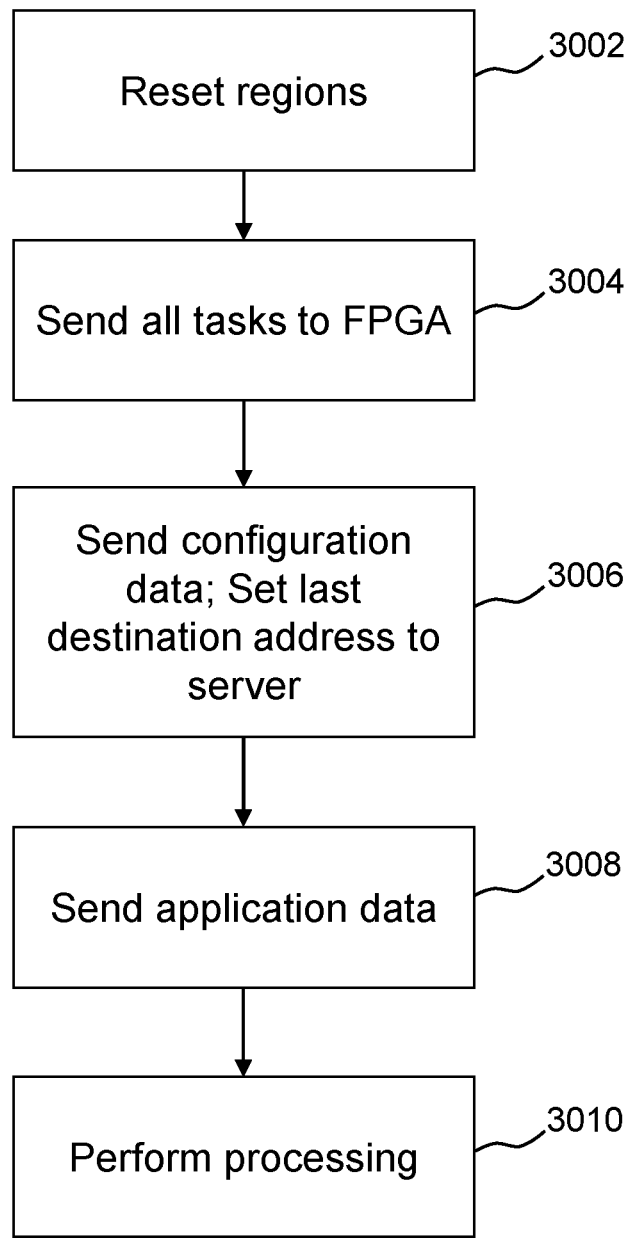
Figure 31:
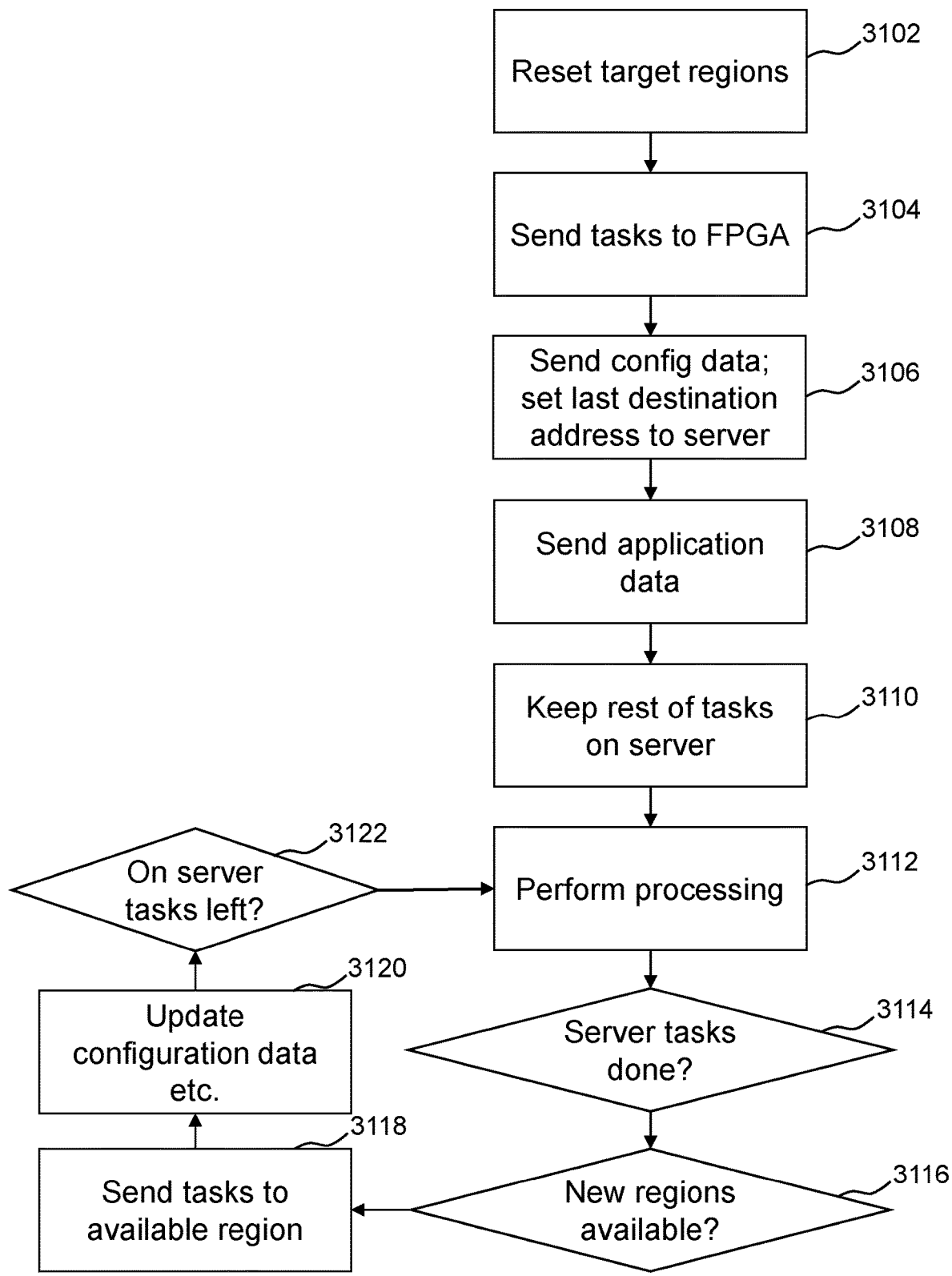

FIGS. 29-31 provide a method for processing data for an application according to an example of the disclosure. The method is performed by a system comprising a host server and an FPGA. The FPGA comprises a plurality of reconfigurable regions that are interconnected by a crossbar switch. The host server may be the host server 228, for example. The FPGA may be the FPGA 232, for example. The reconfigurable regions may be the reconfigurable regions 202, for example.

The method begins in step 2902, in which the host server 228 receives a request to perform data processing for an application. The request for data processing comprises data to be processed (referred to equivalently herein as application data) and a plurality of tasks to be performed using the data.

In step 2904, the host server 228 checks which of the reconfigurable regions on the FPGA 232 are available for processing data. Some of the reconfigurable regions may, for example, be already in use to process data (e.g. for another application) and may thus not be available. The host server 228 may, for example, record which regions 202 of the FPGA 232 are assigned one or more tasks to perform so that in step 2904 it may check its records to determine which regions 202 are available.

In step 2906, the host server 228 determines whether or not the available regions 202 are sufficient to perform the data processing. The host server 228 may thus, for example, determine the resources required to perform data processing for the application and compare the required resources to the resources of the available reconfigurable regions 202. If there are sufficient resources available, the method proceeds to step 3002 of the flowchart shown in FIG. 30.

In step 3002, the host server 228 resets the regions 202 of the FPGA 232 which are to be used to process the data. These regions may be referred to as the target regions. The target regions may be identified by comparing the resources needed to perform the data processing to the resources of the available reconfigurable regions 202. The host server 228 may reset the target regions by sending one or more reset signals FPGA 232. The host server 228 may, for example, reset the target regions by sending a reset signal to an internal configuration unit of the FPGA 232, such as the ICAP 218, in which the reset signal identifies the target regions. The FPGA 232 may then reset the target regions based on the reset signal.

In step 3004, the host server 228 sends the plurality of tasks to be performed to the FPGA 232. The host server 228 may thus, for example, send region configuration information (e.g. one or more partial bitstreams) to the FPGA 232 to configure the target regions to perform one or more respective tasks of the plurality of tasks. In step 3006, the host server 228 sends further configuration information to enable the processing to be performed. In particular, the host server 228 sends destination information to the FPGA 232 which indicates that at least one of the target regions is to send its output(s) to another of the target regions for further processing. The destination information may comprise the destination information described above in respect of FIG. 2, for example. The host server 228 also configures one of the target regions to send its outputs back to the host server 228. Thus, the destination information for one of the target regions may comprise the address of the host server 228. The host server 228 thus configures the FPGA 232 to return the results of the data processing back to the host server 228.

For example, the host server 228 may configure the first reconfigurable region 202a to perform one or more first tasks and to send the output of the one or more first tasks to the second reconfigurable region 202b. The host server 228 may further configure the second reconfigurable region 202b to perform one or more second tasks using the output of the one or more first tasks. The host server 228 may further configure the second reconfigurable region 202b to send the output of the one or more second tasks to the host server 228.

The further configuration information may further comprise one or more of the bandwidth allocation(s) and the permission information described above in respect of FIG. 2, for example.

In step 3008, the host server 228 sends the application data (e.g. the data to be processed) to the FPGA 232. The application data may be sent to the at least one of the target regions via the crossbar switch 204. The application data may be sent as described above in respect of FIG. 2, for example.

In step 3010, the FPGA 232 processes the application data. Thus, the target regions perform the plurality of tasks to process the data as configured by the host server 228. When the processing is completed, at least one of the target regions returns its outputs to the host server 228 (e.g. as configured in step 3006).

Thus, the host server 228 configures the FPGA 232 to perform a plurality of tasks to process data for an application.

Alternatively, if there are not enough resources available (e.g. the resources of the available reconfigurable regions 202 are insufficient), the method proceeds from step 2906 to step 3102 of the flowchart shown in FIG. 31.

Steps 3102, 3104, 3106 and 3108 may correspond substantially to steps 3002, 3004, 3006 and 3008 described above in respect of FIG. 31, except for that, in step 3104, only a subset of the plurality of tasks are sent to the FPGA 3104. Thus, for example, it may be determined in step 2906 that the available reconfigurable regions of the FPGA 3104 only have sufficient resources to perform a subset (e.g. two or more, but not all) of the plurality of tasks. In response, the host server 228 may determine to perform only the subset of the plurality of the tasks on the FPGA 232 and to perform the remainder of the tasks elsewhere.

Therefore, in step 3110, in the host server 228 may keep the remainder of the tasks at the server 228. The host server 228 may comprise one or more processors for performing the remainder of the tasks, for example. In alternative examples, the host server 228 may send the remainder of the tasks to another node (e.g. another FPGA connected to the host server 228).

In step 3112, the plurality of tasks are performed (e.g. the data processing is performed). Thus, the target regions of the FPGA 232 perform the subset of tasks assigned to the FPGA 232, and the remainder of the tasks are performed elsewhere (e.g. at the host server 228).

In step 3114, the host server 228 determines whether the tasks being performed outside of the FPGA 232 are completed. If the tasks are ongoing, the method returns to step 3112 in which processing continues. If the tasks are completed, the method proceeds to step 3116, in which the host server 228 determines whether any additional reconfigurable regions in the FPGA 232 have become available.

If no additional reconfigurable regions have become available, the method returns to step 3112 and some of the tasks continue to be performed outside of the FPGA 232.

In response to determining that one or more additional reconfigurable regions have become available at the FPGA 232, the host server 228 may send the one or more of the tasks that were being performed elsewhere to the one or more additional reconfigurable regions. Thus, the host server 228 may be operable to responsively move processing to the FPGA 232 when resources become available. In step 228, the host server 228 configures the FPGA with the necessary information to perform the additional tasks. The host server 228 may thus update the configuration information at the FPGA (e.g. the destination information, the bandwidth allocation(s) and/or the permission information).

In step 3122, the host server 228 may determine if there are any further tasks still being performed elsewhere (e.g. not on the FPGA 232). If there are no tasks being performed elsewhere (e.g., all the processing is being performed on the FPGA 232), the method proceeds to step 3006 in which the FPGA 232 is configured to return an output of one of the target reconfigurable regions to the host server 228. Thus, the FPGA 232 may be configured to output the processed data to the host server 228.

Alternatively, if some tasks are still being performed at the host server 228, the method may return to step 3112. In this case, some of the tasks continue to be performed outside of the FPGA 232. However, the host server 228 may iteratively determine whether or not some of the tasks can be moved to the FPGA 232. In this manner, the host server 228 seeks to configure the FPGA 232 to perform as many of the tasks as possible. Since the FPGA 232 provides accelerated processing, this means that the processing can be performed more quickly and efficiently.

Examples of the disclosure thus provide methods for distributing processing across reconfigurable regions of an FPGA, as well as methods for distributing processing across an FPGA and another node, such as a host server.

FIG. 32 shows a flowchart of a method 3200 of configuring an FPGA according to an example of the disclosure. The FPGA comprises a plurality of regions that are reconfigurable independently of one another. The regions are interconnected by a crossbar switch. The FPGA may comprise the FPGA 232 described above in respect of FIG. 2, for example. The regions may comprise the reconfigurable regions 202, for example. The crossbar switch may comprise the crossbar switch 204, for example. The method 3200 may be performed by a resource manager, such as the resource manager 226 described above in respect of FIG. 2, for example.

The method 3200 comprises, in step 3002, configuring at least one first region in the plurality of regions 202 to communicate with at least one second region in the plurality of regions via the crossbar switch. Thus, for example, the method 3200 may comprise sending configuration information comprising destination information to the FPGA 232. The destination information may comprise the destination information described above in respect of FIG. 2.

The method 3200 may further be for configuring the FPGA 232 to perform data processing comprising a plurality of tasks. The method may thus comprise configuring the at least one first region in the plurality of regions to perform one or more first tasks in the plurality of tasks, configuring the at least one first region to send one or more outputs of the one or more first tasks to the at least one second region and configuring the at least one second region to perform one or more second tasks in the plurality of tasks based on the one or more outputs. These steps may be performed in accordance with steps 3004-3008 described above in respect of FIG. 30, for example.

In particular examples, the at least one first region may be configured to perform the one or more first tasks based on a determination of which regions in the FPGA 232 are available. This determination may be performed in accordance with steps 2904-2906 of FIG. 29, for example.

In further examples, the method 3200 may further comprise instructing another node (e.g. other than the FPGA 232) to perform one or more third tasks in the plurality of tasks. This step may be performed responsive to determining that the available regions on the FPGA 232 are insufficient to perform the plurality of tasks. This step may be performed in accordance with step 3110 described above in respect of FIGS. 31, for example. In these examples, the steps of configuring the at least one first region and the at least one second region in the FPGA 232 may correspond to steps 3104-3108 described above in respect of FIG. 31, for example.

The disclosure thus provides methods for configuring an FPGA comprising a plurality of independently configurable regions connected by a crossbar switch. In particular, methods are provided for configuring the FPGA to perform data processing comprising a plurality of tasks. The present disclosure thus provides methods for efficiently distributing processing across reconfigurable regions of an FPGA.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A Field Programmable Gate Array (FPGA) comprising:
   a plurality of regions, each of the regions being reconfigurable independently of one another;
   a crossbar switch connected to the plurality of regions, wherein the crossbar switch is configurable to connect at least one first region in the plurality of regions to at least one second region in the plurality of regions such that the at least one first region is operable to communicate with the at least one second region; and
   a register connected to at least one of: the crossbar switch and the plurality of regions,
   wherein the register is operable to store destination information indicating that the at least one first region is to transmit data to the at least one second region, wherein the destination information comprises an address of the at least one second region.

2. The FPGA of claim 1, wherein the crossbar switch is provided with a communication interface having a non-hierarchical bus architecture.

3. The FPGA of claim 1, wherein the register is further operable to store one or more of the following:
   a bandwidth allocation of the crossbar switch for one or more of the regions; and
   error information indicative of a communication failure for one or more of the regions.

4. The FPGA of claim 1, wherein, in response to an attempt to reconfigure one of the regions, the register is operable to store status information indicating whether or not the region was successfully configured.

5. The FPGA of claim 4, further comprising an internal configuration unit for configuring the regions, wherein the internal configuration unit is connected to the register by a first dedicated link.

6. The FPGA of claim 1, further comprising:
   a Direct Memory Access (DMA) intellectual property (IP) core, for receiving data from one or more applications for processing by the FPGA, wherein the DMA IP core is operable to send the data to the crossbar switch using one or more first channels.

7. The FPGA of claim 6, wherein DMA IP core is connected to the register by a second dedicated link.

8. The FPGA of claim 1, wherein each of the plurality of regions is provided with a transmit interface and a receive interface connecting the respective region to the crossbar switch.

9. The FPGA of claim 1, wherein the crossbar switch comprises, for each of the plurality of regions, a transmit port and a receive port, wherein:
   the transmit port for the at least one first region is operable to send a request for communication to a receive port of the at least one second region in the plurality of regions.

10. The FPGA of claim 9, wherein the receive port comprises an arbiter operable to schedule, in response to receiving the request for communication from the transmit port for the at least one first region, a communication grant for the at least one first region.

11. A resource manager operable to configure a Field Programmable Gate Array (FPGA), the FPGA comprising a plurality of regions connected to a crossbar switch, each of the regions being reconfigurable independently of one another, the resource manager being operable to instruct the FPGA to:
    configure at least one first region in the plurality of regions to communicate with at least one second region in the plurality of regions via the crossbar switch by sending, to the FPGA, destination information indicating that the at least one first region is to transmit to the at least one second region, wherein the destination information comprises an address of the at least one second region and is to be stored in a register included in the FPGA, wherein the register is connected to at least one of: the crossbar switch and the plurality of regions.

12. The resource manager of claim 11, wherein the resource manager is operable to configure the FPGA to perform data processing comprising a plurality of tasks, the resource manager being further operable to instruct the FPGA to:
    configure the at least one first region in the plurality of regions to perform one or more first tasks in the plurality of tasks;

configure the at least one first region to send an output of the one or more first tasks to the at least one second region; and configure the at least one second region to perform one or more second tasks in the plurality of tasks based on the output of the one or more first tasks.

13. The resource manager of claim 12, wherein resource manager is operable to instruct the FPGA to configure the at least one first region in the plurality of regions to perform the one or more first tasks in the plurality of tasks based on a determination of which regions in the FPGA are available.

14. The resource manager of claim 13, wherein the resource manager is further operable to, based on a determination that the available regions are insufficient for performing the plurality of tasks:

instruct another node connected to the resource manager to perform one or more third tasks in the plurality of tasks.

15. The resource manager of claim 14, wherein the resource manager is further operable to do one or more of the following:

instruct the another node to perform the one or more third tasks based on an output of the one or more first tasks or the one or more second tasks;

configure the at least one first region to perform the one or more first tasks based on an output of the one or more third tasks; and configure the at least one second region to perform the one or more second tasks based on an output of the one or more third tasks.

16. The resource manager of claim 12, wherein the resource manager is configured to sub-divide one or more computational modules for performing the plurality of tasks into a plurality of computational modules until resource consumption of each of the computational modules is less than a resource capacity of each of the plurality of regions.

17. The resource manager of claim 16, wherein the resource manager is configured to:

construct one or more dataflow graphs based on the computational modules;

configure the at least one first region in the plurality of regions to perform the one or more first tasks in the plurality of tasks based on the one or more dataflow graphs; and configure the at least one second region in the plurality of regions to perform the one or more second tasks in the plurality of tasks based on the one or more dataflow graphs.

18. A method for configuring a Field Programmable Gate Array, FPGA, the FPGA comprising a plurality of regions connected to a crossbar switch, each of the regions being reconfigurable independently of one another, the method comprising:

configuring at least one first region in the plurality of regions to communicate with at least one second region in the plurality of regions via the crossbar switch by sending, to the FPGA, destination information indicating that the at least one first region is to transmit to the at least one second region, wherein the destination information comprises an address of the at least one second region and is to be stored in a register included in the FPGA, wherein the register is connected to at least one of: the crossbar switch and the plurality of regions.

* * * * *